(12) United States Patent
Takahashi et al.

(10) Patent No.: US 12,730,518 B2
(45) Date of Patent: Sep. 8, 2026

(54) AIR FLOATING VIDEO INFORMATION DISPLAY SYSTEM

(71) Applicant: Maxell, Ltd., Kyoto (JP)

(72) Inventors: Hiroaki Takahashi, Kyoto (JP); Koji Hirata, Kyoto (JP); Koji Fujita, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 18/718,560

(22) PCT Filed: Oct. 17, 2022

(86) PCT No.: PCT/JP2022/038557
§ 371 (c)(1),
(2) Date: Jun. 11, 2024

(87) PCT Pub. No.: WO2023/112463
PCT Pub. Date: Jun. 22, 2023

(65) Prior Publication Data
US 2025/0053241 A1 Feb. 13, 2025

(30) Foreign Application Priority Data
Dec. 13, 2021 (JP) ................................ 2021-201690

(51) Int. Cl.
*G06F 3/01* (2006.01)
*G02B 30/56* (2020.01)
(Continued)

(52) U.S. Cl.
CPC ............ *G06F 3/017* (2013.01); *G02B 30/56* (2020.01); *G06F 3/011* (2013.01); *G06F 3/02* (2013.01);
(Continued)

(58) Field of Classification Search
CPC ......... G06F 3/017; G06F 3/048–04897; G06F 9/453; G06F 3/011; G02B 30/56;
(Continued)

(56) References Cited

U.S. PATENT DOCUMENTS 5,018,082 A * 5/1991 Obata .................... G06F 9/453 434/335
10,469,674 B1 * 11/2019 Fukushima ........ H04N 1/00411
(Continued)

FOREIGN PATENT DOCUMENTS

CN 102023784 A 4/2011
JP 2006-085359 A 3/2006
(Continued)

OTHER PUBLICATIONS

International Search Report and Written Opinion mailed on Dec. 13, 2022, received for PCT Application PCT/JP2022/038557, filed on Oct. 17, 2022, 17 pages including English Translation.
(Continued)

*Primary Examiner* — Roberto W Flores
(74) *Attorney, Agent, or Firm* — XSENSUS LLP

(57) ABSTRACT

An air floating video information display system forming an air floating video in air, including a video display apparatus configured to display at least a video of one object, a retroreflector configured to form the air floating video in air by retroreflecting video light emitted from the video display apparatus, a sensing system configured to include a sensor for detecting a user's operation on the air floating video, a housing configured to include the video display apparatus and the retroreflector, and a controller configured to execute a predetermined processing based on the detected operation, and when approach of the user to the housing is detected, the video of the object is displayed as the air floating video.

18 Claims, 29 Drawing Sheets

(51) Int. Cl.

| | |
|---|---|
| ***G06F 3/02*** | (2006.01) |
| ***G06F 3/0482*** | (2013.01) |
| ***G06F 9/451*** | (2018.01) |
| ***G06V 40/10*** | (2022.01) |
| ***H04N 13/398*** | (2018.01) |

(52) U.S. Cl.
CPC ............ *G06F 3/0482* (2013.01); *G06F 9/453* (2018.02); *G06V 40/10* (2022.01); *H04N 13/398* (2018.05)

(58) Field of Classification Search
CPC ...... H04N 7/157; G06T 19/006; G06V 20/20; G06N 3/004; G06N 3/006
See application file for complete search history.

(56) References Cited

U.S. PATENT DOCUMENTS

| | | | | |
|---|---|---|---|---|
| 2011/0041100 | A1* | 2/2011 | Boillot | G06F 3/011 715/863 |
| 2013/0159027 | A1* | 6/2013 | Naor | G06Q 10/02 705/5 |
| 2014/0282105 | A1* | 9/2014 | Nordstrom | G06F 3/016 715/753 |
| 2014/0380226 | A1* | 12/2014 | Okigami | G06F 3/04883 715/776 |
| 2019/0227489 | A1 | 7/2019 | Tokuchi | |
| 2019/0285904 | A1* | 9/2019 | Kim | G09F 19/12 |
| 2020/0012916 | A1* | 1/2020 | Dolignon | G06N 3/006 |
| 2021/0228129 | A1* | 7/2021 | Iwanami | A61B 5/165 |
| 2021/0311573 | A1* | 10/2021 | He | G06F 3/04842 |
| 2022/0185525 | A1* | 6/2022 | Subramanian | B41J 3/4073 |

FOREIGN PATENT DOCUMENTS

| | | | |
|---|---|---|---|
| JP | 2009-009280 | A | 1/2009 |
| JP | 2009-259127 | A | 11/2009 |
| JP | 2013-157845 | A | 8/2013 |
| JP | 2014-182459 | A | 9/2014 |
| JP | 2019-128722 | A | 8/2019 |

OTHER PUBLICATIONS

Airsynapse, "Aerial Video and Interactive Solutions", Airmagic, Retrieved from Internet: http://web.archive.org/web/20210527060916/https://airsynapse.co.jp/airmagic/, May 27, 2021, 20 pages including English Translation.

Toppan Solution, "Freestanding KIOSK model", Retrieved from Internet: http://web.archive.org/web/20210920120851/https://www.toppan.co.jp/solution/service/kiosk.html, Sep. 20, 2021, 17 pages including English Translation.

Office Action issued Apr. 1, 2025 in Japanese Patent Application No. 2021-201690 with English translation thereof.

* cited by examiner

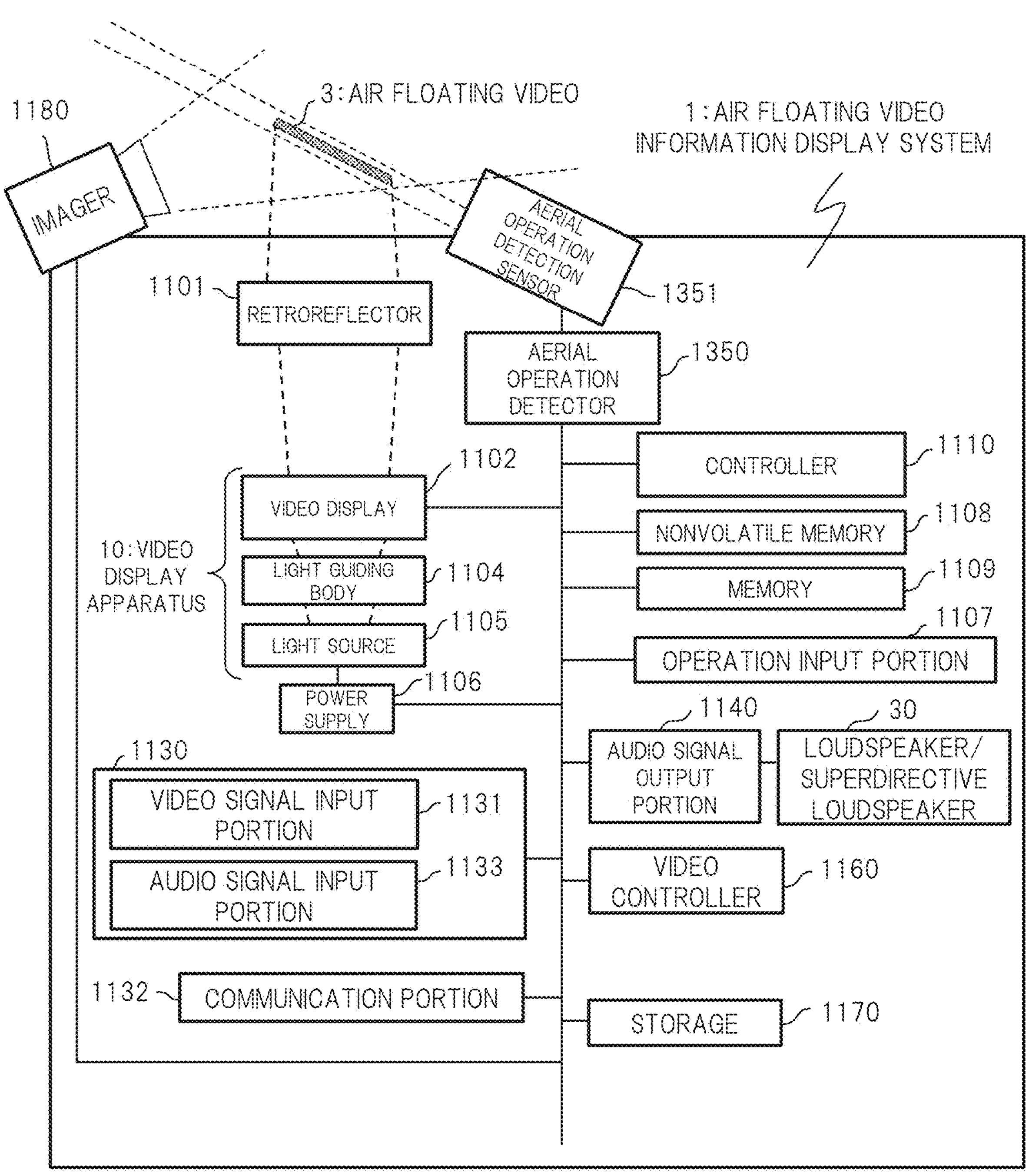
FIG. 2
1180
IMAGER
3: AIR FLOATING VIDEO
1: AIR FLOATING VIDEO INFORMATION DISPLAY SYSTEM
AERIAL OPERATION DETECTION SENSOR
1351
1101
RETROREFLECTOR
AERIAL OPERATION DETECTOR
1350
CONTROLLER
1110
1102
VIDEO DISPLAY
NONVOLATILE MEMORY
1108
10: VIDEO DISPLAY APPARATUS
LIGHT GUIDING BODY
1104
MEMORY
1109
LIGHT SOURCE
1105
1107
OPERATION INPUT PORTION
POWER SUPPLY
1106
1140
30
AUDIO SIGNAL OUTPUT PORTION
LOUDSPEAKER/ SUPERDIRECTIVE LOUDSPEAKER
1130
VIDEO SIGNAL INPUT PORTION
1131
AUDIO SIGNAL INPUT PORTION
1133
VIDEO CONTROLLER
1160
1132
COMMUNICATION PORTION
STORAGE
1170

(A)
A
B
100
3
101
21
11
12
13
2
10
(B)
P
D
2
2a
(C)
REFLECTION LIGHT OF PRINCIPAL LIGHT RAY OF VIDEO LIGHT
OBLIQUE LIGHT RAY OF VIDEO LIGHT
PRINCIPAL LIGHT RAY OF VIDEO LIGHT
REFLECTION LIGHT OF OBLIQUE LIGHT RAY OF VIDEO LIGHT
2
2a

FIG. 4
(A)
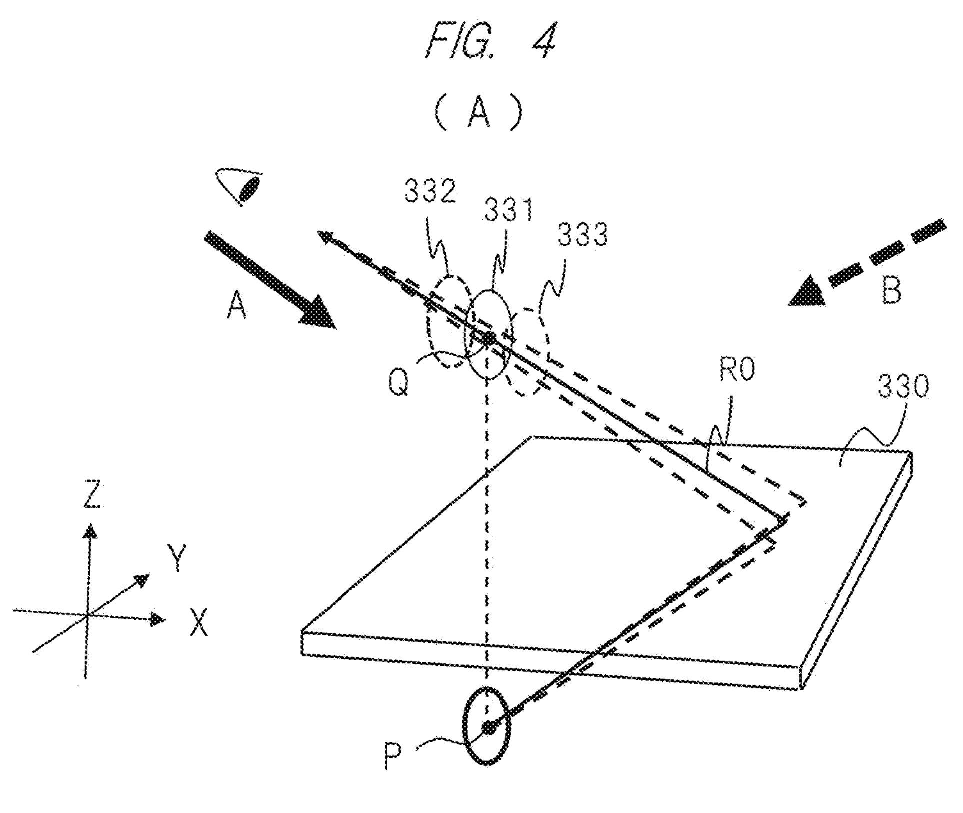
(B)
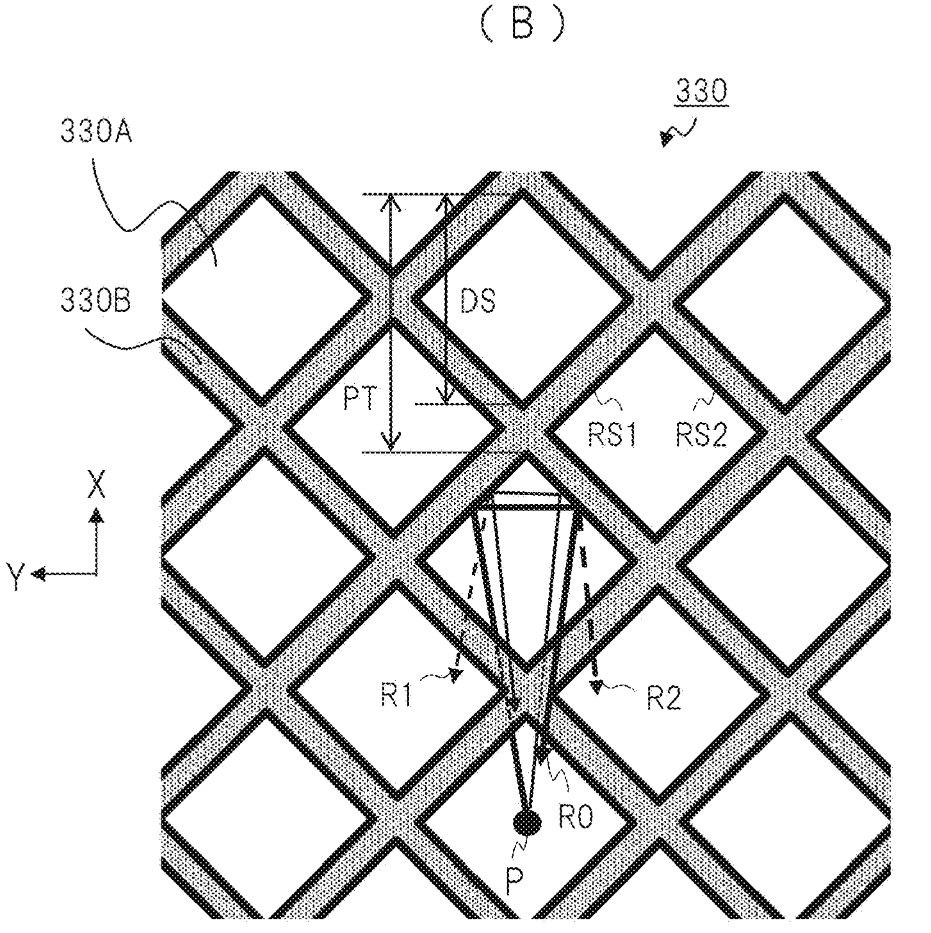

(A)

B
337
336
334
d1
d2
338
10
335
13
3351
A (B)

FIG. 7
(A)
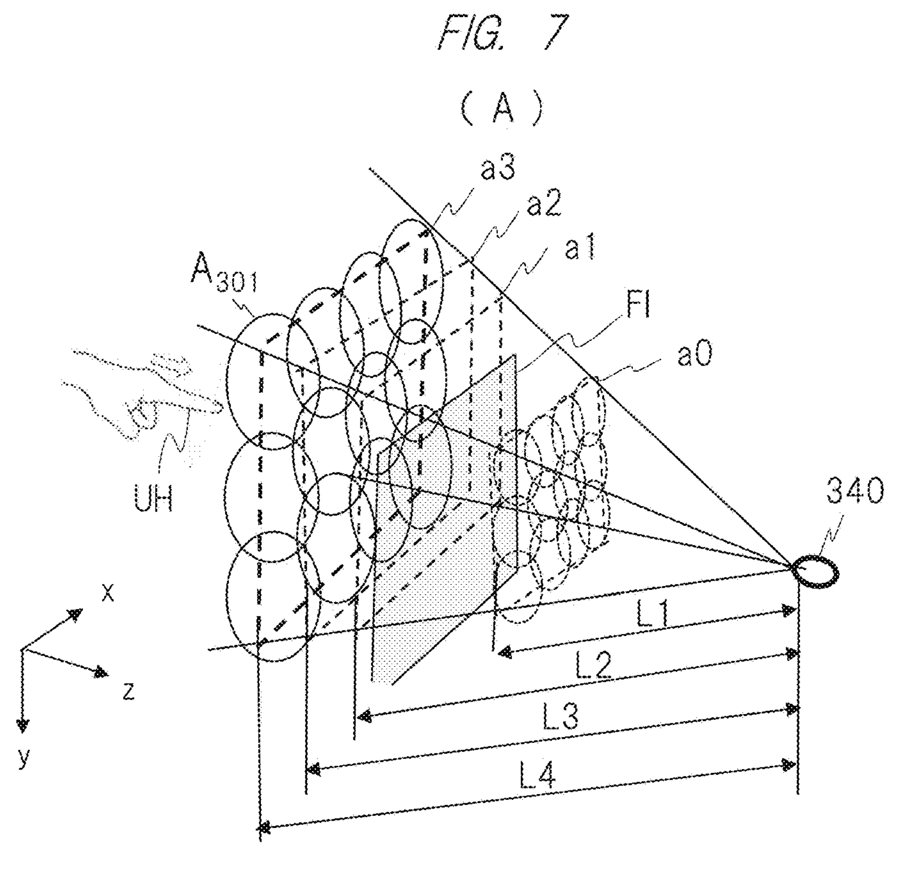
(B)
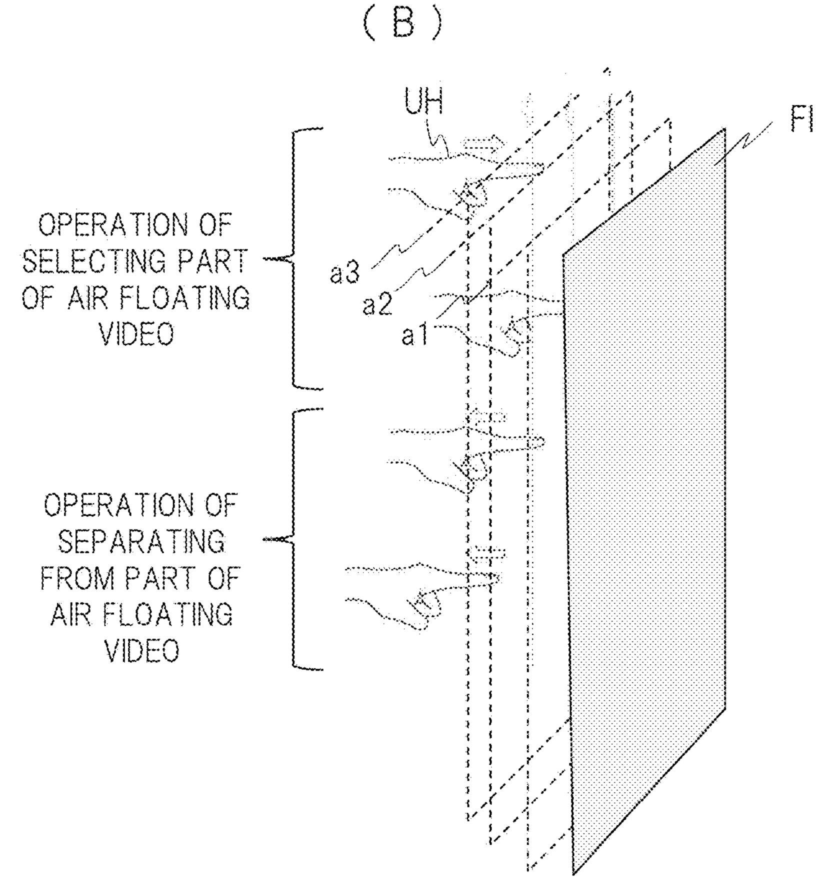

FIG. 8
(A)
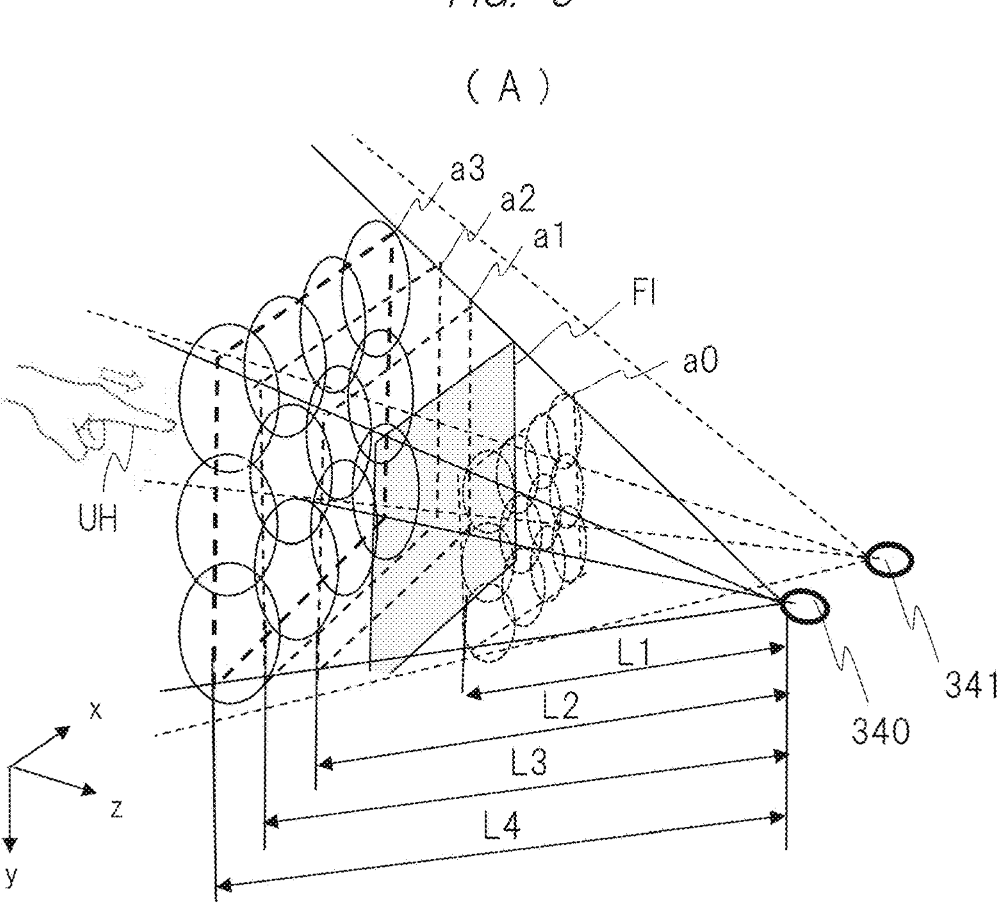
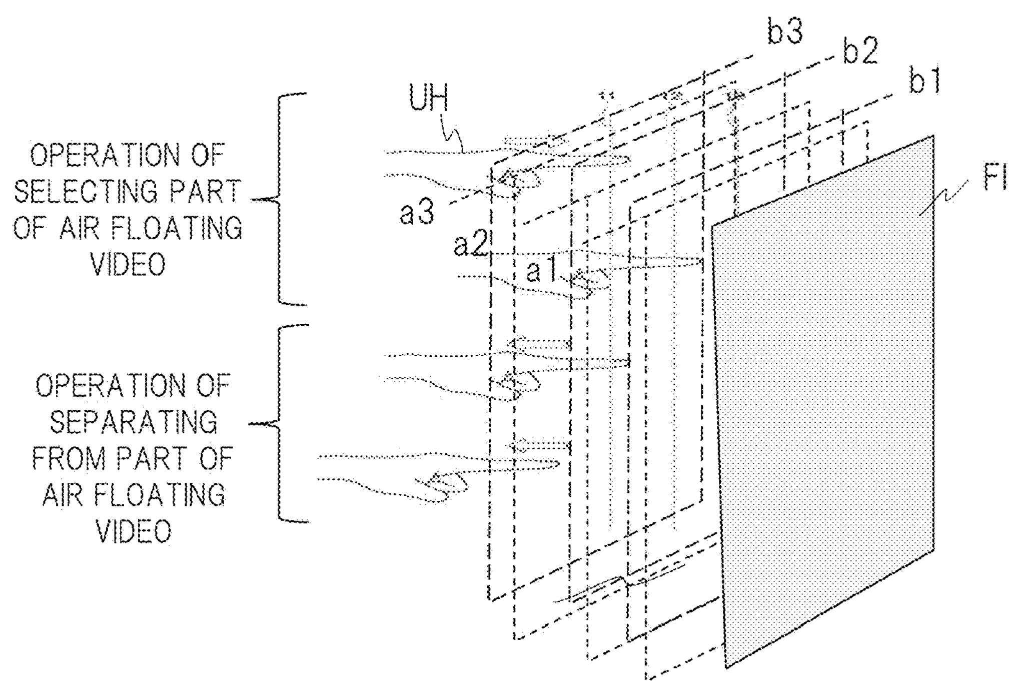

(A)

(B)

a3
TOF1
TOF2
TOF11
TOF12
a2
TOF1
TOF2
TOF11
TOF12
a1
TOF1
TOF2
TOF11
TOF12
SENSING SYSTEM
COMPUTING UNIT
CMOS SENSOR
FIRST SENSING UNIT
SECOND SENSING UNIT

REFLECTANCE OF GLASS FOR
P-POLARIZATION LIGHT AND S-POLARIZATION LIGHT

FIG. 17

(A)
1500
1510
1541
3
1542
1551
1552
1570
1550
1520
1521
1530
Z
Y
X
USER
USER HAS BEEN IDENTIFIED.
⇒ SCREEN CHANGE
(B)
3
SELECT ITEM BY TOUCH
1: ISSUANCE OF RESIDENCE CERTIFICATE
2: TICKET PURCHASE
3: REGISTERED INFORMATION
4: ANOTHER MENU
1520
1522

(A)
(B)
(C)
(D)
2000
3
2021
2020
2022
2023
PLEASE MAKE SIGNATURE FOR TICKET RECEPTION
SIGNATURE COMPLETED
2024
UH
2025
THANK YOU FOR YOUR SIGNATURE

FIG. 27
(A)
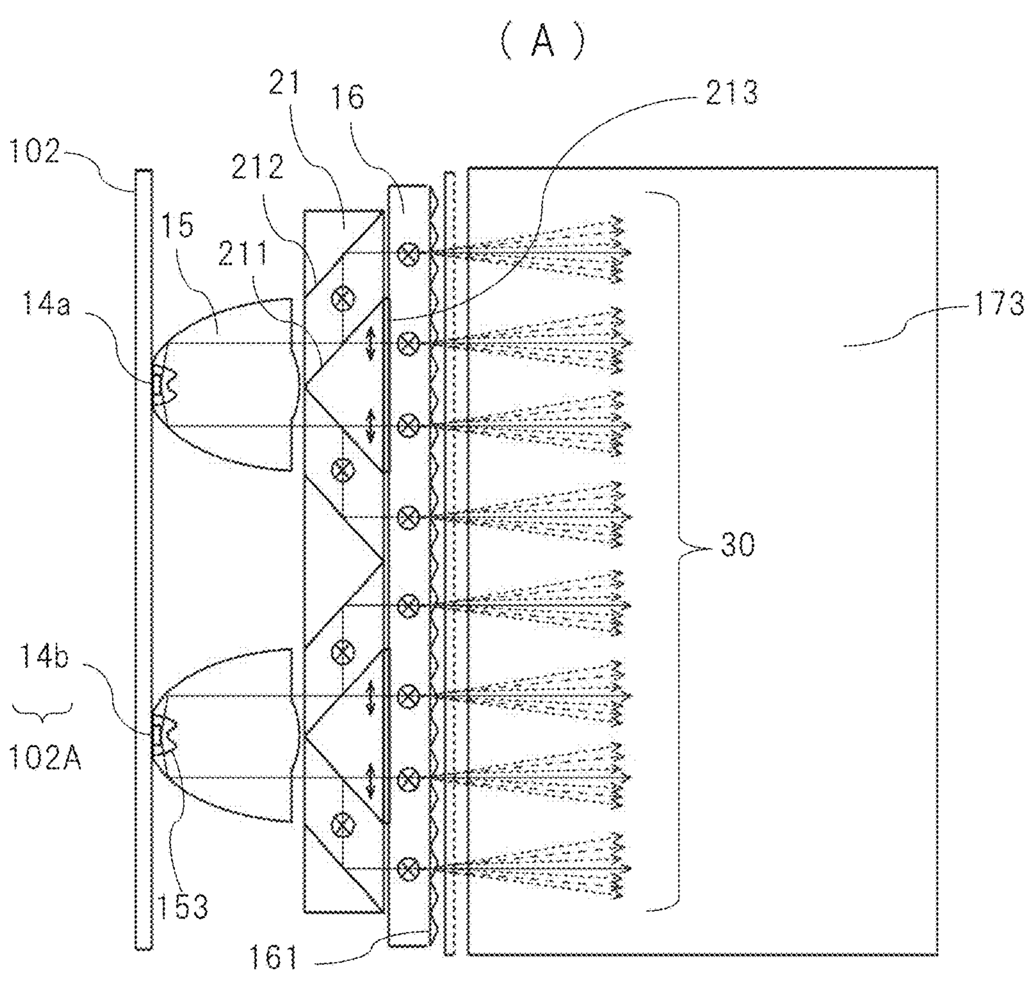
(B)
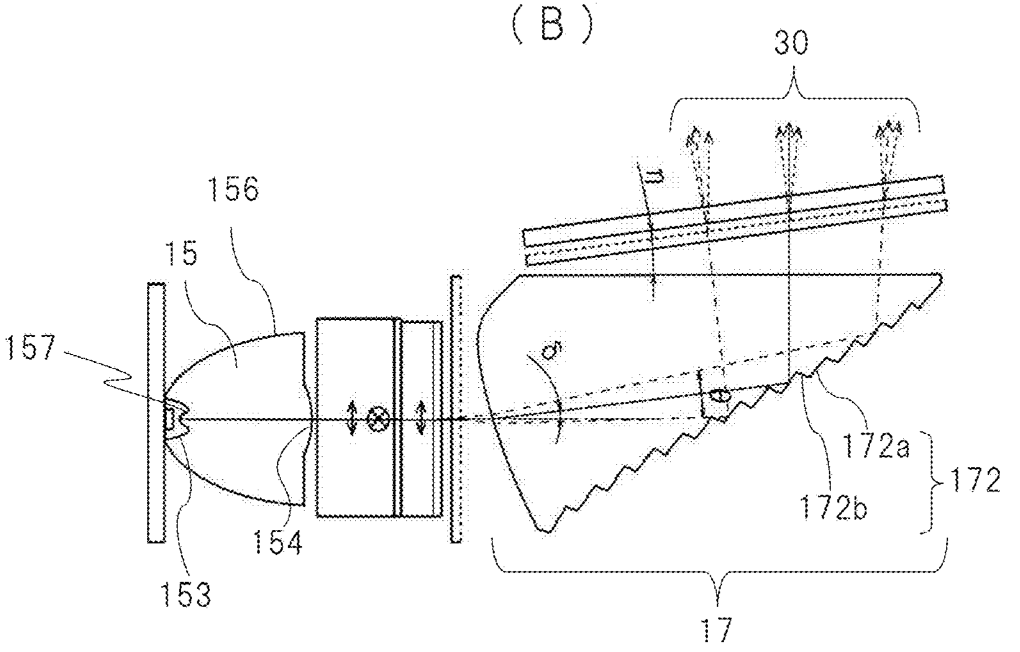

AIR FLOATING VIDEO INFORMATION DISPLAY SYSTEM

CROSS-REFERENCE TO RELATED APPLICATIONS

The present application is based on PCT filing PCT/JP2022/038557, filed Oct. 17, 2022, which claims priority from Japanese Patent Application No. 2021-201690, filed Dec. 13, 2021, the entire contents of each are incorporated herein by reference.

TECHNICAL FIELD OF THE INVENTION

The present invention relates to an air floating video information display system.

BACKGROUND OF THE INVENTION

As air floating video display apparatuses, video display apparatuses and display methods each for displaying a video as an aerial image directly toward the outside have already been known. Furthermore, a detection system that reduces erroneous detection for an operation on an operation surface of a displayed aerial image is also described in, for example, Japanese Patent Application Laid-Open Publication No. 2019-128722 (Patent Document 1).

RELATED ART DOCUMENT

Patent Document

Patent Document 1: Japanese Patent Application Laid-Open Publication No. 2019-128722

SUMMARY OF THE INVENTION

Problems to be Solved by the Invention

The Patent Document 1 describes that a purpose of reducing the erroneous detection for the operation on the image formed in air is achieved by a method of receiving user's motion serving as an operation when the user approaches the image from a predetermined direction.

However, the related art example as described in the Patent Document 1 is not sufficient for taking care of a user or the like who does not get used to operating a user interface displayed as an air floating video. Particularly, for a user who uses a system at the first time, it is difficult to instinctually understand how to operate the system or the like, and therefore, there are problems in terms of convenience and usability.

Accordingly, if the air floating video formed by the air floating video information display system is used as a user interface or a man-machine interface that is operable for the user, it is desirable to achieve an interface that is excellent in convenience and usability. Particularly, even if a large number of unspecified users including the user who uses the system at the first time and the user who does not get used to the system use the interface made of the air floating video, it is desirable to provide an appropriate air floating video information display system, an operation method of which or the like can be instinctually understood by the user, and on which erroneous operation and erroneous input can be reduced. And, even in, for example, an apparatus that is generally so called "kiosk terminal", it is desirable to provide the interface made of the air floating video, excellent in convenience and usability.

The user interface made of the air floating video, such as an operation menu that is a press button or the like, is a contactless user interface, and therefore, has an advantage of making the risk of contact infection minimum as compared to a general contact interface such a physical press button. It is desirable to achieve an air floating video information display system maximizing such an advantage. Further, it is desirable to achieve a system capable of developing or improving visual recognition of the user interface made of the air floating video such that, for example, a ghost image related to the air floating video can be prevented or reduced.

A purpose of the present invention is to provide a technique for an air floating video information display system, the technique being capable of providing a convenient and usable interface made of an air floating video and necessary information suitable for a user who uses a kiosk terminal or the like.

Means for Solving the Problems

In order to solve the problems, for example, configurations described in the claims are applied. The present invention includes a plurality of means for solving the problems. However, one example is described below. An air floating video information display system of an embodiment is an air floating video information display system forming an air floating video in air, the air floating video information display system includes: a video display apparatus configured to display at least a video of one object; a retroreflector configured to form the air floating video in air by retroreflecting video light emitted from the video display apparatus; a sensing system configured to include a sensor for detecting a user's operation on the air floating video; a housing configured to include the video display apparatus and the retroreflector; and a controller configured to execute a predetermined processing based on the detected operation. When approach of the user to the housing is detected, the video of the object is displayed as the air floating video.

Effects of the Invention

According to a typical embodiment of the present disclosure, an air floating video information display system can provide a convenient and usable interface made of an air floating video and necessary information suitable for a user who uses a kiosk terminal or the like. Other problems, configurations, effects and so on than those described above will be described in the section <DESCRIPTIONS OF THE PREFERRED EMBODIMENTS>.

BRIEF DESCRIPTIONS OF THE DRAWINGS

FIG. 2 is a diagram illustrating an example of an internal configuration of an air floating video information display system according to an embodiment;

FIG. 4 is a diagram illustrating another example of the configurations of the principal part and the retroreflection portion of the air floating video information display system according to the embodiment;

FIG. 7 is an explanatory diagram of a first sensing technique used in an air floating video information display system according to an embodiment;

FIG. 8 is an explanatory diagram of a second sensing technique used in an air floating video information display system according to an embodiment;

FIG. 17 is a diagram illustrating a cross-sectional structure example of the kiosk terminal according to the first embodiment;

FIG. 25 is a diagram illustrating a display example of a kiosk terminal according to a modification example of the third embodiment or the like;

FIG. 27 is a structural diagram illustrating a specific configuration example of a light source;

DESCRIPTIONS OF THE PREFERRED EMBODIMENTS

Figure 1:
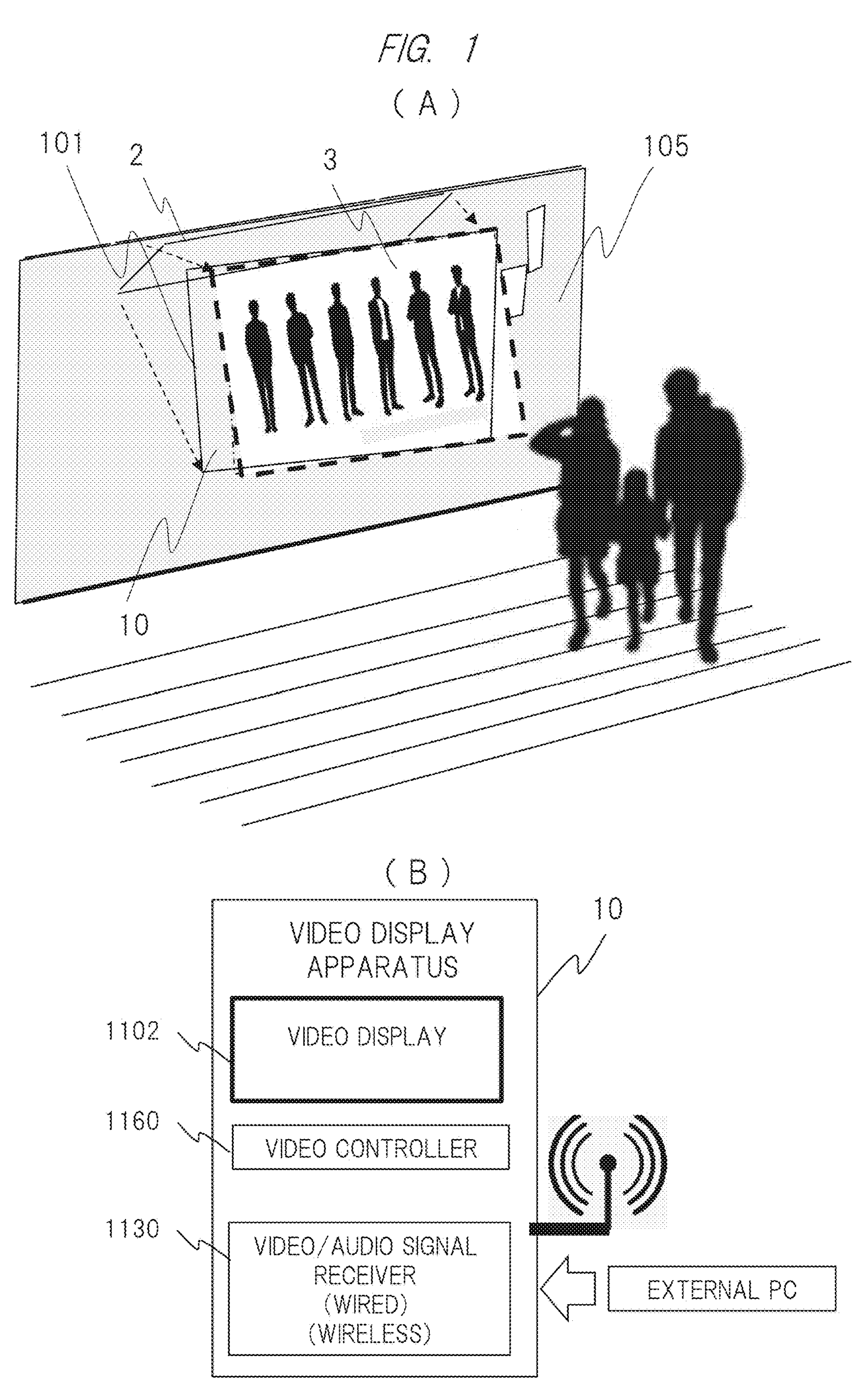
FIG. 1 is a diagram illustrating an example of a usage mode of an air floating video information display system according to an embodiment.

Hereinafter, embodiments (also each referred to as example) of the present invention will be described in detail with reference to the drawings. In the drawings, the same parts are denoted by the same reference symbols in principle, and repetitive description thereof is omitted. In the drawings, each expression of the components may not describe an actual position, size, shape, range, and the like in order to support understanding of the invention.

For the explanations, in explanation for a processing operated by a program, the program, the function, the processing portion, and the like may be explained as entities. However, the entities as hardware for these components are a processor, or a controller, an apparatus, a computer, a system, and the like configured by the processor and the like. In the computer, the processing is executed by the processor in accordance with the program loaded on the memory while appropriately using resources such as the memory and the communication interface. As a result, predetermined functions, processing portions, and the like are achieved. The processor is made of, for example, a semiconductor device such as a CPU (Central Processing Unit) or a GPU. The processor is made of an apparatus or a circuit capable of performing a predetermined calculation. The processing is not limited to software program processing, and can be implemented by a dedicated circuit. As the dedicated circuit, FPGA (Field-Programmable Gate Array), ASIC (Application Specific Integrated Circuit), CPLD (Complex Programmable Logic Device), or the like can be applied.

The program may be previously installed as data in the target computer, or may be distributed as data from a program source to the target computer. The program source may be a program distribution server on a communication network, or may be a non-transitory computer-readable storage medium (such as a memory card). The program may be made of a plurality of modules. The computer system may be made of a plurality of apparatuses. The computer system may be made of a client server system, a cloud computing system or the like. The various pieces of data and information are made of, for example, a structure of a table, a list and the like, but are not limited thereto. Expressions for identification information, an identifier, an ID, a name, a number and the like can be exchanged with one another.

An air floating video information display system (that may be simply referred to as system) according to an embodiment has a configuration in which the visual recognition is improved by eliminating a ghost image that significantly reduces the visual recognition of the air floating video first to improve brightness of the air floating video. The system according to the embodiment is applied to a kiosk terminal or the like, and provides a user interface such as an operation menu on a screen made of the air floating video. Based on this, first, the system according to the embodiment displays a concierge (that may be referred to as concierge video or the like) serving as a predetermined personal image on the screen of the air floating video when a user approaches to a housing of the system (kiosk terminal). In the system, the concierge made of the air floating video makes greeting, guidance, explanation or the like to the user.

When the user approaches to the air floating video or operates the air floating video, the air floating video information display system according to the embodiment automatically shifts/changes the concierge video to an operation menu screen of a mode such as a predetermined operation menu including, for example, a plurality of number buttons, optional buttons or the like that can be pressed down. In the system, the concierge made of the air floating video appropriately makes the guidance or the explanation about the operation menu to the user. Particularly when the system determines that the user is a new user or an elder user, the concierge makes a guidance of the operation menu in detail to the user. Also, when the system determines a state in which the user does not understand the operation method of the air floating video or the like so much, the concierge makes the guidance of the operation menu in detail to the user.

In addition, the air floating video information display system of an embodiment has a function of identifying/specifying the user, based on, for example, face identification using a camera. The system refers to user attributional information such as age and system usage history of the user specified by the function. In accordance with the attribution of the user, the system performs control to change a mode or a content of the guidance performed by the concierge made of the air floating video.

In addition, the air floating video information display system of an embodiment also has a function enabling the user to input any letter or figure with his/her hand finger to a screen of the air floating video. The system detects a state of contact of the hand finger with the screen of the air floating video, and draws an input line onto the screen of the air floating video. The system acquires this input line as, for example, a signature of the user.

In the following explanation for the embodiments, note that the aerially floating video or the video displayed in air may be expressed as a term "air floating video". In place of this term, expressions such as "spatial image", "aerial image", "spatial floating video", "air floating optical image of display video", "spatial floating optical image of display video" and others are also acceptable. The term "air floating video" mainly used in the explanation for the embodiments is used as a typical example of these terms.

<Air Floating Video Information Display System>

The present disclosure relates to, for example, an information display system capable of transmitting a video based on video light emitted from a video light emission source having a large area, through a transparent member such as a glass of a show window separating a space or others, and displaying the video as the air floating video inside or outside a shop space. Also, the present disclosure relates to a large digital signage system made of a plurality of the information display systems.

According to the following embodiments, for example, high-resolution video information can be displayed above a glass surface of a show window or a light-transmittable plate member while floating in air. In this case, only normal reflection light can be efficiently reflected with respect to a retroreflector (retroreflection member) or a retroreflection plate by making a divergence angle of the emitted video light small, that is, be an acute angle, and unifying the video light to have a specific polarization wave. Therefore, according to the present embodiment, the light use efficiency is high, and the ghost image occurring in addition to the main air floating image can be suppressed, the ghost image being the issue of the related-art retroreflection method, and thus, a clear air floating video can be provided.

By an apparatus including the light source of the present disclosure, a new air floating video information display system being capable of significantly reducing power consumption and excellent in availability can be provided. A technique of the present disclosure can provide, for example, an in-vehicle air floating video information display system being capable of displaying a visually-recognizable, that is, unidirectionality air floating video outside the vehicle through a shield glass including a front windshield glass, a rear windshield glass and a side windshield glass of the vehicle.

Meanwhile, in the related-art air floating video information display system, an organic EL panel or a display panel (also may be referred to as liquid crystal display panel, liquid crystal panel or the like) and a retroreflector are combined as a color-display video source having high resolution. In the air floating video display apparatus based on the related art, the video light diverges at a wide angle. Therefore, when the retroreflector 2 made of the polyhedron shown in FIG. 3B in the first embodiment is used, the ghost image is formed by the video light obliquely entering the retroreflector 2 (retroreflection portion 2*a*) as shown in FIG. 3C in addition to the normal reflection light (the resultant normal air floating video) normally reflected on the retroreflector 2. Accordingly, a quality of the air floating video is reduced. In the air floating video display apparatus based on the related art, a plurality of ghost images depending on the number of the reflection surfaces are formed in addition to the normal air floating video. Therefore, other person than a viewing person (observer) is undesirably allowed to view the same air floating video that is the ghost image, and this case has a large problem also in a viewpoint of security.

First Configuration Example of Air Floating Video Information Display System FIG. 1A shows an example of a use mode of the air floating video information display system of the present embodiment, and shows an explanatory diagram for an entire configuration of the air floating video information display system. In FIG. 1A, for example, the space in the shop or others is partitioned by a show window (also referred to as "window glass") 105 that is a light transmittable member (also referred to as transparent member) such as a glass. According to the present air floating video information display system, the air floating video can be transmitted through the transparent member, and be unidirectionally displayed outside the shop space.

Specifically, according to the present system, light having directionality of a narrow angle and specific polarization wave is emitted as video light flux from a video display apparatus 10. The emitted video light flux temporarily enters the retroreflector 2, is transmitted through the window glass 105 after retroreflection, and forms an air floating video (spatial image) 3 that is an actual image outside the shop space. In FIG. 1A, an inside of the shop that is an inside of the transparent member (in this case, window glass) 105 is illustrated as a depth side while an outside (such as sidewalk) of the window glass 105 is illustrated as a front side. Meanwhile, the window glass 105 may be provided with a member for reflecting the specific polarization wave, and the video light flux may be reflected by the member to form the spatial image at a desirable position inside the shop.

FIG. 1B shows an internal configuration of the video display apparatus 10. The video display apparatus 10 includes a video display 1102 displaying an original image of the spatial image, a video controller 1160 converting the input video in accordance with a resolution of a panel, and a video/audio signal receiver 1130 receiving a video/audio signal as input.

Among these components, the video/audio signal receiver 1130 plays a role of handling a wired input signal through an input interface such as HDMI (High-Definition Multimedia Interface (registered trademark)) and handling a wireless input signal through Wi-Fi (Wireless Fidelity) (registered trademark). And, the video/audio signal receiver 1130 can also individually function as a video receiver/display apparatus. Further, the video/audio signal receiver 1130 can also display/output the video/audio information output from a tablet terminal, a smartphone or others. Still further, a processor (computing processor) such as a stick PC is connectable to the video/audio signal receiver 1130 as necessary. In this case, the entire video/audio signal receiver can be also provided with a performance of a calculation processing, a video analysis processing and others.

[Functional Block of Air Floating Video Information Display System]

FIG. 2 shows a functional block diagram of the air floating video information display system 1. The video display 1102 forms a video by modulating the light transmitted through the video display 1102, based on a video signal. As the video display 1102, for example, a transmission-type liquid crystal display panel may be used. Depending on cases, the video display 1102 may be made of, for example, a reflection-type display panel modulating the light reflected toward the panel on the basis of the video signal, a DMD (Digital Micromirror Device: registered trademark) panel, or the like.

A retroreflection portion 1101 performs the retroreflection of the light modulated by the video display 1102. Of the reflection light from the retroreflection portion 1101, light emitted to the outside of the air floating video information display system 1 forms the air floating video 3. A light source 1105 generates light for the video display 1102. As the light source 1105, for example, a solid-state light source such as an LED light source or a laser light source is used. A power supply 1106 converts an AC current input from the outside into a DC current, and supplies power to the light source 1105. Furthermore, the power supply 1106 supplies necessary DC current to each of the other portions.

A light guiding body 1104 guides light formed at the light source 1105 to irradiate the video display 1102. A combination of the light guiding body 1104 and the light source 1105 can be also called a backlight of the video display 1102. Various types of the combination of the light guiding body 1104 and the light source 1105 can be thought. Specific configuration examples will be described later. Note that a portion made of three components that are the video display 1102, the light guiding body 1104 and the light source 1105 as shown in FIG. 2 is particularly called video display apparatus 10.

An aerial operation detection sensor 1351 is a sensor sensing a range overlapping at least a part of the display range of the air floating video 3 or the entire display range for detecting operation (also referred to as aerial operation) on the air floating video 3 operated with a user's hand finger. A specific sensor configuration of the aerial operation detection sensor 1351 is a ranging (distance) sensor using non-visible light such as infrared light, non-visible light laser, ultrasonic waves, or the like, or may be configured of a combination of a plurality of such sensors so as to detect coordinates on a two-dimensional plane. Also, the aerial operation detection sensor 1351 may be configured of a LiDAR (Light Detection and Ranging) of a TOF (Time Of Flight) scheme described later.

An aerial operation detector 1350 acquires a sensing signal acquired from the aerial operation detection sensor 1351, and calculates, for example, the presence or absence of the contact (touch) on the air floating video 3 operated with the user's hand finger or a position of the contact on the air floating video 3. The aerial operation detector 1350 may be configured of a circuit such as an FPGA.

The aerial operation detection sensor 1351 and the aerial operation detector 1350 (these components may be referred to as sensing system) may be configured to be embedded in the air floating video information display system 1, but may be externally provided as separated from the air floating video information display system 1. When they are provided as separate, these components may be configured so as to be able to transmit information and signals to the air floating video information display system 1 through a wired or wireless communication connection path or video signal transmission path. The aerial operation detection sensor 1351 and the aerial operation detector 1350 may be provided as separate. In this case, it is possible to architect a system in which only the aerial operation detection function can be optionally added to the air floating video information display system 1 as a main body without the aerial operation detection function. Alternatively, only the aerial operation detection sensor 1351 may be provided as separate while the aerial operation detector 1350 may be embedded in the air floating video information display system 1. For example, when it is more desirable to freely arrange the aerial operation detection sensor 1351 from the installation position of the air floating video information display system 1, the structure in which only the aerial operation detection sensor 1351 is as separate is advantageous.

An imager 1180 is so-called camera having an image sensor, and captures a video (image) of a space in the vicinity of the air floating video 3 and/or user's face, arm, finger and others. As the imager 1180, a plurality of cameras or a camera with a depth sensor may be used if needed. The imager 1180 may be provided as separate from the air floating video information display system 1. If the plurality of cameras or the camera with the depth sensor is used as the imager 1180, the imager 1180 may assist the aerial operation detector 1350 to detect the touch operation on the air floating video 3 operated by the user, in other words, the operation of the contact with the plane of the air floating video 3. For example, if the aerial operation detection sensor 1351 is configured to be a sensor for an object entering a plane to be targeted and belonging to the air floating video 3, it may be impossible for only the aerial operation detection sensor 1351 to detect information about how near the object (such as the user's hand finger) not entering the plane yet is to this plane. In this case, by using the depth calculation information based on the result of the video captured by the plurality of cameras of the above-described imager 1180 or the depth information sensed by the depth sensor, a distance between the plane and the object (such as the user's hand finger) not entering the plane of the air floating video 3 can be calculated. The calculation information can be used for various display controls on the air floating video 3.

Alternatively, in the present system, the aerial operation detector 1350 may be configured not to use the aerial operation detection sensor 1351 and to detect the touch operation on the air floating video 3 operated by the user, based on the result of the video captured by the imager 1180.

Also, an image of the face of the user who is operating the air floating video 3 may be captured by the imager 1180, and the controlling portion 1110 may perform user identification/specification processing or user authentication processing. Alternatively, the imager 1180 may be configured to capture an image including surroundings of the user who is operating the air floating video 3 in order to determine whether a different person who is standing around or behind the user takes a peek at the operation of the user on the air floating video 3 or the like.

An operation input portion 1107 is an operation button or a remote-controller light receiver which receives an input of a signal about the user's operation different from the aerial operation on the air floating video 3. The operation input portion 1107 may be used to operate this system by an administrator of the air floating video information display system 1 different from the user who performs the touch operation on the air floating video 3.

A video signal input portion 1131 has a function of connecting an external video output apparatus to input video data. An audio signal input portion 1133 has a function of connecting an external audio output apparatus to input audio data. Meanwhile, an audio signal output portion 1140 has a function of outputting an audio signal based on the audio data input to the audio signal input portion 1133. In addition, the audio signal output portion 1140 may output an audio signal based on audio data such as numbers and letter strings recorded previously in a storage 1170, and data of other operation sounds and error alert sounds. Note that the video signal input portion 1131 and the audio signal input portion 1133 are collectively referred to as the video/audio signal input portion 1130. The video signal input portion 1131 and the audio signal input portion 1133 may have respective configurations, but may be combined to be one component.

The audio signal output portion 1140 is connected to a loudspeaker or a super-directive loudspeaker 30. The audio signal output portion 1140 may be connected to the loudspeaker that outputs audio in a normal audible band. However, particularly, when high confidentiality is required and security needs to be considered as described later in embodiments for a kiosk terminal or the like, the audio signal output portion may be connected to the super-directive loudspeaker so that the person different from the user cannot hear the audio. The super-directive loudspeaker is a loudspeaker having a property allowing only an ear of a person existing in a specific limited spatial region to hear the audio in the audible band but not allowing an ear of a person existing outside the specific spatial region to hear the audio in the audible band.

The super-directive loudspeaker 30 is made of an array of a plurality of ultrasonic output elements capable of emitting an ultrasonic signal of, for example, about 40 kHz on a plane. In this case, the larger the number of ultrasonic output elements for use is, the larger the sound volume of the audio provided by the super-directive loudspeaker is. The principles of the super-directive loudspeaker are briefly described. As well known, ultrasonic wave has higher rectilinear propagation than that of the audio of the audible band (such as talking voice of a person). Therefore, it is possible to make the audio audible only in the specific limited spatial region by, based on the audio signal of the audible band, modulating (for example, preforming AM modulation to) the above-described ultrasonic signal of 40 kHz as a carrier wave.

For example, when the plurality of cameras are used as the imager 1180, the audio is made audible only in a region in vicinity of the user's ears when being output from the super-directive loudspeaker 30 in response to a result of specification of a position of the user's face or ears. Specifically, the audio is made audible only in the specific limited spatial region by control of a phase (in other words, delay time) of each ultrasonic signal input to each ultrasonic output element configuring the super-directive loudspeaker 30. Also, the audio is also made audible only in the specific limited spatial region by a configuration in which the plurality of ultrasonic output elements are arranged not on the plane but also, for example, a concave plane.

A non-volatile memory 1108 stores various types of data for use in the air floating video information display system 1. The data stored in the non-volatile memory 1108 includes, for example, various types of operation data, user interface video information such as an icon and a button, data and layout information of an object to be operated by the user, to be displayed as the air floating video 3. The memory 1109 stores video data and apparatus control data to be displayed as the air floating video 3.

The controlling portion 1110 is equivalent to a controller (in other words, control apparatus) of the air floating video information display system 1, and controls the operation of each portion to be connected. The controller 1110 includes a device such as a processor. The controller 1110 executes processing in accordance with a program loaded from the nonvolatile memory 1108 or the storage 1170 into the memory 1109 or the internal memory. As a result, various functions are achieved. The controller 1110 may perform computing processing based on information acquired from each connected portion in cooperation with the program stored in the memory 1109. The controller 1110 may be mounted in a housing configuring the air floating video information display system 1 using a microcomputer or the like, or may be connected and mounted outside the housing.

A communication portion 1132 communicates with an external apparatus, an external server, or the like through a wired or wireless communication interface. The communication portion 1132 transmits and receives a video, an image, an audio, and various pieces of data through the communication.

The storage 1170 records a video, an image, an audio, various pieces of data, and the like. For example, a video, an image, an audio, various pieces of data, and the like may be recorded in the storage 1170 previously at the time of product shipment. A video, an image, sound, various pieces of data, and the like acquired from an external apparatus, an external server, or the like through the communication portion 1132 may be recorded in the storage 1170. A video, an image, various pieces of data, and the like recorded in the storage 1170 can be output as the air floating video 3 through the video display 1102, the video display apparatus 10, and the retroreflection portion 1101.

The data of the video or the image to be recorded in the storage 1170 may also include data such as an icon, a button, an object to be operated by the user, and the like displayed as the user interface (including an operation menu and a concierge video to be described later) on the air floating video 3 and data configuring the concierge video. Further, the various pieces of data to be recorded in the storage 1170 may include layout information of the operation menu of the icon, button, object or the like and the concierge to be displayed as the user interfaces on the air floating video 3, and various pieces of metadata information regarding the operation menu and the concierge. Further, audio data causing the concierge of the air floating video 3 to output the audio may also be recorded in the storage 1170. The audio data recorded in the storage 1170 may be output as the audio signal from the loudspeaker or the super-directive loudspeaker 30 through the audio signal output portion 1140.

The controller 1110, the video controller 1160 or the audio signal output portion 1140 may appropriately create the video data or the audio data for displaying and outputting the operation menu or the concierge, based on various pieces of data for configuring the operation menu or the concierge stored in the storage 1170, the nonvolatile memory 1108, or the like.

The video controller 1160 performs various controls on the video signals input to the video display 1102. For example, the video controller 1160 may perform video switching control for selecting which video among the video stored in the memory 1109, the video input by the video signal input portion 1131, and the like is to be input to the video display 1102. Alternatively, the video controller 1160 may perform control of superimposing the video stored in the memory 1109 and the video input by the video signal input portion 1131 to generate a combined video to be input to the video display 1102. Furthermore, the video controller 1160 may control image processing on the video data input by the video signal input portion 1131, the video stored in the memory 1109, and the like. Examples of the image processing include scaling processing of enlarging, shrinking, and deforming an image, brightness adjustment processing of changing luminance, contrast adjustment processing of changing a contrast curve of an image, and retinex processing of decomposing an image into components of light and changing weighting for each component.

Furthermore, the video controller 1160 may perform special effect video processing or the like for assisting the user's aerial operation on the video to be input to the video display 1102. The special effect video processing may be controlled based on the detection result of the user operation by the aerial operation detector 1350 or the imaging result of the user using the imager 1180.

As described above, various functions can be mounted on the air floating video information display system 1. However, the air floating video information display system 1 does not necessarily have all of the above-described configurations. The air floating video information display system 1 may have any configuration as long as it has at least a function of generating the air floating video 3.

[First Method for Forming Air Floating Video]

Figure 3:
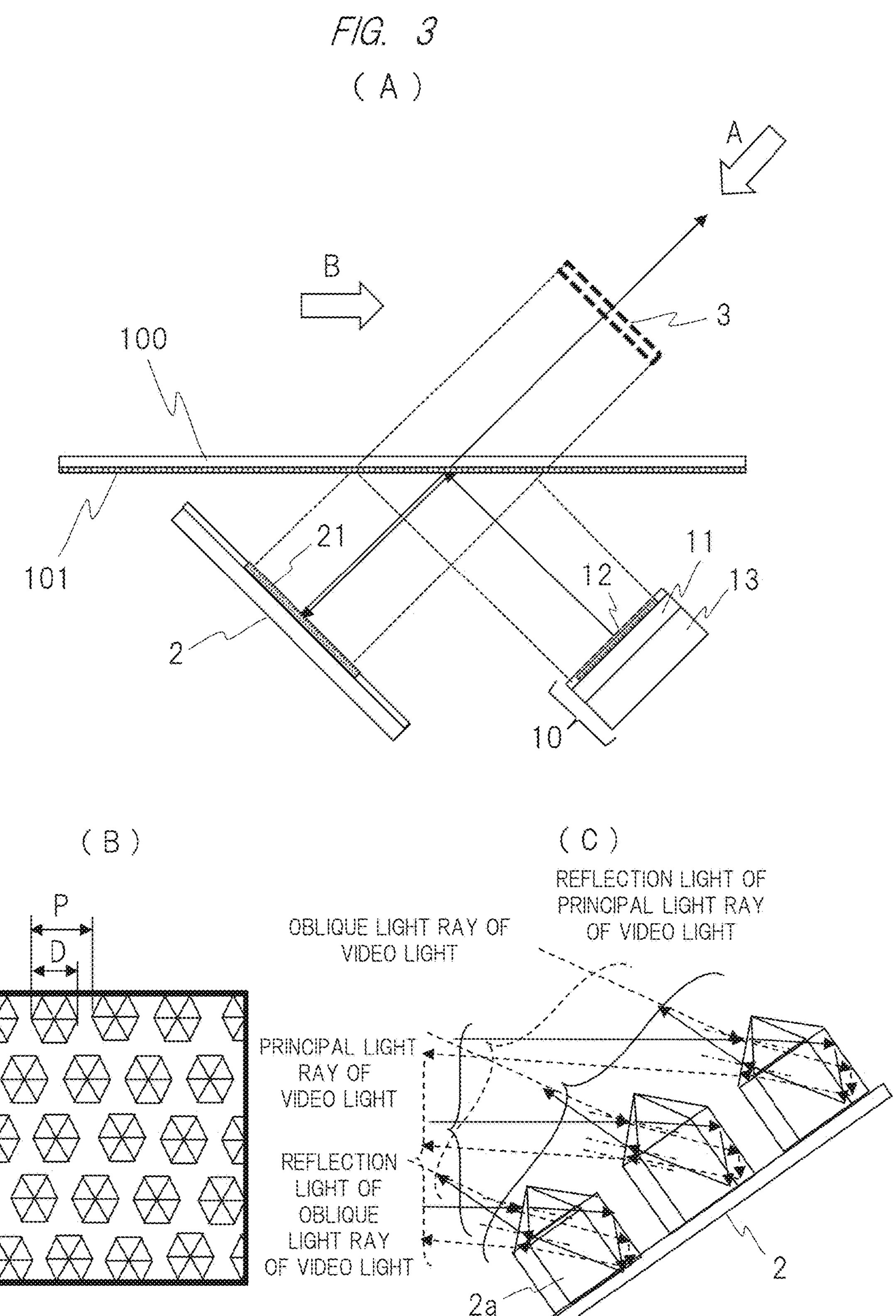
FIG. 3 is a diagram illustrating an example of configurations of a principal part and a retroreflection portion of an air floating video information display system according to an embodiment.

FIG. 3 illustrates a configuration of a principal part of the air floating video information display system of the embodiment, and also illustrates an example (referred to as a first method) regarding the formation of the air floating video 3 and the configuration of the retroreflector 2.

As illustrated in FIG. 3A, the air floating video information display system includes the video display apparatus 10 that diverges the video light of the specific polarization wave at a narrow angle toward an oblique direction with respect to a transparent member 100 that is a transmissive plate such as glass having transmittance. The video display apparatus 10 includes a liquid crystal display panel 11 and a light source 13 that generates the light of the specific polarization wave having the narrow divergence property.

The video light of the specific polarization wave emitted from the video display apparatus 10 is reflected by a polarization splitter 101 provided on the transparent member 100 and having a film that selectively reflects the video light of the specific polarization wave, and the reflection light is made incident on the retroreflector 2. In FIG. 3, the sheet-shaped polarization splitter 101 is adhered to the transparent member 100.

The retroreflector 2 is provided in the other oblique direction with respect to the transparent member 100. A video-light entering surface of the retroreflector 2 is provided with a λ/4 plate 21 (in other words, a ¼ waveplate). The video light is converted in terms of light polarization from the specific polarization wave (one polarization wave) to the other polarization wave when being transmitted through the λ/4 plate 21 twice in total that are the entering to and the emission from the retroreflector 2.

Here, the polarization splitter 101 that selectively reflects the video light of the specific polarization wave has a property of transmitting the polarization light of the other polarization wave formed after the polarization conversion. Therefore, the video light of the other polarization wave after the polarization conversion is transmitted through the polarization splitter 101. As illustrated in the drawing, the video light having been transmitted through the polarization splitter 101 forms the air floating video 3 that is an actual image outside the transparent member 100.

Note that the light forming the air floating video 3 is aggregation of light rays converging from the retroreflector 2 to the optical image of the air floating video 3, and these light rays rectilinearly propagate even after being transmitted through the optical image of the air floating video 3. Therefore, the air floating video 3 is a video having high directionality as different from the diverged video light formed on a screen by a general projector or the like.

Therefore, in the configuration of FIG. 3, when the user visually recognizes the air floating video 3 in a direction of an arrow A, the air floating video 3 is visually recognized as a bright video. However, when a different person visually recognizes the air floating video 3 in, for example, a direction of an arrow B, the air floating video 3 cannot be visually recognized as a video at all. Such a property of the air floating video 3 is very suitable when being applied to a system displaying a video requiring high security, a video having high confidentiality that needs to be secured for a person facing the user or the like.

Note that the polarization axes of the reflected video light may be ununified depending on the performance of the retroreflector 2. In this case, a part of the video light having the ununified polarization axes is reflected by the polarization splitter 101 described above, and return to the video display apparatus 10. The part of the video light is reflected again by the video display surface of the liquid crystal display panel 11 configuring the video display apparatus 10 to generate the ghost image. This may be a cause of the reduction in the image quality of the air floating video 3.

Therefore, in the present embodiment, the video display surface of the video display apparatus 10 is provided with an absorption-type light polarizer 12. In the absorption-type light polarizer 12, the re-reflection can be suppressed since the video light emitted from the video display apparatus 10 is transmitted through the absorption-type light polarizer 12 while the reflection light returning from the polarization splitter 101 is absorbed by the absorption-type light polarizer 12. Therefore, according to the present embodiment using the absorption-type light polarizer 12, the reduction in the image quality due to the ghost image of the air floating video 3 can be prevented or suppressed.

The above-described polarization splitter 101 may be made of, for example, a reflection-type light polarizer, a metal multilayer film that reflects the specific polarization wave, or the like.

FIG. 3B shows a configuration example of the retroreflector 2 using the first method. FIG. 3B shows a surface shape of a retroreflector produced by Nippon Carbide Industries Co., Inc., used as the typical retroreflector 2 for the present study. A surface of this retroreflector 2 has hexagonal-prism retroreflectors (retroreflector elements) 2*a* orderly arrayed. The light ray entering the hexagonal prism is reflected on a wall surface and a bottom surface of the hexagonal prism, is emitted as retroreflection light in a direction corresponding to the incident light, and displays the air floating video 3 that is an actual image, based on the video displayed on the video display apparatus 10.

Resolution of this air floating video 3 significantly depends on not only the resolution of the liquid crystal display panel 11 but also an outer shape (diameter) "D" and a pitch "P" of the retroreflection portion 2*a* of the retroreflector 2 shown in FIG. 3B. For example, when a WUXGA liquid crystal display panel 11 of 7 inches (1920×1200 pixels) is used, even if one pixel (corresponding one triplet) is about 80 μm, if the diameter D and the pitch P of the retroreflection portion 2*a* are, for example, 240 μm and 300 μm, respectively, one pixel of the air floating video 3 is equivalent to 300 μm. Therefore, effective resolution of the air floating video 3 decreases down to about ⅓. Accordingly, in order to make the resolution of the air floating video 3 equal to the resolution of the video display apparatus 10, it is desirable to make the diameter D and the pitch P of the retroreflection portion 2*a* close to one pixel of the liquid crystal display panel 11. Meanwhile, in order to suppress the moire based on the pixels of the liquid crystal display panel 11 and the retroreflection portion 2*a*, each pitch ratio may be designed to deviate from an integral multiple of one pixel. Regarding the shape, all sides of the retroreflection portion 2*a* may be arranged not to overlap all sides of one pixel of the liquid crystal display panel 11.

Meanwhile, in order to manufacture the retroreflector 2 at a low cost, the retroreflector 2 may be shaped by a roll press method. Specifically, this method is a method of arranging and forming the retroreflection portion 2*a* on a film. This method forms a necessary shape by forming an inverse shape of the formed shape on a roll surface, applying an ultraviolet curing resin onto a base material for fixation, and causing the portion to pass through a gap between the rolls, and then, hardens the shape by emitting the ultraviolet ray thereto. This manner provides the retroreflector 2 having a desirable shape.

[Second Method for Forming Air Floating Video]

Next, FIG. 4 illustrates another example (referred to as a second method) regarding the formation of the air floating video 3 and the configuration of the retroreflector in the air floating video information display system of the present embodiment. FIG. 4A illustrates an outline of formation of the air floating video 3 using a retroreflector 330 in the second method. With respect to the retroreflector 330, light from an object P (corresponding point P) in one space (in this example, a space lower in a Z-direction) enters and is retroreflected by the retroreflector 330 to form an air floating video 331 (corresponding point Q) in the other space (in this example, an upper space in the Z-direction).

As a representative retroreflector 330, FIG. 4B illustrates a surface shape for explaining an operation principle of a retroreflector manufactured by Asukanet Co., Ltd, used for the present study. A surface (X-Y surface in the drawing) of the retroreflector 330 has a four-sided structure (in other words, a tetrahedron) 330A regularly arrayed. A plurality of structures 330A are arranged between side walls 330B. The four-sided structure 330A is, for example, a micromirror having a quadrangular prism shape extending in the Z-direction. For example, light (also referred to as object light) emitted from the object P enters the four-sided structure 330A. The light ray entering the four-sided structure 330A is reflected by two surfaces (for example, a reflecting surface RS1 and a reflecting surface RS2) of the wall surfaces of the four-sided structure 330A. The reflection light rays (both the light ray emitted upward from the reflecting surface RS1 and the light ray emitted upward from the reflecting surface RS2) are indicated as reflection light R0. The reflection light R0 is emitted as retroreflection light in a direction corresponding to the incident light, and forms and displays the air floating video 331 that is an actual image based on the object P as illustrated in FIG. 4A.

Resolution of this air floating video 331 also significantly depends on an outer shape (diameter) "DS" and a pitch "PT" of the retroreflection portion (the four-sided structure 330A) of the retroreflector 330 as similar to the retroreflector 2 of the first method shown in FIG. 3. For example, when a WUXGA liquid crystal display panel of 7 inches (1920×1200 pixels) is used, even if one pixel (corresponding one triplet) is about 80 μm, if the outer shape (diameter) D and the pitch PT of the retroreflection portion are, for example, 120 μm and 150 μm, respectively, one pixel of the air floating video 331 is equivalent to 150 μm. Therefore, effective resolution of the air floating video 331 decreases down to about ½. Accordingly, in order to make the resolution of the air floating video 331 equal to the resolution of the video display apparatus 10, it is desirable to make the diameter DS and the pitch PT of the retroreflection portion (structure 330A) close to one pixel of the liquid crystal display panel. Meanwhile, in order to suppress the moire based on the pixels of the liquid crystal display panel and the retroreflector 330, each pitch ratio may be designed to deviate from an integral multiple of one pixel as described above. Regarding the shape, all sides of the retroreflection portion (structure 330A) may be arranged not to overlap all sides of one pixel of the liquid crystal display panel.

Note that the light forming the air floating video 331 is aggregation of light rays converging from the retroreflector 330 to the optical image of the air floating video 331, and these light rays rectilinearly propagate even after being transmitted through the optical image of the air floating video 331. Therefore, the air floating video 331 is a video having high directionality as different from the diverged video light formed on a screen by a general projector or the like.

In the configuration of FIG. 4, when the user visually recognizes the air floating video 331 in a direction of an arrow A, the air floating video 331 is visually recognized as a bright video. However, when a different person visually recognizes the air floating video 3 in, for example, a direction of an arrow B, the air floating video 331 cannot be visually recognized as a video at all. Such a property of the air floating video 331 is very suitable when being applied to a system displaying a video requiring high security, a video having high confidentiality that needs to be secured for a person facing the user or the like, as similar to the air floating video using the retroreflector 2 of the first method.

Note that, in the retroreflector 330 of the second method, as illustrated in FIG. 4B, the light emitted from the object P enters the retroreflector 330 from one side (lower side in the Z-direction), is reflected by two reflecting surfaces (RS1, RS2) provided on the four-sided wall surfaces configuring the retroreflector 330, and images the air floating video 331 as the reflection light R0 at the position of the point Q on the other side (upper side in the Z-direction). At this time, on the two reflecting surfaces (RS1, RS2), abnormal lights R1 and R2 are generated as light having a reflection direction different from that of the reflection light R0. The ghost images 332 and 333 as illustrated in FIG. 4A are generated by the abnormal lights R1 and R2 generated on the two reflecting surfaces (RS1, RS2). Therefore, the ghost images 332 and 333 may be a cause of the reduction in the image quality of the air floating video 331.

As described above, in the retroreflector 2 of the first method, the ghost image is generated in accordance with the number of reflecting surfaces. On the other hand, in the retroreflector 330 of the second method, the ghost image is generated only in specific two directions due to the incident angle of the object light. Therefore, the retroreflector 330 of the second method is less affected by the ghost image, and the air video display with high image quality can be performed. Therefore, only a case of application of the retroreflector 330 of the second method to the following air floating video display apparatus and air floating video information display system will be described.

[Technical Means for Reducing Ghost Image]

In order to achieve an air floating video display apparatus or the like capable of forming a high-quality air floating video with less ghost images, an emitting surface of a liquid crystal display panel may be provided with a video light control sheet for controlling a divergence angle of the video light emitted from the liquid crystal display panel as the video display element to bend the video light in a desired direction. Furthermore, the light-ray emitting surface of the retroreflector 330, the light-ray entering surface of the same, or both surfaces of the same may be provided with the video light control sheet to absorb the abnormal lights R1 and R2 (FIG. 4B) that are the cause of the formation of the ghost images.

Figure 5:
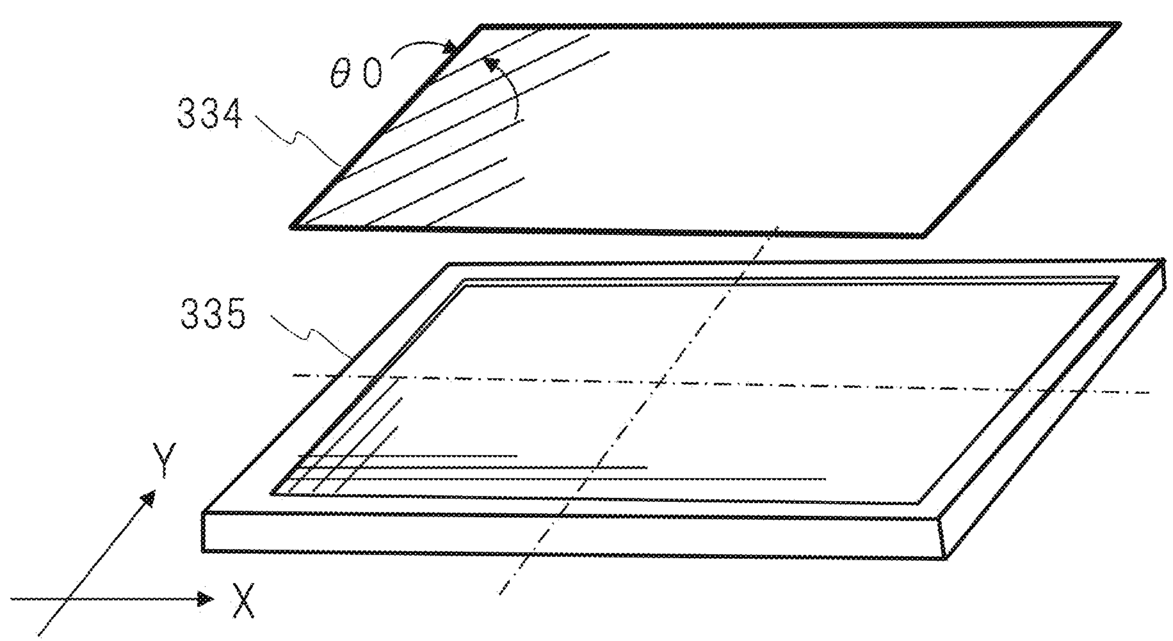
FIG. 5 is a perspective view illustrating an arrangement example of members that block abnormal light rays formed by retroreflection according to an embodiment.

FIG. 5 illustrates specific method and configuration example of applying the video light control sheet to the air floating video display apparatus. In FIG. 5, an emitting surface of a liquid crystal display panel 335 which is the video display element is provided with a video light control sheet 334. In FIG. 5, the emitting surface of the liquid crystal display panel 335 is illustrated as a plane (X-Y plane) formed by the illustrated X-axis and Y-axis. The video light control sheet 334 has a light transmitting portion and a light absorbing portion on the main plane (X-Y plane). In this case, the moire may be generated by interference between the pixel of the liquid crystal display panel 335 and the pitch between the light transmitting portion and the light absorbing portion of the video light control sheet 334. In order to reduce this moire, the following two methods are effective.

(1) As a first method, vertical fringes (oblique lines in the drawing) generated by the light transmitting portions and the light absorbing portions of the video light control sheet 334 are arranged to incline by a predetermined angle (inclination) "θ0" from the arrangement of pixels (the X-axis and the Y-axis) of the liquid crystal display panel 335.

(2) As a second method, in an assumption that the pixel dimension of the liquid crystal display panel 335 is "A" while the pitch between the vertical stripes of the video light control sheet 334 is "B", a ratio (B/A) thereof is selected to a value deviating from an integral multiple. Since one pixel of the liquid crystal display panel 335 is made of parallel-arrayed sub-pixels of three colors that are RGB and is of generally square, the generation of the moire described above cannot be suppressed in the entire screen. Therefore, the inclination θ0 described in the (1) first method may be optimized within a range of 5 degrees to 25 degrees so that a position of the generation of the moire can be intentionally shifted to a position at which the air floating video is not displayed.

The liquid crystal display panel and the video light control sheet 334 have been described as the subject matter in order to reduce the moire. When the retroreflector 330 is provided with the video light control sheet 334, the similar method and configuration can be applied in a case of the moire generated between the retroreflector 330 and the video light control sheet 334. Since the retroreflector 330 and the video light control sheet 334 both have linear structures, the video light control sheet 334 may be optimally inclined while targeting the X-axis and the Y-axis of the retroreflector 330. As a result, a large moire that has a long wavelength and a low frequency and that can be visually recognized can be reduced.

Figure 6:
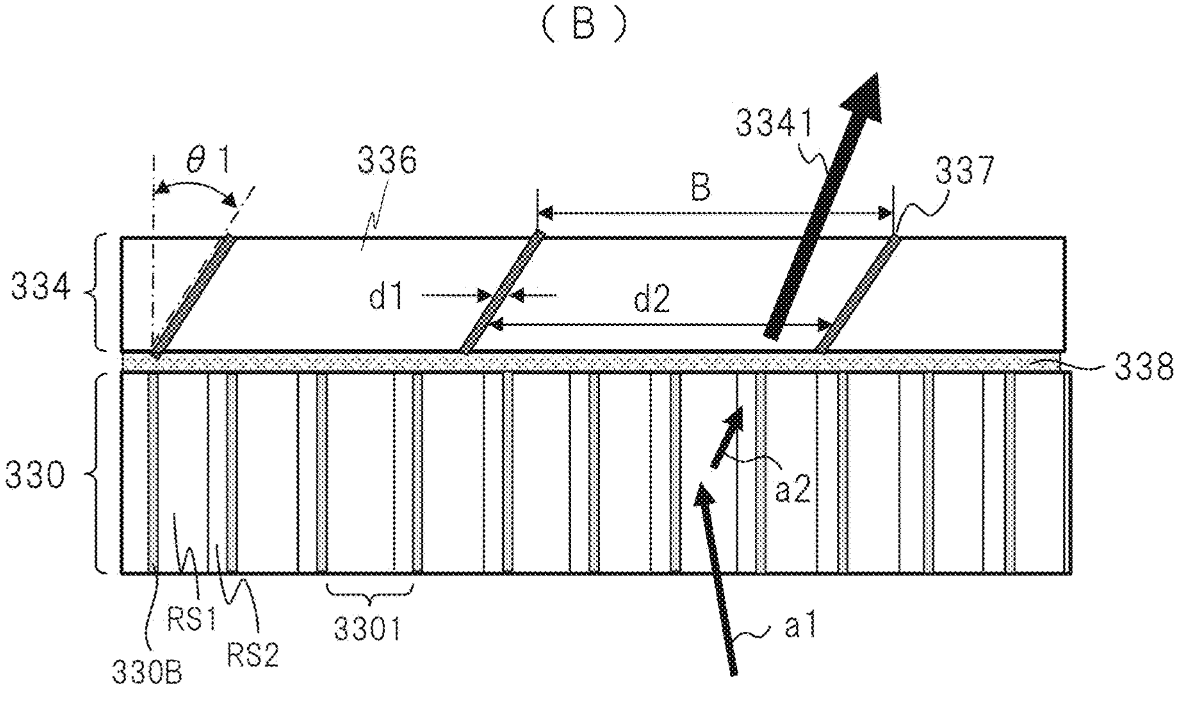
FIG. 6 is a cross-sectional view illustrating an arrangement example of members that block abnormal light rays formed by retroreflection according to an embodiment.

FIG. 6A illustrates a vertical cross-sectional view of the video display apparatus 10 having a configuration in which the video light control sheet 334 is arranged on a video light emitting surface 3351 of a liquid crystal display panel 335. The video light control sheet 334 is made of the light transmitting portions 336 and the light absorption portions 337 that are alternately arranged on the main plane, and is adhesively fixed to the video light emitting surface 3351 of the liquid crystal display panel 335 by an adhesive layer 338.

In addition, as described above, when a WUXGA liquid crystal display panel of 7 inches (1920×1200 pixels) is used as the video display apparatus 10, even if one pixel (corresponding one triplet) (illustrated with "A" in the drawing) is about 80 μm, the ghost images 332 and 333 formed on both sides of the air floating video 331 in FIG. 4A can be reduced by the following configuration. For example, as the pitch B of the video light control sheet 334, a pitch B made of a distance d2 of the light transmitting portion 336 of 300 μm and a distance d1 of the light absorbing portion 337 of 40 μm is set to 340 μm. In this case, the ghost image can be reduced by the video light control sheet 334 having the sufficient transmission property and controlling the divergence property of the video light emitted from the video display apparatus 10 that causes the abnormal light. In this case, when a thickness of the video light control sheet 334 is ⅔ of the pitch B or more, the ghost reduction effect is significantly improved.

FIG. 6B is a vertical cross-sectional view of a configuration in which the video-light emitting surface of the retroreflector 330 (FIG. 4) is provided with the video light control sheet 334. The video light control sheet 334 is made of the light transmitting portions 336 and the light absorbing portions 337 that are alternately arranged, and inclines by a predetermined inclination angle θ1 from the retroreflector 330 to match with the emission direction of the retroreflection light 3341. As a result, the video light control sheet 334 can absorb the abnormal lights R1 and R2 (FIG. 4B) generated by the above-described retroreflection, and on the other hand, can transmit the normal reflection light as the retroreflection light 3341 without loss.

In the retroreflector 330, a space 3301 corresponding to the retroreflection portion based on the above-described four-sided structure 330A (FIG. 4) is arranged. The space 3301 corresponding to the retroreflection portion is partitioned by the surface of the side wall 330B. The space 3301 includes, for example, the reflecting surface RS1 and the reflecting surface RS2. The light "a1" entering the retroreflector 330 from, for example, the lower side is reflected by, for example, the reflecting surface RS1 of the space 3301, and the reflection light "a2" is further reflected by, for example, the reflecting surface RS2, and is emitted to the upper side of the retroreflector 330. The emitted light enters the video light control sheet 334, and is emitted as the retroreflection light 3341.

When a WUXGA liquid crystal display panel of 7 inches (1920×1200 pixels) is used, even if one pixel (corresponding one triplet) is about 80 μm, the ghost images 332 and 333 formed on both sides of the air floating video 331 can be reduced by the configuration in FIG. 4A. For example, as illustrated in FIG. 6B, as the pitch B of the video light control sheet 334, a pitch B made of a distance d2 of the light transmitting portion 336 of the retroreflector 330 of 400 μm and a distance d1 of the light absorbing portion 337 of 20 μm is set to 420 μm. In this case, the ghost image can be reduced by the video light control sheet 334 having the sufficient transmission property and controlling the divergence property of the video light emitted from the video display apparatus 10 that causes the abnormal light in the retroreflector 330.

On the other hand, the above-described video light control sheet 334 also prevents external light emitted from the outside from entering the air floating video display apparatus, and therefore, leads to improvement of reliability of the components. For the video light control sheet 334, for example, a viewing-angle control film (VCF) manufactured by Shin-Etsu Polymer Co., Ltd., is suitable. A structure of the VCF has a sandwich structure in which transparent silicon and black silicon are alternately arranged while the light entering/emitting surface is provided with a synthetic resin. Therefore, the above-described effect can be expected when the VCF is applied as the video light control sheet 334 of the present embodiment.

[Technique for Sensing Operation on Air Floating Video]

The user (may be also referred to as user, an observer, an operator or the like) is bidirectionally connected to the system through the air floating video 3 (FIG. 2 and the like) formed by the air floating video information display system 1. In other words, by viewing and operating the air floating video 3, the user uses an application (such as a ticket vending function of a kiosk terminal) of the system. Therefore, there is a need for a sensing technique for sensing a virtual operation of the air floating video 3 operated by the user. An example of this sensing technique will be described below with respect to specific examples. The "sensing technique" described here includes the aerial operation detection sensor 1351 and the aerial operation detector 1350 described with reference to FIG. 2, and is a technique for detecting the user's operation (in other words, aerial operation) particularly in a three-dimensional space. The aerial operation detection sensor 1351 and the aerial operation detector 1350 may be referred to as a sensing system.

FIG. 7A illustrates a principle diagram for explaining the first sensing technique. An air floating video FI formed by the air floating video information display system 1 is divided into a plurality of areas (in other words, regions). In the present embodiment, the air floating video FI is vertically and horizontally divided into twelve areas of "3×4=12". In FIG. 7A, a plane of the air floating video FI is illustrated as the x-y plane, and a front-back direction of the plane is illustrated as a "z" direction. For example, an illustrated area A301 is one upper left area of the sensing plane a3.

Figure 9:
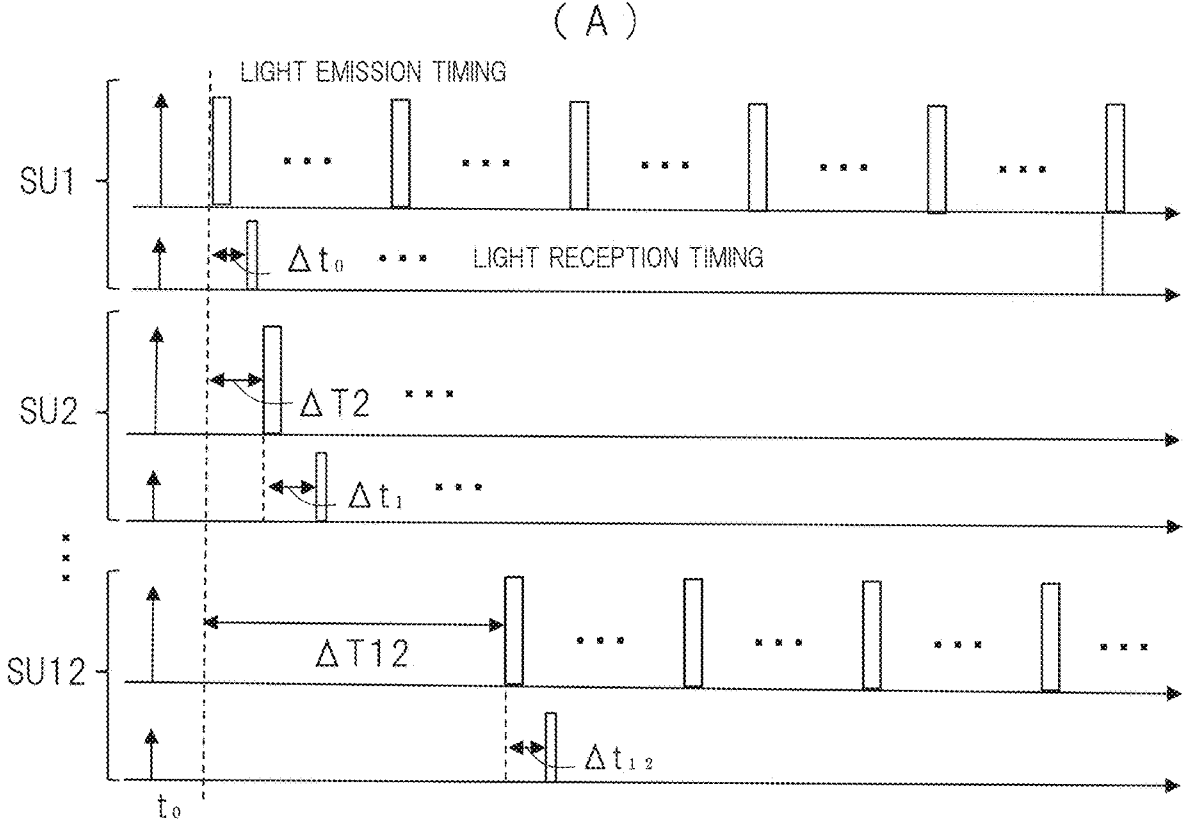
FIG. 9 is an explanatory diagram of an operation and an apparatus of a sensing system used in an air floating video information display system according to an embodiment.

In the first sensing technique, a first ranging apparatus 340 including a time of flight (TOF) system corresponding to each area of the air floating video FI is provided. The first ranging apparatus 340 is provided instead of the aerial operation detection sensor 1351 of FIG. 2. A light emitting diode (LED) that is a light source is caused to emit light from a light emitter of the first ranging apparatus 340 in synchronization with a signal of the system. A light emission side of the LED is provided with an optical element for controlling the divergence angle, and a pair of high-sensitivity avalanche diodes (ABD) having picosecond time resolution are aligned as light receivers in four vertical columns and three horizontal rows so as to correspond to the twelve areas. A phase (Δt described in FIG. 9 later) shifts only during a period of time between the timing of the light emission of the LED that is the light source in synchronization with the signal from the system and the timing of the light return to the light receiver through the reflection of the light by the ranging-target object (here, the tip of the user's hand finger UH).

A computing unit of the sensing system illustrated in FIG. 9B receives the signal from the system and the signal generated by the avalanche diode that is the light receiver of the first ranging apparatus 340, and calculates the phase shift from these signals to calculate the distance to the object. The distance is calculated for each TOF system (TOF1 to TOF12) corresponding to each area. As measurement hierarchies of the ranging apparatus 340, FIG. 7A illustrates sensing planes a3, a2, and a1 (may be also referred to as a first sensing plane a3, a second sensing plane a2, and a third sensing plane a1) to be nearer in the z direction to the object (hand finger UH) in this order with respect to the plane of the air floating video FI, and further illustrates a sensing plane a0 to be farther from the air floating video FI. A distance L1 indicates a distance to the sensing plane a0, a distance L2 indicates a distance to the sensing plane a1, a distance L3 indicates a distance to the sensing plane a2, and a distance L4 indicates a distance to the sensing plane a3.

Next, as the system, the sensing system recognizes a direction of movement of the object (hand finger UH) by recognizing which area of the twelve areas the object has passed in each of the measurement hierarchies (sensing planes a3 to a1), and calculating the movement time at each of the measurement hierarchies by the above-described method.

FIG. 9A illustrates the light emission timing of the LED light source and the light reception timing of the light receiver for each of the twelve measurement areas. Terms "SU1" to "SU12" indicate light emission timing and light reception timing for each sensing unit corresponding to each area and TOF. The sensing system unifies individual pieces of data by delaying the light emission timing of the LED for each of the twelve measurement areas.

Practically, it is assumed that the user intentionally reaches the hand finger UH toward the air floating video FI to be desirably bidirectionally connected to the system. In this case, the sensing system obtains, for example, a first sensing signal S1 sensed in the area A301 on the sensing plane a3 farthest from the air floating video FI, for example, a second sensing signal S2 sensed in a specific area of the sensing plane a2, and, for example, a third sensing signal S3 sensed in a specific area of the third sensing plane a1. The sensing system obtains a contact position with the air floating video FI from calculation using the moving direction of the hand finger UH and the time difference in the crossing at each sensing plane, based on these sensing signals (S1 to S3).

In order to acquire the position information with higher accuracy, the sensing plane a0 at a position far away from the air floating video FI in a depth direction (back direction) is set. The sensing system detects the passage of the hand finger UH through the air floating video FI as an end signal based on the sensing at the sensing plane a0, and obtains a contact point with the air floating video FI as three-dimensional coordinates from position coordinates of this sensing and the above-described two sensing signals.

Furthermore, FIG. 7B illustrates an operation of selecting a part of the air floating video FI by the user's hand finger UH (particularly, fingertip) and an operation of moving the user's hand finger UH away from the part of the air floating video FI. As illustrated in FIG. 7B, the first sensing technique provides the following state when the user makes the contact with the desired position coordinates of the air floating video FI, and then, returns the hand finger UH. That is, the sensing system sequentially transmits the first sensing signal S1 sensed at the first sensing plane a1, the second sensing signal S2 sensed at the second sensing plane a2, and the third sensing signal S3 sensed at the third sensing plane a3 to the computing unit of the sensing system, and performs calculation processing. As a result, the system recognizes that the user's hand finger UH has moved away from the specific coordinates of the air floating video FI.

Next, a more accurate sensing technique for virtually operating the air floating video will be described below.

FIG. 8A illustrates a principle diagram for explaining the second sensing technique. The second sensing technique is different from the first sensing technique illustrated in FIG. 7A in that a second ranging apparatus 341 is arranged in addition to the first ranging apparatus 340 to achieve the more accurate sensing. The first ranging apparatus 340 and the second ranging apparatus 341 may be used in combination. In the second sensing technique, the second ranging apparatus 341 (particularly, a CMOS sensor) is used as the second sensing system in combination with the first sensing system. As illustrated in FIG. 8A, the second ranging apparatus 341 performs sensing while targeting a range (sensing planes a1, a2, a3, a0) as similar to that of the first ranging apparatus 340.

As described above, the first ranging apparatus 340 includes a TOF system corresponding to each of the plurality of areas divided into, for example, twelve areas in the air floating video FI (the first sensing system in FIG. 8B). On the other hand, to the second ranging apparatus 341, a two-dimensional image sensor such as a ¼-inch CMOS sensor for sensing camera is applied. An aspect ratio of the CMOS sensor is generally 3:4. Therefore, in the present embodiment, in accordance with the aspect ratio of the CMOS sensor, the sensing area of the TOF system of the first ranging apparatus 340 is also divided into twelve areas in total that are three areas in the vertical direction and four areas in the horizontal direction as described above.

In addition, although resolution of even about 1 million pixels is sufficient for resolution of the CMOS sensor, it is not necessary to provide an RGB color separation filter as different from a normal camera system. Therefore, in viewpoint of the same number of pixels, the CMOS sensor can achieve not only downsizing and high sensitivity but also achieve high sensitivity to near-infrared light. Therefore, in the second sensing technique, the object (the tip of the hand finger UH) to be measured in distance by the light-source light of the TOF system of the first ranging apparatus 340 is illuminated at the timing determined for each area, and therefore, the detection accuracy is significantly improved. Although not described in detail, FIG. 9B illustrates the above-described system as a functional block diagram.

FIG. 8B illustrates the sensing planes a1, a2, and a3 measured by the first ranging apparatus 340 and sensing planes b1, b2, and b3 measured by the second ranging apparatus 341 to correspond to the sensing planes. And, FIG. 8B illustrates an operation of selecting a part of the air floating video FI by the hand finger UH or an operation of moving it away from the part with respect to the sensing planes. As illustrated in FIG. 8B, the air floating video information display system using the second sensing technique provides the following state when the user intentionally reaches the hand finger UH toward the air floating video FI. In this case, three-dimensional information based on the second ranging apparatus 341 is provided in addition to the three-dimensional information based on the first ranging apparatus 340 described above. The in-plane resolution of the sensing plane b3 of the second ranging apparatus 341 corresponding to the sensing plane a3 of the first ranging apparatus 340 farthest from the air floating video FI can be made accurate in accordance with the resolution of the used CMOS sensor. Similarly, the sensing plane b2 corresponds to the sensing plane a2, and the sensing plane b1 corresponds to the sensing plane a1. As a result, it is possible to achieve a sensing system having the significantly improved in-plane resolution.

At this time, regarding the moving direction of the object (the tip of the user's hand finger UH), a contact position with the air floating video FI is obtained by calculation from the time difference in the crossing at each sensing plane of the first ranging apparatus 340 and the second ranging apparatus 341. In order to acquire the position information with higher accuracy, the sensing plane a0 away in the depth direction from the air floating video FI is set. The sensing system can detect the passage of the hand finger UH through the air floating video FI as an end signal, and calculate the contact point with the air floating video FI as three-dimensional coordinates with higher definition from the position coordinates on the sensing plane a0 and the above-described two sensing signals. In addition, when the frame rate of the CMOS sensor is increased from 1/20 seconds to 1/30 seconds or 1/120 seconds, the plane information captured per unit time increases in addition to the detection accuracy in the plane direction, and therefore, the resolution is significantly improved. At this time, the detection information based on the second sensing technique and the position information based on the first sensing technique are systematized by a synchronization signal supplied from the system.

Furthermore, as illustrated in FIG. 8B, when the user returns the hand finger UH after contacting the desired position coordinates of the air floating video FI, the first sensing signal S1 sensed on the first sensing plane a1, the second sensing signal S2 sensed on the second sensing plane a2, and the third sensing signal S3 sensed on the third sensing plane a3 are sequentially transmitted to the computing unit of the sensing system as similar to the first sensing technique described above. Then, from the calculation processing in the computing unit, the system recognizes that the user's hand finger UH has moved away from the specific coordinates of the air floating video FI.

In the LED light source used in the TOF sensor of the first ranging apparatus 340 of the sensing system described above, the reduction in accuracy of the ranging apparatus for the external light such as sunlight is prevented, and the near infrared light having high light energy in a region exceeding a visible light range (380 nm to 780 nm) that cannot be visually recognized with bare eyes is preferably used.

Figure 10:
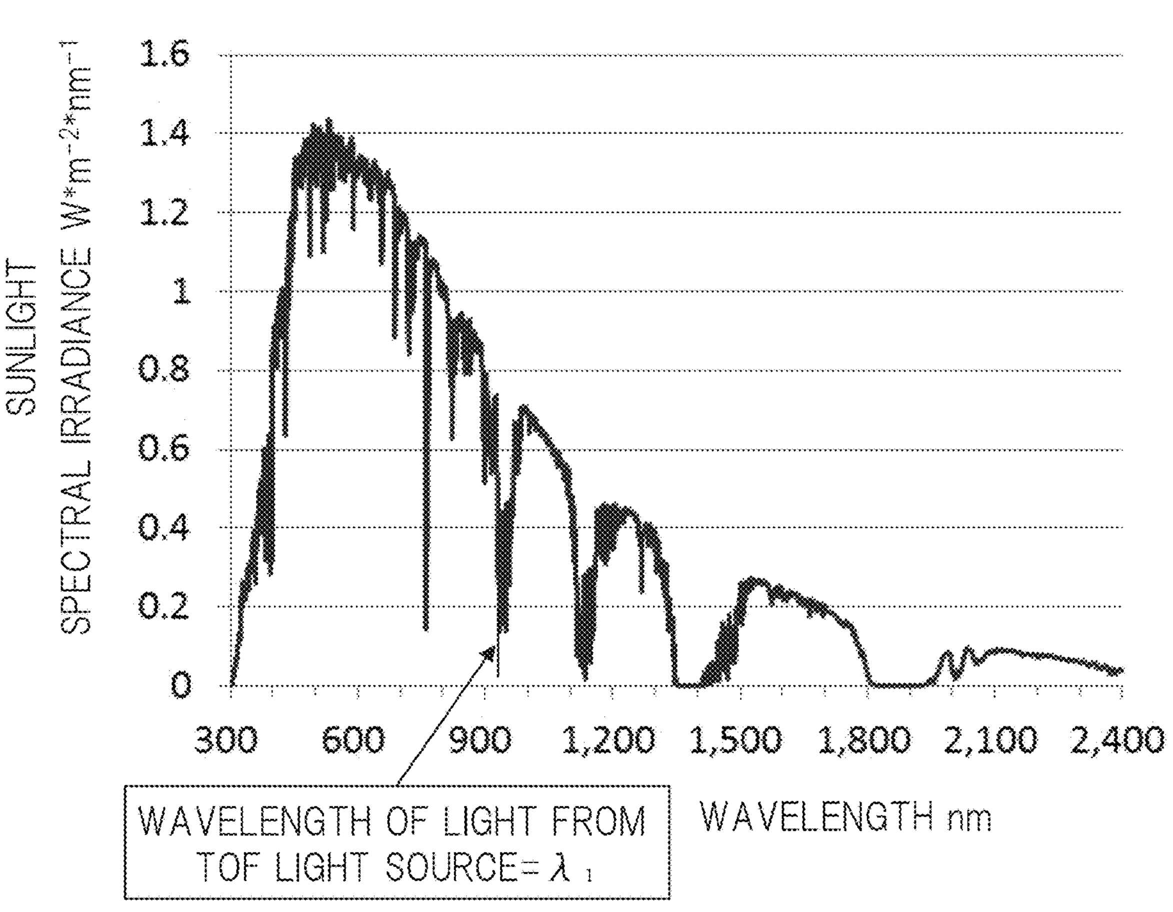
FIG. 10 is a diagram illustrating properties of spectral irradiance of sunlight.

FIG. 10 illustrates a property diagram of spectral irradiance of sunlight. As a wavelength of the light-source light of the LED of the TOF sensor, light having a wavelength λ1 of 920 nm having a small energy of the spectral irradiance of sunlight illustrated in FIG. 10 may be used.

<Technique of Inputting Letter or Figure to Air Floating Video>

Next, as the air floating video information display system of the embodiment, a technique of enabling the user to input any image such as a letter or a figure to the air floating video will be explained. By using this technique, the user can input a signature to the air floating video.

By using the sensing technique using the aerial operation detection sensor 1351 of FIG. 2 or the sensing technique using the TOF system of FIGS. 7 and 8, a position of the tip of the hand finger of the user, a moving direction of the same, a contact position of the same with the air floating video, a position (that may be also referred to as separate position) at which the finger is away from the air floating video or the like can be obtained. Therefore, based on the detection information regarding the contact position and the separate position, the air floating video information display system can draw a line connecting these positions as the image on the plane of the air floating video.

In the present embodiment, by using the sensing technique, movement of the hand finger of the user, in other words, movement of the contact position is detected on the plane of the air floating video, and therefore, the line such as the letter can be input/displayed.

For example, the air floating video information display system detects the contact position between the air floating video and the finger tip of the user, and then, detects the separation of the finger tip from the air floating video at a destination position of the movement of the finger tip having moved to a different position on the plane, and detects the separate point. Therefore, on the plane of the air floating video, for example, the figure such as a line or a curved line, or the letter such as alphabet or number can be drawn. Therefore, apparently, the figure or the letter can be input on the plane of the air floating video as similar to the drawing of the figure or the letter on the liquid crystal display plane with the touch panel.

Although not illustrated, the air floating video information display system samples the movement of the user's finger tip on the air floating video at a predetermined time interval (such as 100 milliseconds) by using the sensing technique, and draws the line on the air floating video to connect the respective sampling points. Therefore, as the air floating video, the letter or figure can be drawn if being a traversable letter or figure such as the number "1", "2", or "3" or the alphabet "L" or "M", or the like.

Further, if the letter or figure is not the traversable letter or figure, such as "4", "H" or the like, the system can handle this state as described below. That is, when the user inputs, for example, the letter "H", first, the system detects and draws a vertical line (first line) based on continuous contact of the finger with the plane of the air floating video. Next, the system detects that the user separates the finger from the plane once, and then, makes the finger contact with a different position again, and detects and draws a horizontal line (second line). Lastly, the system detects and draws a vertical line (third line) by detecting that the user makes the finger contact with the different position again after separating the finger from the plane once. Therefore, the letter "H" can be drawn on the plane of the air floating video.

Figure 12:
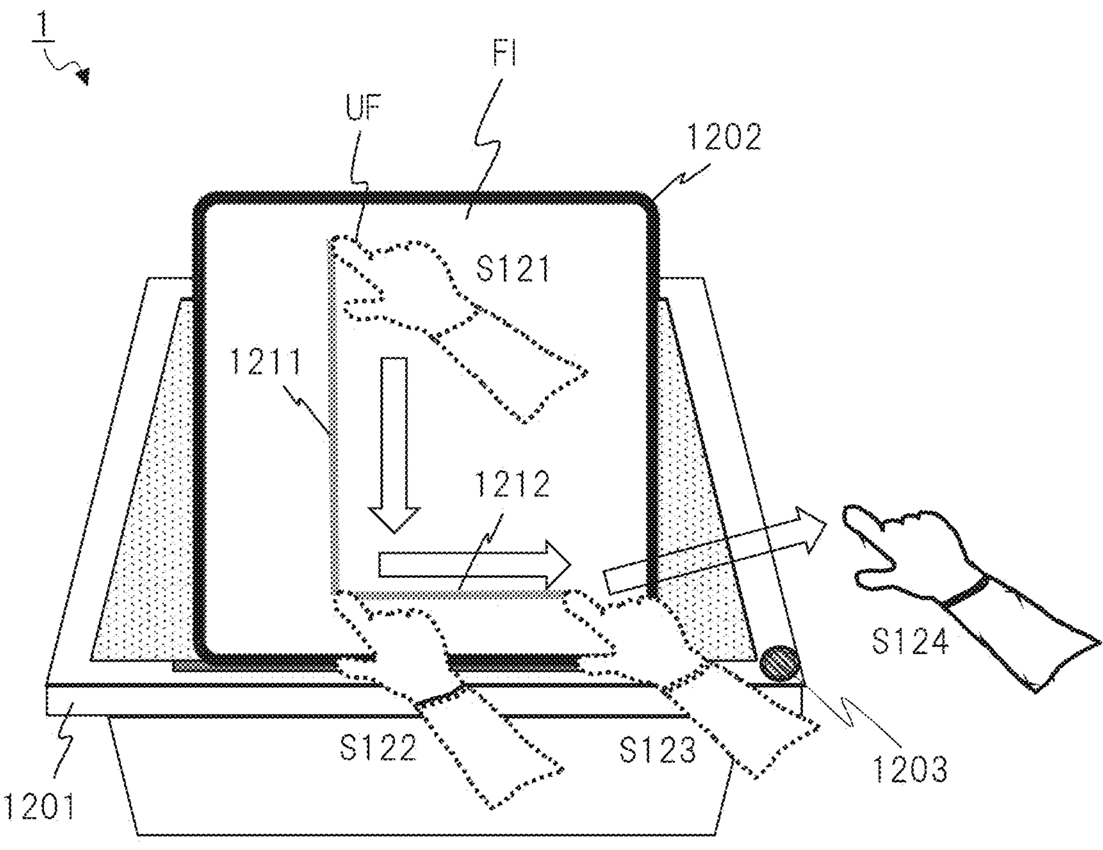
FIG. 12 is an explanatory diagram of a technique of inputting/drawing a letter or the like to an air floating video according to an embodiment.

FIG. 12 is an explanatory diagram for a technique of using the hand finger of the user on the air floating video to input/draw the letter, the figure or the like thereon. FIG. 12 illustrates a schematic diagram in a case in which the air floating video FI displayed by the air floating video information display system 1 is viewed at an observing point of the user. In this example, the air floating video FI is obliquely arranged with respect to a flat plane of the housing 1201 of the system, and the air floating video FI is viewed slightly obliquely downward from the observing point of the user. In this example, the air floating video FI includes display of a quadrangular frame 1202 (note that this is not a frame-shaped device). First, the frame 1202 is displayed with a predetermined color (such as green), and only a predetermined background color is displayed inside the frame 1202.

As an example of a simple letter, the example of FIG. 12 shows a state in which the alphabet "L" is drawn on the plane of the air floating video FI by the finger tip UF of the hand finger of the user. In this case, the user somehow notifies the air floating video information display system 1 of the willingness to draw the letter. For example, in an embodiment, a letter input button 1203 is arranged as a physical press button at any position of the air floating video information display system 1, such as a right-down position on the housing 1201 in the present embodiment. When the user presses the letter input button 1203, the system recognizes that the user is willing to input the letter or the like onto the air floating video FI, and shifts a mode of the air floating video FI to an input/drawing mode (also referred to as letter input mode). Alternatively, the user also can notify the air floating video information display system 1 of the willingness to draw the letter by using not the physical press button but voice sound (audio).

The present invention is not limited to this embodiment. In another embodiment, the letter input button may be displayed as the user interface on a part of the air floating video FI provided by the air floating video information display system 1. When the user touches the letter input button for operation, the system similarly shifts the mode of the air floating video FI to the input/drawing mode.

In the letter input mode, the air floating video information display system 1 changes the display of the entire screen of the air floating video FI to, for example, white display. In the letter input mode, the system changes the color of the frame 1202 of the air floating video FI to a predetermined color such as red. The system three-dimensionally senses the movement and the contact position of the user's finger UF on the plane of the air floating video FI as described above. Then, based on this sensing, on the plane of the air floating video FI, the system draws the contact position corresponding to the movement of the finger UF with a predetermined color such as black or blue different from the white color that is the background color. Therefore, trace of the movement of the finger UF is drawn as the line on the white background plane of the air floating video FI. Accordingly, the user himself/herself can draw the desirable letter or figure while watching the line drawn on the air floating video FI by himself/herself.

The system controls the display to make difference in the display state of the air floating video FI between a state in which the finger UF is not in contact with the plane of the air floating video FI (in other words, a state in which the finger tip is in front of (or on a nearer side than) the plane) and a state in which the finger UF is in contact with the plane of the air floating video FI (in other words, a state in which the finger tip is inserted toward a depth of the plane). Therefore, the user can easily recognize whether his/her finger UF is in contact with the plane of the air floating video FI.

With reference to FIG. 12, a procedure step in the case of the drawing of the alphabet "L" on the plane of the air floating video FI by the user will be explained. First, in a step S121, the user inserts (in other words, the user keeps the contact of) the finger UF in the depth direction at any position on the air floating video FI. Next, in a step S122, on the air floating video FI, the user moves the finger UF downward while keeping the contact. A downward arrow represents the movement direction of the finger UF (the downward direction along the plane). By detecting this movement, the system draws the vertical line (first line) 1211 of the letter "L" as a part of the air floating video FI.

Next, as the step S122, a state in which the finger UF reaches a low end position of the vertical first line 1211. During these steps, the vertical first line 1211 is drawn. In this state, the contact of the finger UF is still kept. Next, in a step S123, the user starts moving the finger UF rightward at a time point of end of the drawing of the first line 1211. By detecting this movement, the system draws the horizontal line (second line 1212) of the letter "L". The position of the finger UF reaches a right end position of the horizontal second line 1212.

Next, in a step S124, the user separates the finger UF positioned at the right end position of the horizontal second line 1212, frontward (to the near side) from the plane of the air floating video FI. The system detects the separation of the finger UF, and ends the drawing of the second line 1212. Because of a sequence of the operations as described above, the user can draw the letter "L" as the traversable letter on the air floating video FI.

When the mode is changed to the letter input mode by the user who is pressing the letter input button 1203, the color of the entire screen (background plane) of the air floating video FI is changed to the white color, and besides, the color of the frame 1202 of the air floating video FI is changed, for example, from the green color to the red color. Therefore, the user can easily recognize that the mode is the letter input mode, and therefore, these changes are preferable. If it is desirable to end the letter input mode, the user only needs to press the letter input button 1203 again. In this case, the system ends the letter input mode, and returns the mode to the original mode. In this example, the color of the entire screen of the air floating video FI is changed to the white color. However, the present invention is not limited to this. The color may be not the white color but another color such as black color or other colors.

When the user touches (makes the contact of the finger UF with) the air floating video FI in the state of the letter input mode, the color of the frame 1202 of the air floating video FI may be changed to, for example, the red color. The change of the color of the frame 1202 of the air floating video FI to the red color enables the user to recognize that the letter can be drawn since his/her finger is in contact with the plane of the air floating video FI.

Since the user moves the finger tip in accordance with a sequence of the movements, the desirable letter, figure or the like can be input/drawn as the image of the air floating video FI. Note that even the color of the frame 1202 of the air floating video FI may be not the red color but, for example, blue color or other colors. Further, in the example, a region where the image of the figure, letter or the like can be input/drawn is the entire screen of the air floating video FI. The present invention is not limited to this example. The region where the image can be input/drawn may be a predetermined part of the screen of the air floating video FI.

The user can use the air floating video FI as the user interface such as the operation menu, and besides, can input/draw any letter or figure with his/her hand finger (or a pen made of a conductive material or the like) on the air floating video FI in the letter input mode. Therefore, application ranges of the air floating video and the air floating video information display system can be made wider than those of the related art, and therefore, this usage is preferable.

Figure 13:
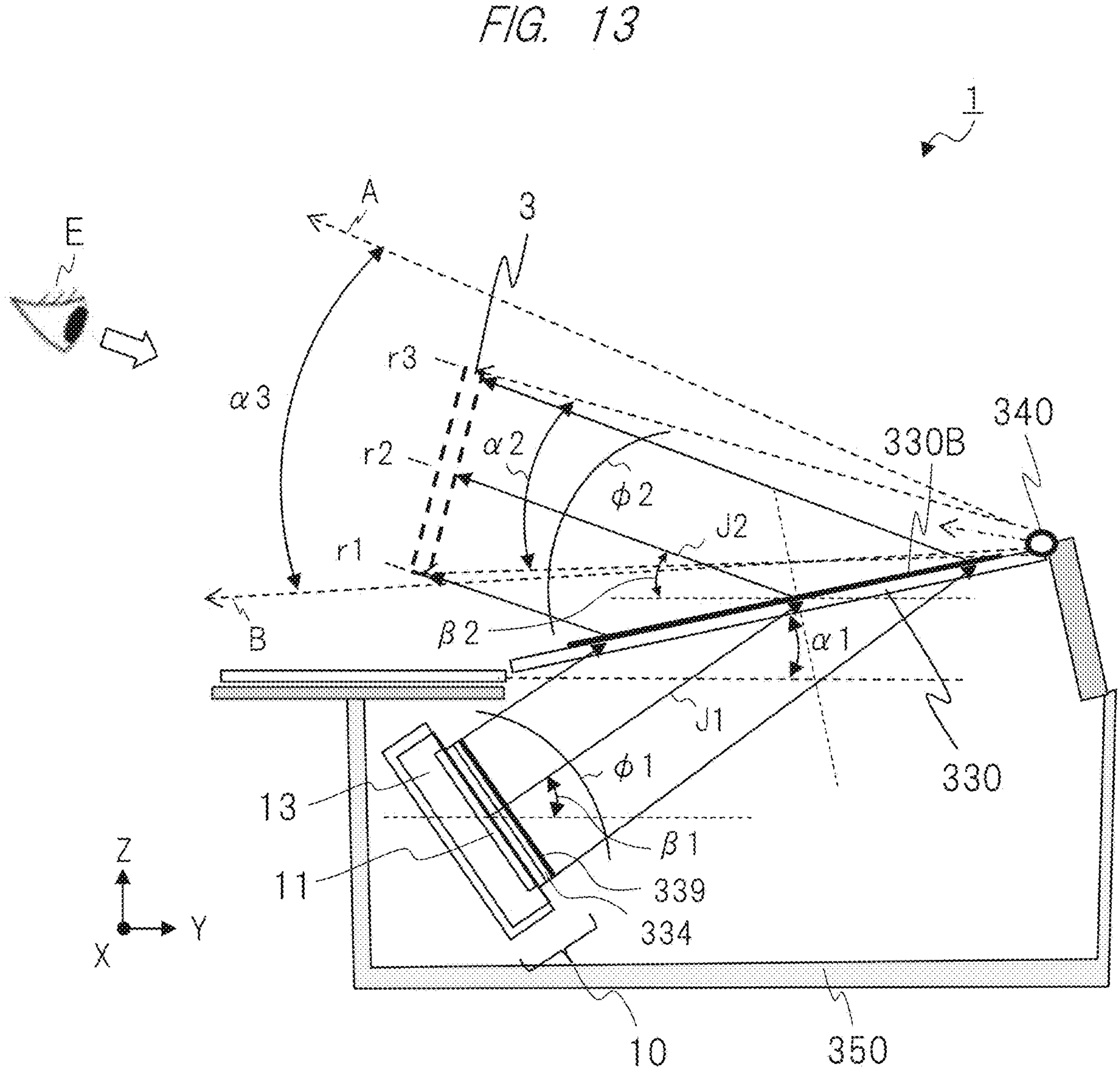
FIG. 13 is a diagram illustrating a configuration of a principal part of an air floating video information display system according to an embodiment of the present invention.

Second Configuration Example of Air Floating Video Information Display System FIG. 13 illustrates a configuration of a principal part of the air floating video information display system 1 according to an embodiment. The air floating video information display system 1 illustrated in FIG. 13 is a system suitable for observation of the air floating video 3 from obliquely above by the user who is the observer. In the coordinate system (X, Y, Z) in FIG. 13, a housing 350 of the air floating video information display system 1 is arranged on a horizontal plane (X-Y plane), and the air floating video 3 is formed to slightly incline in the front-back direction (Y-direction) from the vertical direction (Z-direction). When the plane of the air floating video 3 is suitably visually recognized from a viewpoint E of the user while the user faces the air floating video 3, the viewpoint E is arranged on a slightly oblique upside in the Y-direction from the plane of the air floating video 3 in accordance with an optical axis J2 as illustrated in the drawing. The user can suitably visually recognize the air floating video 3 with a line of sight extending slightly obliquely downward in the Y-direction from the viewpoint E.

In the housing 350, the video display apparatus 10 and the like are arranged in a predetermined positional relationship. An upper surface (X-Y plane) of the housing 350 has an opening, and the retroreflector 330 is arranged at a predetermined angle α1. An optical axis J1 of the video display apparatus 10 is directed obliquely upward at a predetermined angle β1 from the Y-direction.

The video display apparatus 10 is made of the liquid crystal display panel 11 as the video display element and the light source 13 that generates the light of the specific polarization wave having the narrow divergence property. To the liquid crystal display panel 11, panels each having a screen size ranging from a small screen size of about 5 inches to a large size excessing 80 inches are applicable, and the liquid crystal display panel is made of a panel selected from these panels. The video light from the liquid crystal display panel 11 is emitted toward the retroreflector 330 (also referred to as a retroreflection portion or a retroreflection plate) on the optical axis J1. Light from the light source 13 having the narrow divergence angle described later is made incident on the liquid crystal display panel 11. As a result, video light flux φ1 having a narrow divergence angle is generated. The video light flux φ1 having the narrow divergence angle is made incident on the retroreflector 330 from the lower side in the Z-direction to be along the optical axis J1. By the retroreflection in the retroreflector 330, video light flux φ2 having a narrow divergence angle is generated in the direction of the optical axis J2 on the upper side of the retroreflector 330 in the Z-direction, based on the principle described in FIG. 4. The air floating video 3 (air floating video 331 in FIG. 4) is provided at a predetermined position outside the housing 350 by the video light flux φ2. The optical axis J2 is directed obliquely upward at a predetermined angle (2 from the Y-direction.

The air floating video 3 is formed at a position symmetric to the video display apparatus 10 across the retroreflector 330 serving as a symmetrical plane. The plane of the video display apparatus 10 and the plane of the air floating video 3 are arranged at substantially symmetrical positions or symmetrical positions across the obliquely-arranged plane of the retroreflector 330. On the plane of the air floating video 3, "r2" indicates the center position corresponding to the optical axis J2, "r1" indicates the lower end position corresponding to the light ray at the lower end of the video light flux φ2, and "r3" indicates the upper end position corresponding to the light ray at the upper end of the video light flux φ2.

In this configuration, the emission side of the liquid crystal display panel 11 is provided with the video light control sheet 334 (specifically see FIGS. 5 and 6A described above) in order to erase the ghost image 332 or 333 generated by the retroreflector 330 described in FIG. 4 to provide the high-quality air floating video 3. As a result, divergence properties in unnecessary directions are controlled.

Figure 11:
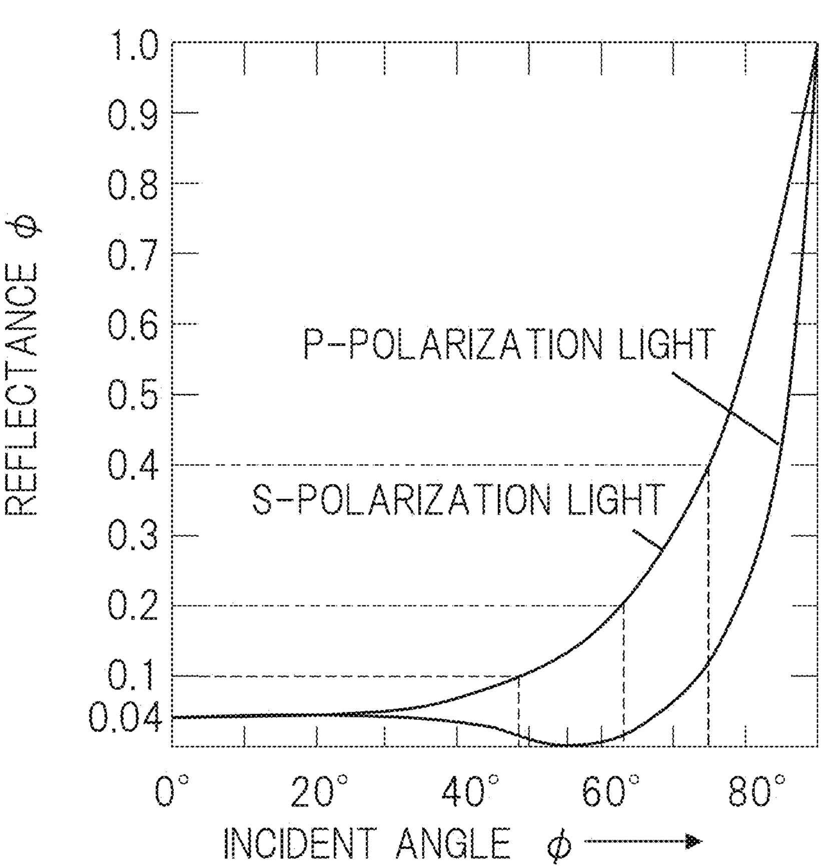
FIG. 11 is a diagram illustrating a reflection property with respect to a light ray incident angle of polarization light incident on a medium having a refractive index of 1.5.

Further, as illustrated in FIG. 11, the reflectance of the video light from liquid crystal display panel 11 can be increased by a reflector member such as the retroreflector 330 in principle, and therefore, a S-polarization wave (electromagnetic wave having an electric field component vertical to the light incident (entering) surface, "S" is an abbreviation of Senkrecht) may be used. However, if the user uses polarization sunglasses, the air floating video 3 is reflected or absorbed by the polarization sunglasses. Therefore, in order to take measures against this, it is preferable to use a P-polarization wave (electromagnetic wave having an electric field component parallel to the light entering surface, "P" is an abbreviation of parallel). For this purpose, an illustrated depolarizing element 339 is provided as an element that optically converts a part of the video light of the specific polarization wave into the other polarization wave to be virtually converted into natural light. For example, the emission side of the video light control sheet 334 is provided with the depolarizing element 339. As a result, even if the user uses the polarization sunglasses, the user can view the favorable air floating video 3.

As commercially available products of the depolarizing element 339, COSMOSHINE SRF (manufactured by Toyobo Co., Ltd) and a depolarizing adhesive (manufactured by Nagase (sangyo) & Co., Ltd) are exemplified. In the case of COSMOSHINE SRF (manufactured by Toyobo Co., Ltd), when an adhesive is adhered on the video display apparatus, the reflection on the interface can be reduced to improve the luminance. In addition, in the case of the depolarizing adhesive (manufactured by Nagase (Sangyo) & Co., Ltd), the depolarizing adhesive is used so that a colorless transparent plate and the video display apparatus are adhered to each other through the depolarizing adhesive.

Furthermore, in the present embodiment, the video emitting surface of the retroreflector 330 is also provided with a video light control sheet 334B (similar to the video light control sheet 334, specifically see FIG. 6B described above). As a result, the ghost images 332 and 333 (FIG. 4) generated on both sides of the normal image of the air floating video 3 due to the unnecessary light are erased.

In the configuration of the present embodiment, the retroreflector 330 inclines at the predetermined angle α1 from the horizontal axis (Y-direction), and the air floating video 3 is generated in the oblique direction from the horizontal axis (particularly, to incline at an angle closer to the vertical plane than the horizontal plane). The present invention is not limited thereto, and the position and inclination of the arrangement of the air floating video 3 can be designed by changing the arrangement of the components.

Furthermore, in the present embodiment, the first ranging apparatus 340 is mounted at a predetermined position of the housing 350. That is, a sensing technique similar to that in FIG. 7 is mounted on this system. As a result, a system is configured to allow the user to access and interact with the air floating video 3. The first sensing system including the first ranging apparatus 340 detects the state of the operation performed with the user's hand finger or the like on the air floating video 3. Further, as similar to FIGS. 8 and 9B, the second sensing system including the second ranging apparatus 341 may be added.

An attachment position and a viewing angle α3 of the first ranging apparatus 340 may be appropriately selected so as to sufficiently cover the size of the air floating video 3. In the present example, the first ranging apparatus 340 is attached at an illustrated position of the housing 350, the position being on the back side of the depth direction in the Y-direction (deeper than the positions of the user and the air floating video 3), being on the extension of the inclined surface of the retroreflector 330 and being slightly away so as not to block the video light flux of the video light. In the present example, the viewing angle α3 (range from the upper end A to the lower end B) of the first ranging apparatus 340 is set to a sufficiently wide viewing angle so as to be able to cover a region including the entire air floating video 3 and the user's face who is visually recognizing it from the viewpoint E of the reference position (facing position to it). The viewing angle α3 includes the viewing angle α2 covering the entire air floating video 3. The viewing angle α2 corresponds to, for example, the sensing planes a0, a1, a2, and a3 in FIG. 7.

As illustrated in FIG. 7 (or FIG. 8), a ranging system in which the sensing plane of the air floating video 3 is divided into a plurality of areas is used as the TOF sensor of the first ranging apparatus 340. As a result, the resolution of each sensing region is improved. Furthermore, when the second sensing technique using the CMOS sensor as illustrated in FIGS. 8 and 9B is used, the detection accuracy can be further improved.

Furthermore, in the present embodiment, a light source that diverges visible light having a narrow-angle directionality is used as the light source 13, and the first ranging apparatus 340 is arranged at a position outside the video light flux of the narrow angle on the housing 350 side. In addition, the second ranging apparatus 341 may be similarly arranged. As a result, it is possible to eliminate an adverse effect on the sensing accuracy of the video light forming the air floating video 3.

Third Configuration Example of Air Floating Video Information Display System

Figure 14:
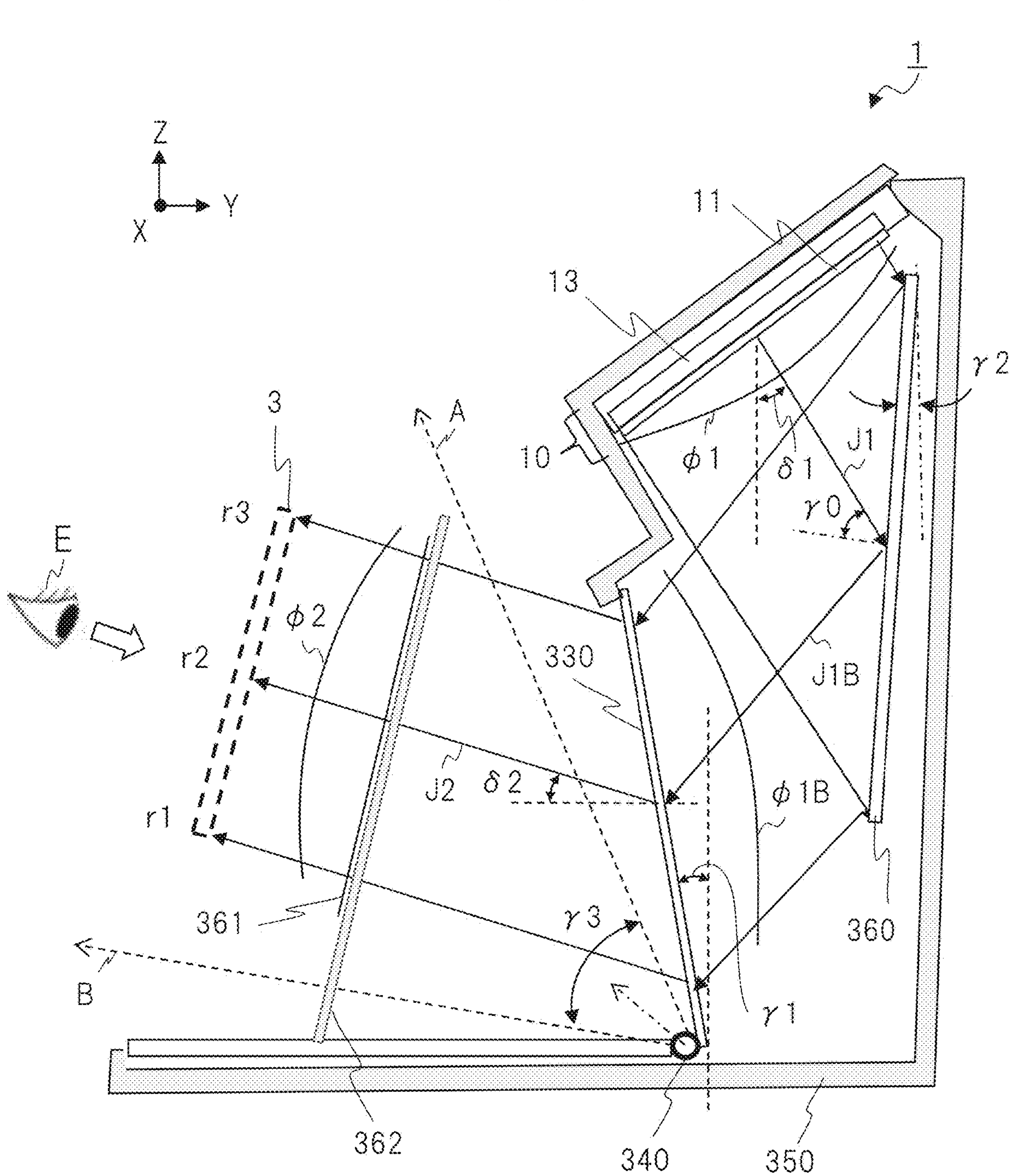
FIG. 14 is a diagram illustrating a configuration of a principal part of another air floating video information display system according to the embodiment of the present invention.

FIG. 14 illustrates another embodiment of the air floating video display information system. The air floating video display information system 1 illustrated in FIG. 14 is a system suitable for observation of the air floating video 3 from obliquely above observed by the user. In the coordinate system (X, Y, Z) in FIG. 14, the housing 350 of the air floating video display information system 1 is arranged on the horizontal plane (X-Y plane), and the air floating video 3 is formed to slightly incline in the front-back direction (Y-direction) from the vertical direction (Z-direction). When the plane of the air floating video 3 is suitably visually recognized from the viewpoint E of the user while the user faces the air floating video 3, the viewpoint E is arranged on a slightly oblique upside in the Y-direction from the plane of the air floating video 3 in accordance with an optical axis J2 as illustrated in the drawing. The user can suitably visually recognize the air floating video 3 with a line of sight slightly obliquely downward in the Y-direction from the viewpoint E.

In the housing 350, the video display apparatus 10, a mirror 360 and the like are arranged in a predetermined positional relationship. In the opening portion of the housing 350 such as an opening portion having a plane (X-Z plane) that stands substantially in the vertical direction in the present embodiment, the retroreflector 330 is arranged at a predetermined angle γ1 (angle slightly obliquely inclining downward) from the Z direction. The mirror 360 is a plane mirror.

In the present embodiment, the video light from the video display apparatus 10 is reflected by the mirror 360, and then, is made incident on the retroreflector 330. The housing 350 has a portion protruding upward in the Z-direction, and the video display apparatus 10 is arranged in the portion. The optical axis J1 of the video display apparatus 10 faces downward in the Z-direction, backward in the Y-direction, and obliquely downward at a predetermined angle δ1 from the Z-direction.

The video display apparatus 10 is made of the liquid crystal display panel 11 as the video display element and the light source 13 that generates the light of the specific polarization wave having the narrow divergence property. To the liquid crystal display panel 11, panels each having a screen size ranging from a small screen size of about 5 inches to a large size excessing 80 inches are applicable, and the liquid crystal display panel is made of a panel selected from these panels. The video light from the liquid crystal display panel 11 is turned back on the optical axis J1 by the mirror 360 that is an optical-path turning-back mirror, and is emitted toward the retroreflector 330 on an optical axis J1B after the turning back.

The light having the narrow divergence angle from the light source 13 is made incident on the liquid crystal display panel 11. As a result, the video light flux φ1 having the narrow divergence angle is generated. The video light flux φ1 having the narrow divergence angle is reflected by the mirror 360, and then, becomes the video light flux φ1B. The video light flux φ1B having the narrow divergence angle is made incident along the optical axis J1B on the retroreflector 330 from the right side in the Y-direction in the drawing. By the retroreflection in the retroreflector 330, the video light flux φ2 having the narrow divergence angle is generated in the direction of the optical axis J2 on the left side of the retroreflector 330 in the Y-direction in accordance with the principle described in FIG. 4.

By the video light flux φ2, the air floating video 3 (air floating video 331 in FIG. 4) is formed at a predetermined position outside the opening portion of the housing 350. The optical axis J2 is directed obliquely upward at a predetermined angle δ2 from the Y-direction (an angle "90 degrees−δ2" from the Z-direction).

The air floating video 3 is formed at a substantially symmetrical position to the mirror 360 across the retroreflector 330 that is the symmetrical plane. In the configuration of the present embodiment, the optical path is turned back by the mirror 360, and therefore, the video display apparatus 10 is arranged above the air floating video 3 in the Z-direction. As a result, it is possible to achieve a system that forms the obliquely-inclined air floating video 3 as illustrated in the drawing by making the video light flux incident on the retroreflector 330 from the obliquely upside and emitting it obliquely upward.

Furthermore, imaging the air floating video 3 obliquely upward (on the optical axis J2 in the drawing) with respect to the housing 350 can be achieved by inclination arrangement of the retroreflector 330 at the predetermined angle γ1 from the vertical axis (Z-direction) of the bottom surface of the housing 350 as illustrated in the drawing. In addition, as a result of the configuration in which the emission axis of the retroreflector 330 inclines slightly obliquely downward as described above, it is possible to prevent the reduction in the image quality of the air floating video 3 that may be caused by the entering of the external light into the retroreflector 330 which results in the entering of it into the housing 350.

In order to provide the air floating video 3 with higher image quality by erasing the ghost images (FIG. 4) that may be caused in the air floating video 3, as similar to the second embodiment (FIG. 13), also in the present embodiment, the emission side of the liquid crystal display panel 11 may be provided with the video light control sheet 334 (FIGS. 5 and 6A) to control the divergence property in the unnecessary direction. Further, the image emitting surface of the retroreflector 330 may be also provided with the video light control sheet 334B (FIG. 6B) to erase the ghost images formed on both sides of the normal image of the air floating video 3 due to the unnecessary light.

Since the above-described structure is arranged inside the housing 350, it is possible to prevent the external light from entering the retroreflector 330, and to prevent the formation of the ghost images.

Also in the present embodiment, as the video light from the liquid crystal display panel 11, the S-polarization wave may be used as similar to FIG. 13. Alternatively, for supporting the polarization sunglasses, the depolarizing element 339 may be arranged while using the P-polarization wave.

In the configuration of the present embodiment, the retroreflector 330 inclines at the predetermined angle γ1 from the vertical axis (Z-direction), and the air floating video 3 is formed in the oblique direction from the horizontal axis (particularly, to incline at an angle closer to the vertical plane than the horizontal plane). The present invention is not limited to this, and the position and inclination of the arrangement of the air floating video 3 can be designed and adjusted by changing the arrangement of the components.

Furthermore, in the present embodiment, the first ranging apparatus 340 (FIG. 7) is mounted at a predetermined position of the housing 350. That is, a sensing technique similar to that in FIG. 7 is mounted on this system. As a result, a system is configured to allow the user to access and interact with the air floating video 3. The first sensing system including the first ranging apparatus 340 detects the state of the operation performed with the user's hand finger or the like on the air floating video 3. Further, as similar to FIGS. 8 and 9B, a configuration with addition of the second sensing system including the second ranging apparatus 341 may be applicable.

An attachment position and a viewing angle γ3 of the first ranging apparatus 340 may be appropriately selected so as to sufficiently cover the size of the air floating video 3. In the present example, the first ranging apparatus 340 is attached at an illustrated position of a bottom portion of the housing 350, the position being near the front side of the retroreflector 330 in in the Y-direction and being slightly away so as not to block the video light flux of the video light. In the present example, the viewing angle γ3 of the first ranging apparatus 340 is set to a sufficiently wide viewing angle so as to be able to cover a region including the entire air floating video 3 and the user's face who is visually recognizing it from the viewpoint E of the reference position. The viewing angle γ3 includes the viewing angle covering the entire air floating video 3.

In addition to the first ranging apparatus 340, the second sensing system using a CMOS sensor as illustrated in FIGS. 8 and 9B may be used.

Furthermore, in the present embodiment, a light source that diverges visible light having a narrow-angle directionality is used as the light source 13, and the first ranging apparatus 340 (and the second ranging apparatus 341) is arranged at a position outside the video light flux of the narrow angle on the housing 350 side. As a result, it is possible to eliminate an adverse effect on the sensing accuracy of the video light forming the air floating video 3.

Furthermore, in the present embodiment, as illustrated in the drawing, a capacitive touch panel 361 may be fixed and arranged between the air floating video 3 and the retroreflector 330 by a support member 362. The support member 362 has, for example, a frame shape to support the touch panel 361 inside. The support member 362 is fixed to, for example, a bottom surface portion of the housing 350. The touch panel 361 is made of a member that transmits video light for forming the air floating video 3 and light from the first ranging apparatus 340.

The touch panel 361 detects an approach (proximity) state of the user's hand finger to a surface of the touch panel by using a capacitance system. Alternatively, the touch panel 361 detects a contact state of the user's hand finger onto a surface of the touch panel. By combination use of a third sensing technique including the touch panel 361 with the first sensing technique or the like, the detection accuracy can be further improved. A size and an attachment position of the capacitive touch panel 361 may be similarly selected so as to sufficiently cover the air floating video 3.

For example, a projected capacitance system is applicable to the touch panel 361 of the capacitance system that can capture highly accurate position information. The touch panel of this system is manufactured by, for example, using photolithography etching to make patterns of ITO which is a transparent electrode (Y-axis electrode) having a fine line-to-line distance and a copper thin film which is a transparent electrode (X-axis electrode) having a fine line-to-line distance on both surfaces of a transparent glass substrate. Therefore, when an object (for example, fingertip end) approaches this transparent glass substrate, each of the X-axis electrode and the Y-axis electrode detects change of the capacitance, and relative coordinates of the object are provided. In this system, the shorter the line-to-line distance of the transparent electrode is, the higher the resolution is provided, and therefore, multipoint detection can be performed. Therefore, this system achieves simultaneous input with a plurality of fingers.

First Embodiment Regarding Kiosk Terminal

As an embodiment of the present invention, an example (that is a first embodiment) of application of the air floating video information display system 1 explained above to so-called kiosk terminal will be explained below.

The kiosk terminal is an information terminal used for access to necessary information and usage of various services through the man-machine interface or the user interface such as the touch panel operation. The kiosk terminal is placed in public facilities, transport facilities, entertainment facilities such as amusement parks, and besides, shops such as so-called convenience stores or the like in recent years. The kiosk terminal is also used for selling various tickets and for administrative services (such as issuance of residence certificate).

In the following explanations for embodiments, note that the information terminal having the specific configuration is expressed as a term "kiosk terminal". In place of the term "kiosk terminal", the expression includes not only the "information terminal" but also "information display apparatus", "information processing terminal", "ticket dispenser terminal", "document dispenser terminal", "administrative terminal", "service terminal" and the like. The term "kiosk terminal" mainly used in the explanations for the embodiments is used as a typical example of these terms.

Figure 15:
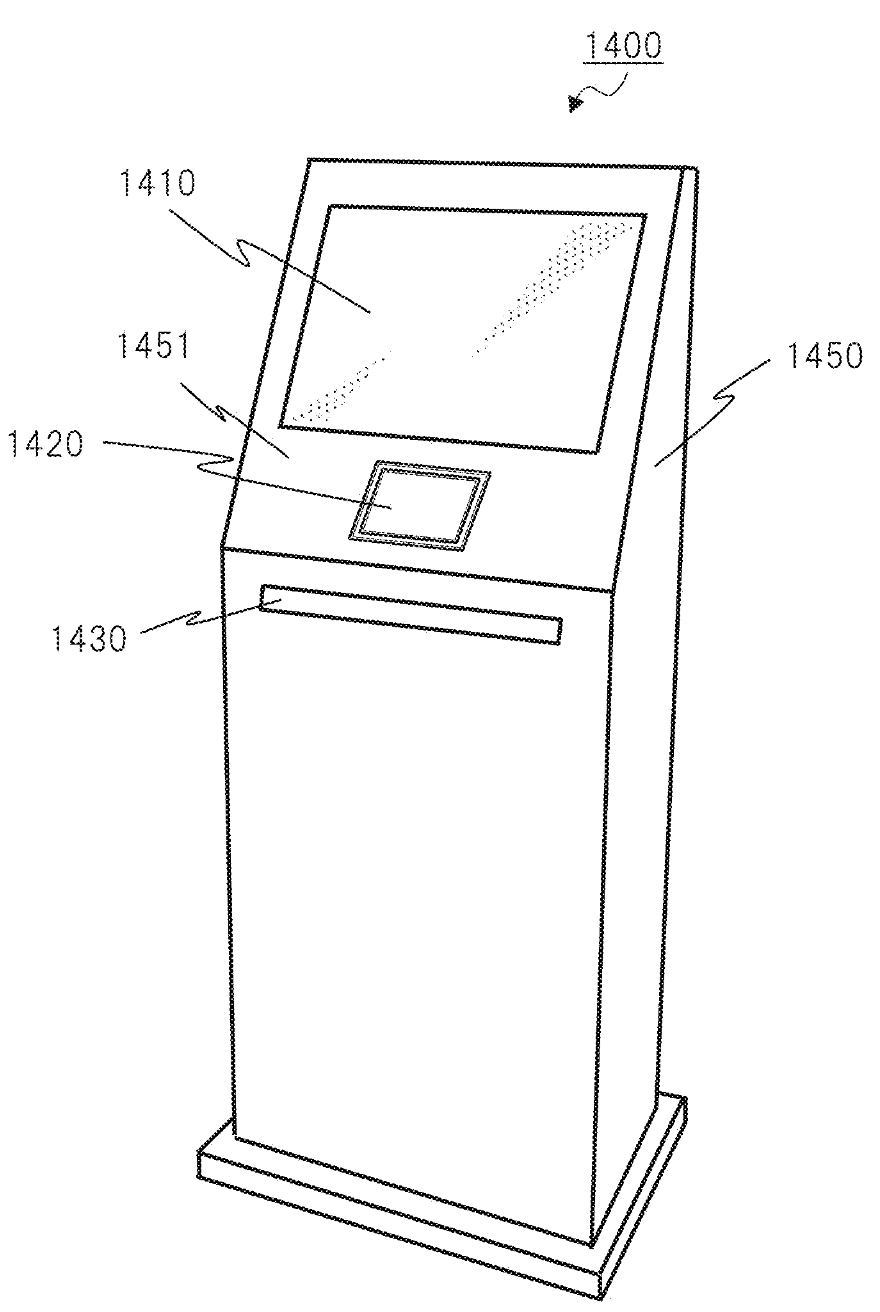
FIG. 15 is a diagram illustrating an example of a kiosk terminal.

FIG. 15 shows an example of an external appearance of a general kiosk terminal based on the related art. This kiosk terminal 1400 includes a metallic housing 1450 having a height of, for example, 120 to 50 cm, and a liquid crystal display screen 1410 and an input button 1420 are arranged on a surface (that is a surface facing the user, particularly inclined surface 1451) of the housing 1450. The liquid crystal display screen 1410 is a part of the liquid crystal display apparatus, and is a screen with a touch panel that displays various pieces of information and receives the touch operation of the user. The input button 1420 is a physical button used for causing the user to input a unique passcode or the like or a touch button in a screen made of the touch panel. And, an ejection port 1430 is arranged on a part of the surface of the housing 1450. The ejection port 1430 is an ejection port used for ejecting, for example, an issued ticket, an administrative document or the like as a result of the operation on the kiosk terminal 1400.

Figure 16:
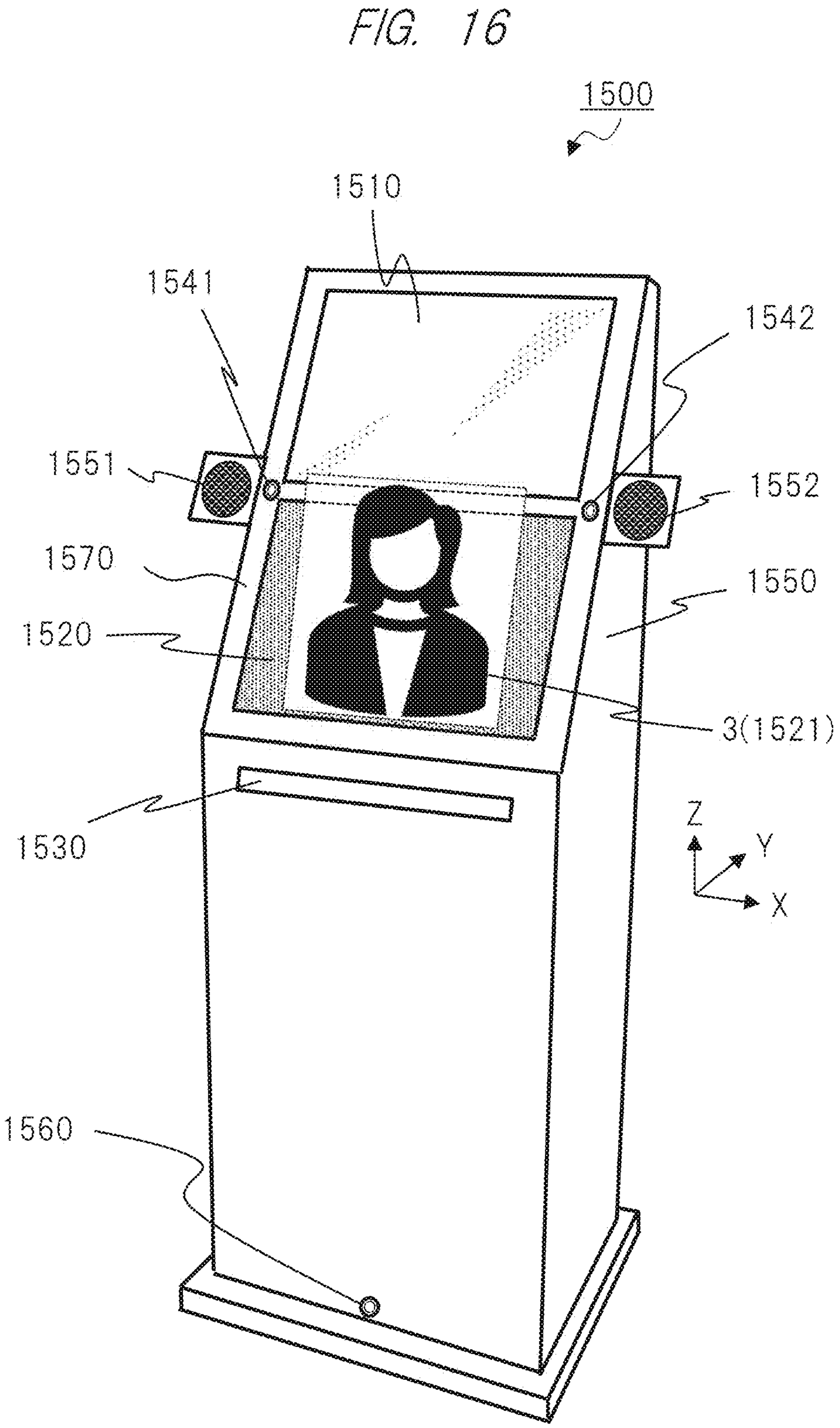
FIG. 16 is a diagram illustrating an external appearance example of a kiosk terminal according to an embodiment (first embodiment)

FIG. 16 shows a configuration example of an external appearance of a kiosk terminal serving as the air floating video information display system of the first embodiment. FIG. 16 shows an outline in a case in which this kiosk terminal 1500 is viewed from an oblique right side. The kiosk terminal 1500 in FIG. 16 is different from the kiosk terminal 1400 in FIG. 15 in the following points. In the kiosk terminal 1500 in FIG. 16, the surface (particularly the inclined surface 1570) of the housing 1550 includes an air floating video display 1520 used for displaying the air floating video 3 on the lower side in addition to the liquid crystal display screen 1510 based on the liquid crystal display apparatus. In other words, the kiosk terminal 1500 has two screens for two types of images based on the liquid crystal display screen 1510 and the air floating video display 1520, and is configured such that the inclined surface 1570 is divided into two displays that are the liquid crystal display screen 1510 and the air floating video display 1520.

In the configuration of FIG. 16, a basically-used screen of the two screens is a screen (also referred to as first screen) of the air floating video display 1520. On this first screen, the concierge or the operation menu is displayed as the user interface made of the air floating video 3. The first screen of the air floating video display 1520 is basically a region having predetermined vertical and horizontal sizes. In the present example, the first screen has a slightly horizontally long size.

On the other hand, the liquid crystal display screen 1510 (also referred to as second screen) can display any video, but is used for, for example, advertisement display or the like as similar to the general kiosk terminal. The liquid crystal display screen 1510 is, for example, a liquid crystal touch panel screen with a touch sensor.

As a modification example, note that the second screen that is the liquid crystal display screen 1510 combined with the first screen of the air floating video display 1520 may be used as the user interface such as the operation menu.

Also, as a modification example, a configuration without the second screen that is the liquid crystal display screen 1510 is also applicable.

Further, as a modification example, the first screen of the air floating video display 1520 in FIG. 16 may display both the concierge and the operation menu as single air floating video 3. However, the size of the first screen is limited. Therefore, if both of them are displayed in the first screen, a display content is small and dense, and is possibly difficult to be viewed. Therefore, in the example of FIG. 16, display switching or the like is controlled such that either one of the concierge and the operation menu is displayed as large as possible in the first screen.

Figure 17:
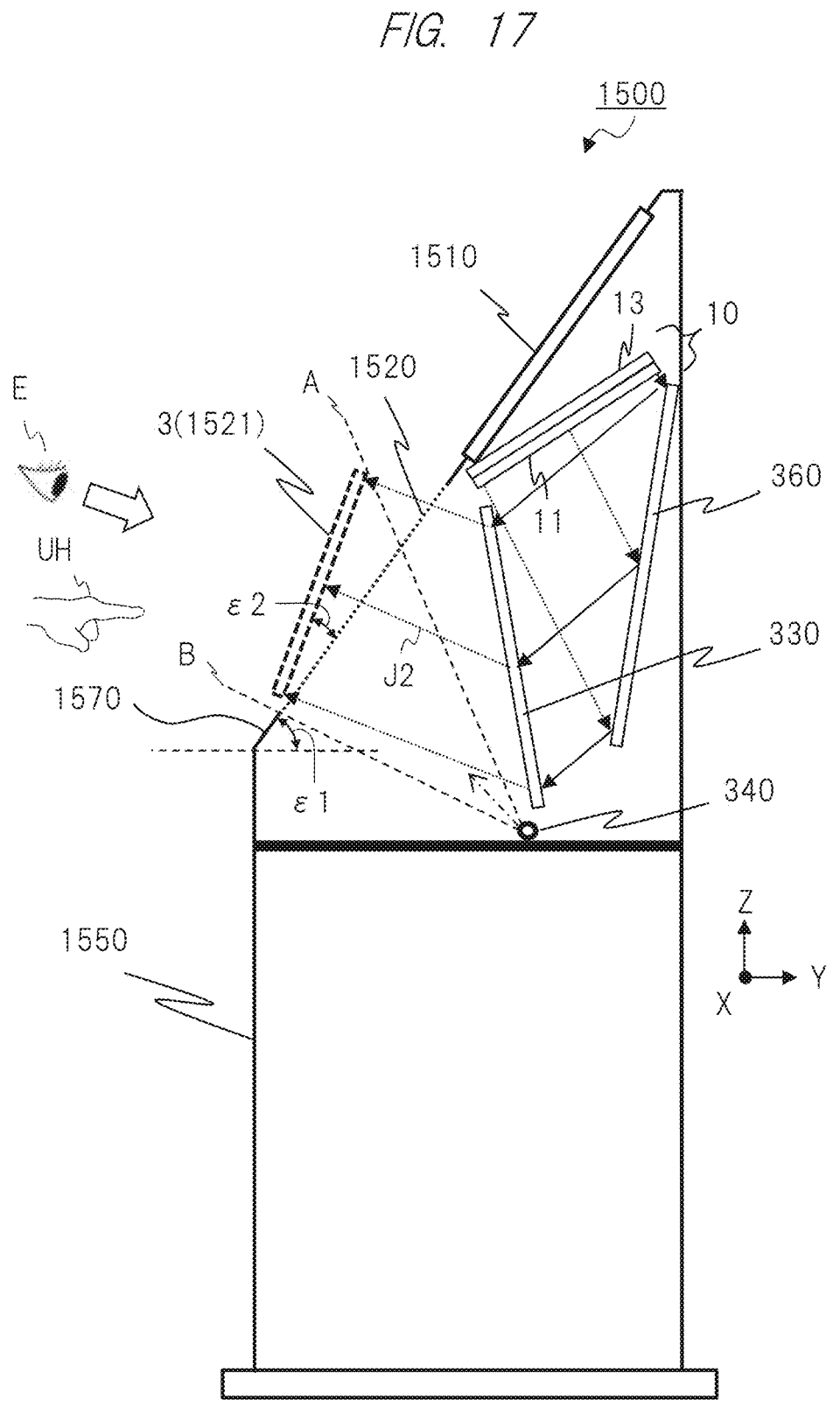

Of course, positional relation between the liquid crystal display screen 1510 and the air floating video display 1520 is not limited to the configuration example of FIG. 16, and any positional relation is applicable. For example, the arrangement of these screens is turned upside down. That is, on the inclined surface 1570, the air floating video display 1520 may be arranged on the upper side, and the liquid crystal display screen 1510 may be arranged on the lower side. Alternatively, on the inclined surface 1570, these screens may be arranged on right and left sides in parallel. However, as illustrated in FIG. 17 described later, in the configuration of the kiosk termina 1500 including the air floating video display 1520 in addition to the liquid crystal display screen 1510, the configuration in which the liquid crystal display screen 1510 is on the upper side while the air floating video display 1520 is on the lower side is more preferable as component arrangement in the housing 1550.

In the configuration including the two screens of two displays as illustrated in FIG. 16, information indicating that the two display screens are the liquid crystal display screen 1510 and the air floating video display 1520 may be displayed with, for example, a message "this is the liquid crystal screen" or "this is the air floating video" on each screen to make the information understandable for the user. As a result, the system is convenient for the user. Alternatively, "the liquid crystal screen" or "the air floating video" may not be displayed on the screen but be displayed previously physically at a nearby position such as the frame of each screen.

In the example of FIG. 16, the air floating video display 1520 displays the concierge 1521 (also referred to as human image or concierge image) as the air floating video 3. Although described in detail later, in the configuration of FIG. 16, the user can operate the screens (particularly the operation menu or the like displayed on the air floating video display 1520) in accordance with the image or the video information displayed on the liquid crystal display screen 1510 and the operation guidance performed by the concierge 1521 displayed on the air floating video display 1520. The concierge 1521 performs the operation guidance (also referred to as guidance of the operation, operation explanation or the like) to the user by using the video and the voice sound.

Therefore, the user apparently gets sense of feeling as if an actual person (concierge) existed on the kiosk terminal 1500. Besides, the concierge carefully explains the operation method of the kiosk terminal 1500 or the like for the user. Therefore, even if the user is, for example, a user who touches the kiosk terminal at the first time, the user can be easier to operate the kiosk terminal 1500 without confusion, and receive the desirable service.

In this case, as a method for forming the air floating video 3 in the air floating video display 1520 in the example in FIG. 16, the configuration of the retroreflector 2 in FIG. 3 or the like or the configuration of the retroreflector 330 in FIGS. 13 and 14 or the like may be applied. Alternatively, the present invention is not limited to these methods, another method capable of aerially displaying the air floating video may be applied. All methods are applicable. In the present example, the application case (FIG. 17) of the configuration in FIG. 14 is particularly described.

Further, as the detection method (sensing technique) of detecting the user's operation on the air floating video 3 in the example in FIG. 16, the method of combination of the aerial operation detection sensor 1351 and the aerial operation detector 1350 in FIG. 2 may be applied, or the method using the first or second sensing technique in FIG. 7 or 8 may be applied. Alternatively, the present invention is not limited to these methods. Another method capable of detecting the aerial operation on the air floating video may be applied. All methods are applicable. In the present example, the application case (FIG. 17) of the configuration in FIGS. 7 and 14 is particularly described.

Further, the kiosk terminal 1500 in FIG. 16 includes two cameras 1541 and 1542 on right and left sides of the housing 1550 (particularly the inclined surface 1570). These cameras serve as a stereo camera corresponding to the imager 1180 in FIG. 2. The cameras 1541 and 1542 capture images of a region including a face, iris or the like of the user (such as the user who operates the air floating video 3) near the front surface of this kiosk terminal 1500 (on the front side of the drawing in the Y direction). The controller 1110 (FIG. 2) of the kiosk terminal 1500 that is the air floating video information display system 1 is configured to perform a processing of detecting the approach of the user to the kiosk terminal 1500, a processing of user identification/determination, a processing of user authentication or the like, based on the images captured by the cameras 1541 and 1542. In the present embodiment, two cameras 1541 and 1542 are arranged. However, the number of the arranged cameras may be one, two or more. The camera may be arranged inside the housing 1550, or the image-capturing information of the image captured by an exterior camera may be transmitted to the kiosk terminal 1500 through wired or wireless communication.

The stereo image can be captured by the two cameras 1541 and 1542 on the right and left sides, and the user's face or the like can be captured as the stereo (three-dimensional) image, and therefore, a distance to and a position of a target object such as the face can be also calculated. Therefore, this system can increase accuracy of the user's face identification or the like more than a case in which the user's face is captured as a planar image by single camera, and is preferable also in terms of prevention of unauthorized use.

The kiosk terminal 1500 of FIG. 16 also includes two loudspeakers that are particularly two super-directive loudspeakers 1551 and 1552 (corresponding to the loudspeaker/super-directive loudspeaker 30 of FIG. 2) on the right and left sides of the housing 1550. Since this includes the super-directive loudspeakers, the kiosk terminal can emit the audio having extremely high directionality that is audible only for the user who is trying to operate this kiosk terminal 1500. The kiosk terminal 1500 may include a loudspeaker that outputs audio having a normal audible band. However, in the following case, the preferable configuration particularly includes two super-directive loudspeakers 1551 and 1552 that make the audio inaudible for a different person from the target user. That is, if the audio emitted from the kiosk terminal 1500 in accordance with the user's operation or the like indicates, for example, the user's name, birth date, input number information or the like, it is particularly necessary to increase confidentiality for security. To such a case, the application of the super-directive loudspeaker is preferable.

In FIG. 16, note that the super-directive loudspeakers 1551 and 1552 are arranged to protrude out of the housing 1550. However, the present invention is not limited to this, and the loudspeakers may be arranged inside the housing 1550. By the super-directive loudspeakers 1551 and 1552, an audio signal indicating that a button of the operation menu of the air floating video 3 or the like is pressed down may be output to be audible only for the user.

FIG. 17 shows an explanatory diagram of an internal structure of the kiosk terminal 1500 of FIG. 16. FIG. 17 shows an internally transparent Y-Z cross-sectional surface in viewing of the housing 1550 of FIG. 16 from a right side surface. An upper portion of the housing 1550 has a shape including the inclined surface 1570. The upper portion houses the video display apparatus 10, the mirror 360, the retroreflector 330 and the like that are the components of the air floating video information display system 1 explained with reference to FIG. 14. This configuration is similar to that of FIG. 14, and therefore, the explanation for the details will be omitted. Note that the touch panel 361 of FIG. 14 is not applied in FIG. 17.

A lower portion of the housing 1550 may house other components such as a controlling apparatus on which the controller 1110 of FIG. 2 is mounted, a communication apparatus on which the communication portion 1132 is mounted, and a power supplying apparatus. And, the lower portion (particularly front surface) of the housing 1550 may be provided with a human detecting sensor 1560 as illustrated in the drawing. The human detecting sensor 1560 detects approach of a person to the kiosk terminal 1500.

In the configuration of FIG. 17, as similar to FIG. 13, the direction of the video light emitted from the video display apparatus 10 inside the housing 1550 is changed by the mirror 360, and is made incident on the retroreflector 330. Then, the retroreflection light made by the retroreflector 330 is emitted obliquely upward as being opposite to the video display apparatus 10 (on the front side in the Y direction). As a result, the air floating video 3 is formed at the position of the air floating video display 1520.

The inclined surface 1570 of the housing 1550 has a predetermined angle "ε1" from the horizontal surface (Y direction). An opening (illustrated with a dot line) of the air floating video display 1520 is arranged at a position on the inclined surface 1570, the position being obliquely lower than the liquid crystal display screen 1510 on the upper side. The opening may be provided with a transparent member or the like. The video light emitted from the retroreflector 330 passes through an obliquely upper position of this opening, and forms the air floating video 3 that is the real image at a predetermined position outside the inclined surface 1570. The air floating video 3 is formed to incline frontward by an angle "ε2" from the inclined surface 1570. Therefore, for the user, the air floating video 3 is apparently floated to protrude frontward from the inclined surface 1570. As similar to FIG. 14, on the line of sight extending from the viewpoint E on the obliquely upper side toward the obliquely lower side, the user can preferably visually recognize the air floating video 3 displayed on the air floating video display 1520.

Note that the case of the application of the configuration of FIG. 14 to the kiosk terminal 1500 as described above is configured such that the light path is bent inside the housing 1550 by the mirror 360, and therefore, can secure the longer light path inside the housing 1550. As a result, a longer distance of the obliquely-frontward protrusion of the air floating video 3 from the retroreflector 330 can be secured. As a result, a thickness dimension of the housing 1550 in the depth direction (Y direction) can be suppressed.

In the configuration of FIG. 17, the first ranging apparatus 340 (including the TOF sensor or the like) senses a range covering the entire air floating video 3 through the opening of the air floating video display 1520. In FIG. 17, note that a lower end "B" of the range sensed by the first ranging apparatus 340 is at an obliquely upper position of the horizontal surface (Y direction) to be fitted with the opening. However, the present invention is not limited to this, and the lower end may be close to the horizontal surface (Y direction). The sensed range can be designed by changing the position of the opening of the housing 1550 or the arrangement position of the first ranging apparatus 340.

The sensing system including the first ranging apparatus 340 may be used for detecting whether the user is sufficiently close to the kiosk terminal 1500 (the inclined surface 1570 of the housing 1550, the air floating video 3 or the like) or be used for support of this detection in cooperation with the camera. If the configuration of FIG. 17 includes the first ranging apparatus 340 and the second ranging apparatus 341 as shown in FIG. 8, the ranging apparatuses may be arranged on, for example, the right and left sides of the retroreflector 330 in the X direction such that the optical axis of the ranging is close to the horizontal surface (Y direction).

By using the sensing system including the first ranging apparatus 340, the kiosk terminal 1500 senses the operation on the air floating video 3 of the air floating video display 1520 performed by the user's hand finger. The controller 1110 of the kiosk terminal 1500 controls the display content (the user interface such as the concierge 1512 and the operation menu) of the air floating video 3 on the air floating video display 1520 in accordance with detection information including the sensing or the like.

The kiosk terminal that is the air floating video information display system of the first embodiment can provide the convenient and usable interface and necessary information made of the air floating video suitable for the user who uses the kiosk terminal or the like. The system of the first embodiment can provide the operation guidance performed by the concierge serving as a friendly personal image displayed as the air floating video to even a user who operates the user interface such as the operation menu displayed as the air floating video at the first time, a user who does not get used to operating the user interface, an elder user or the like. As a result, the erroneous operation and the erroneous input on the interface of the air floating video can be avoided or reduced, and the operation can be more secured.

Second Embodiment Regarding Kiosk Terminal

Figure 18:
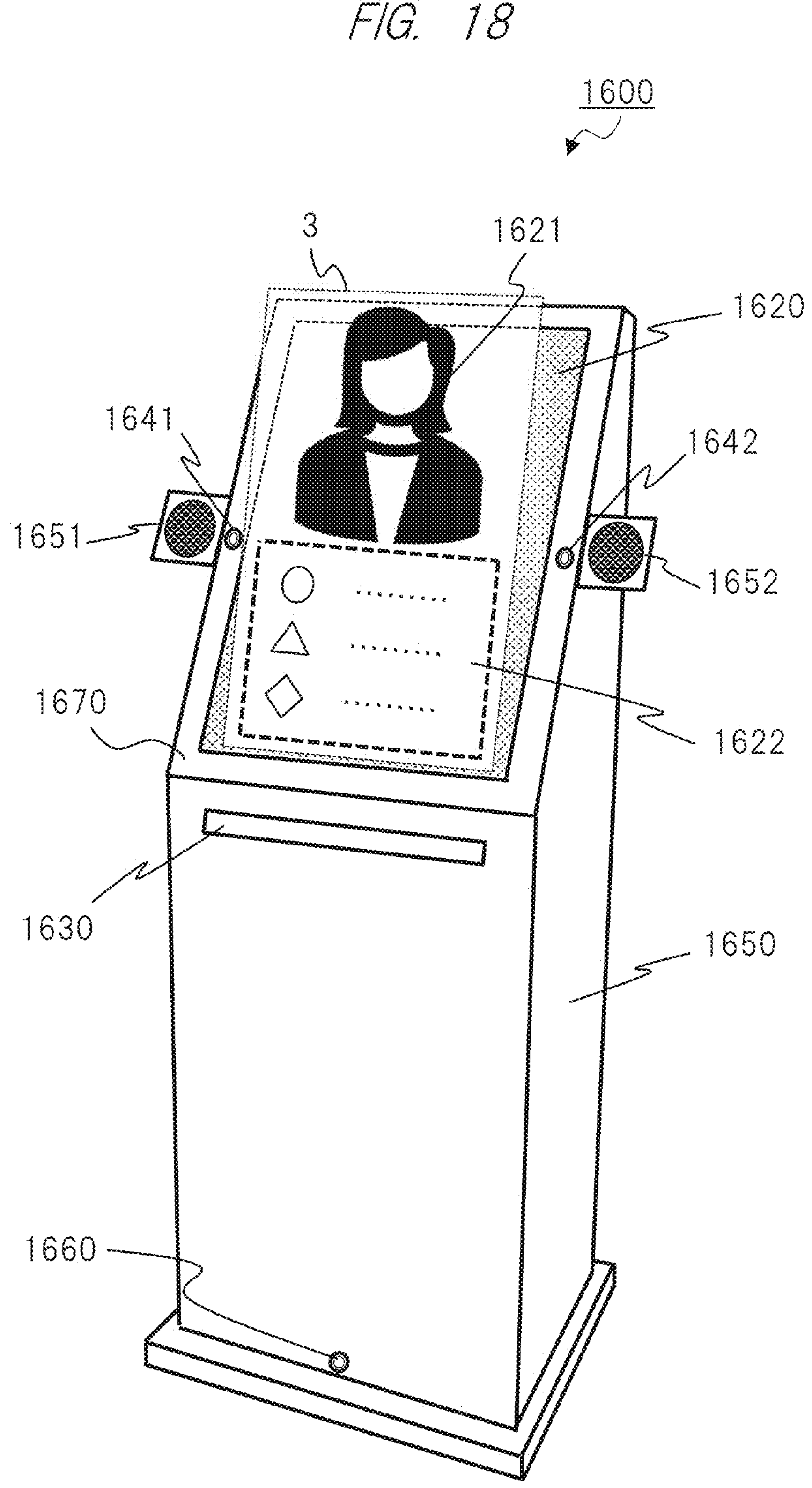
FIG. 18 is a diagram illustrating an external appearance example of a kiosk terminal according to an embodiment (second embodiment)

FIG. 18 shows a configuration example of an external appearance of another example (that is a second embodiment) regarding the kiosk terminal. A kiosk terminal 1600 illustrated in FIG. 18 is different from the configuration of FIG. 16 in that the configuration includes not the liquid crystal display screen 1510 but an air floating video display 1620 substantially on an entire inclined surface 1670 of a housing 1650. One screen based on this air floating video display 1620 is larger in size than a screen of the air floating video display 1520 of FIG. 16. In the embodiment of FIG. 18, the air floating video display 1620 has one screen having a vertically-long size, and displays one air floating video 3. In the present embodiment, both the concierge and the operation menu are displayed in parallel inside the air floating video 3 on the one scree, and the concierge performs the guidance about the operation of the operation menu.

The air floating video display 1620 displays the air floating video 3 in front of the inclined surface 1670. In the present embodiment, as the air floating video 3, a concierge 1621 is displayed on the upper side while an operation menu 1622 is displayed on the lower side. The operation menu 1622 includes, for example, an operation button (illustrated as circle or triangle) or the like. The concierge 1621 explains or performs the guidance about the operation method of the operation menu 1622 or the like. Even in the configuration of FIG. 18, as similar to the case of FIG. 16, the user can easily operate the kiosk terminal 1600, particularly the operation menu 1622, and receive the desirable services.

Even in the configuration of FIG. 18, the housing 1650 houses cameras 1641 and 1642, super-directive loudspeakers 1651 and 1652 and a human detecting sensor 1660 as similar to the configuration of FIG. 16.

Figure 19:
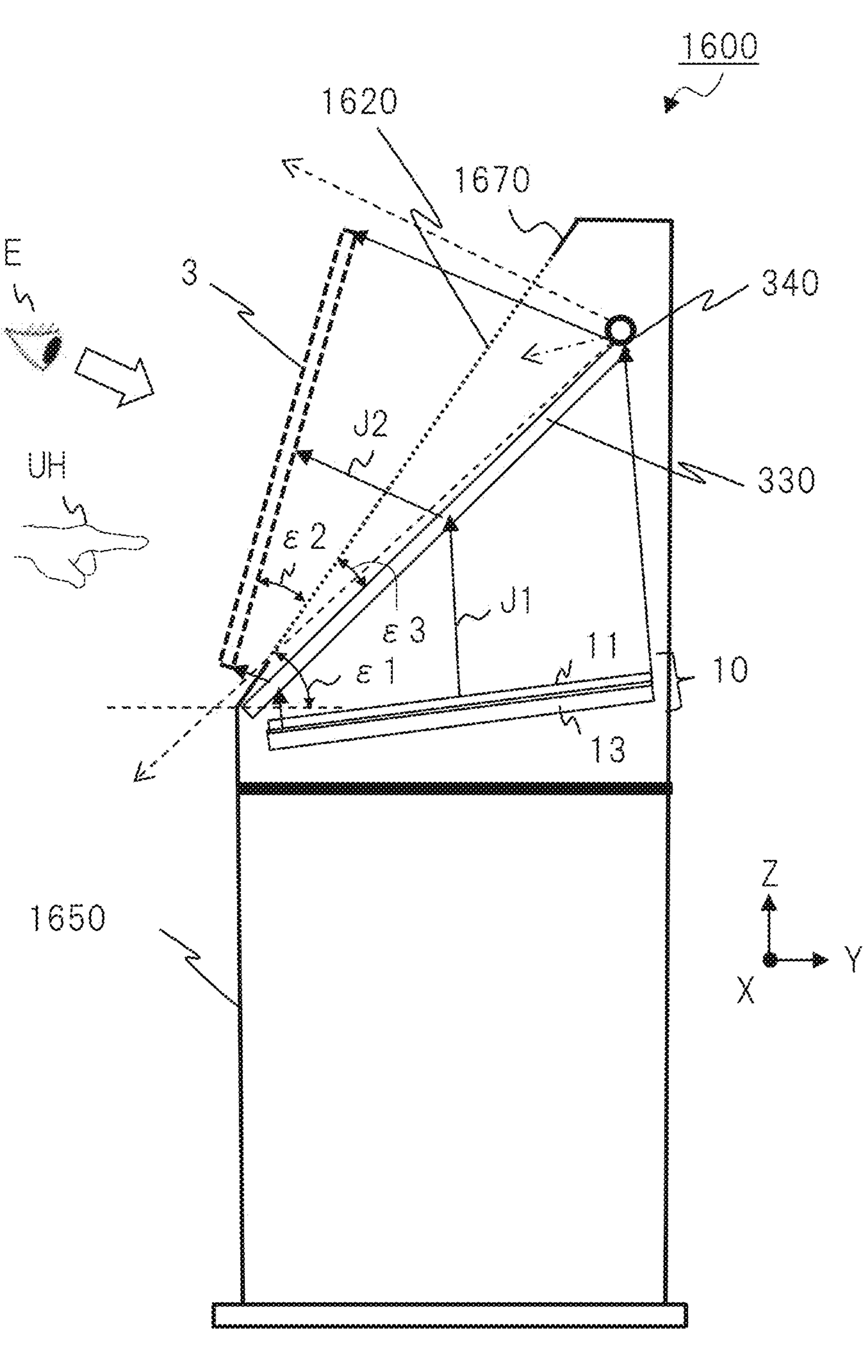
FIG. 19 is a diagram illustrating a cross-sectional structure example of the kiosk terminal according to the second embodiment.

FIG. 19 shows an explanatory diagram of an internal structure of the kiosk terminal 1600 of FIG. 18, and shows an internally transparent Y-Z cross-sectional surface in viewing of the kiosk terminal 1600 from a right side surface. In this kiosk terminal 1600, a housing 1650 houses the components of the air floating video information display system 1 explained with reference to FIG. 13. That is, the video display apparatus 10, the retroreflector 330 and the like are arranged in an upper portion in the housing 1650.

In the configuration of FIG. 19, the video display apparatus 10 is arranged on a bottom surface of the upper portion in the housing 1650 substantially along the horizontal surface (specifically, its depth side in the Y direction inclines slightly upward), and an optical axis "J1" of the video display apparatus 10 is directed substantially vertically upward (Z direction). An opening (illustrated with a dot line) of the air floating video display 1620 is arranged on the inclined surface 1670 of the upper portion of the housing 1650. In the upper portion of the housing 1650, the retroreflector 330 is arranged at a predetermined angle near the opening. The inclined surface 1670 has a predetermined angle "ε1", and the retroreflector 330 is arranged at a predetermined angle "ε3" from the inclined surface 1670.

In the configuration of FIG. 19, as similar to the case of FIG. 13, the video light emitted from the video display apparatus 10 is made incident on the retroreflector 330, and the retroreflection light is emitted toward the opposite side of the video display apparatus 10, in other words, toward the opening of the inclined surface 1670. As a result, the air floating video 3 that is the real image is formed at a predetermined position outside the opening of the air floating video display 1620 of the inclined surface 1670. The air floating video 3 is arranged at an oblique position by a predetermined angle "ε2" from the inclined surface 1670. On the line of sight extending from the viewpoint E on the obliquely upper side toward the obliquely lower side with respect to the air floating video 3, the user can preferably visually recognize the air floating video 3.

In the configuration of FIG. 19, the first ranging apparatus 340 (including the TOF sensor or the like) is arranged at a predetermined position in the upper portion in the housing 1650, that is, at a position near an upper end of the retroreflector 330 in the present embodiment. An optical axis of this first ranging apparatus 340 is directed toward the air floating video 3, and a viewing angle has a width covering the entire air floating video 3. The sensing system including the first ranging apparatus 340 mounted on this kiosk terminal 1600 senses the operation on the air floating video 3 of the air floating video display 1620 performed by the user's hand finger UH.

In FIG. 18, both a form of the concierge 1621 serving as the air floating video 3 and the operation menu 1622 serving as the air floating video 3 are displayed at the same time on one air floating video display 1620. Regarding the display method of the air floating video in the kiosk terminal, the present invention is not limited to this example.

As a modification example, the display of the concierge and the display of the operation menu may be switched within one screen of the air floating video display 1620.

Third Embodiment Regarding Kiosk Terminal

Figure 20:
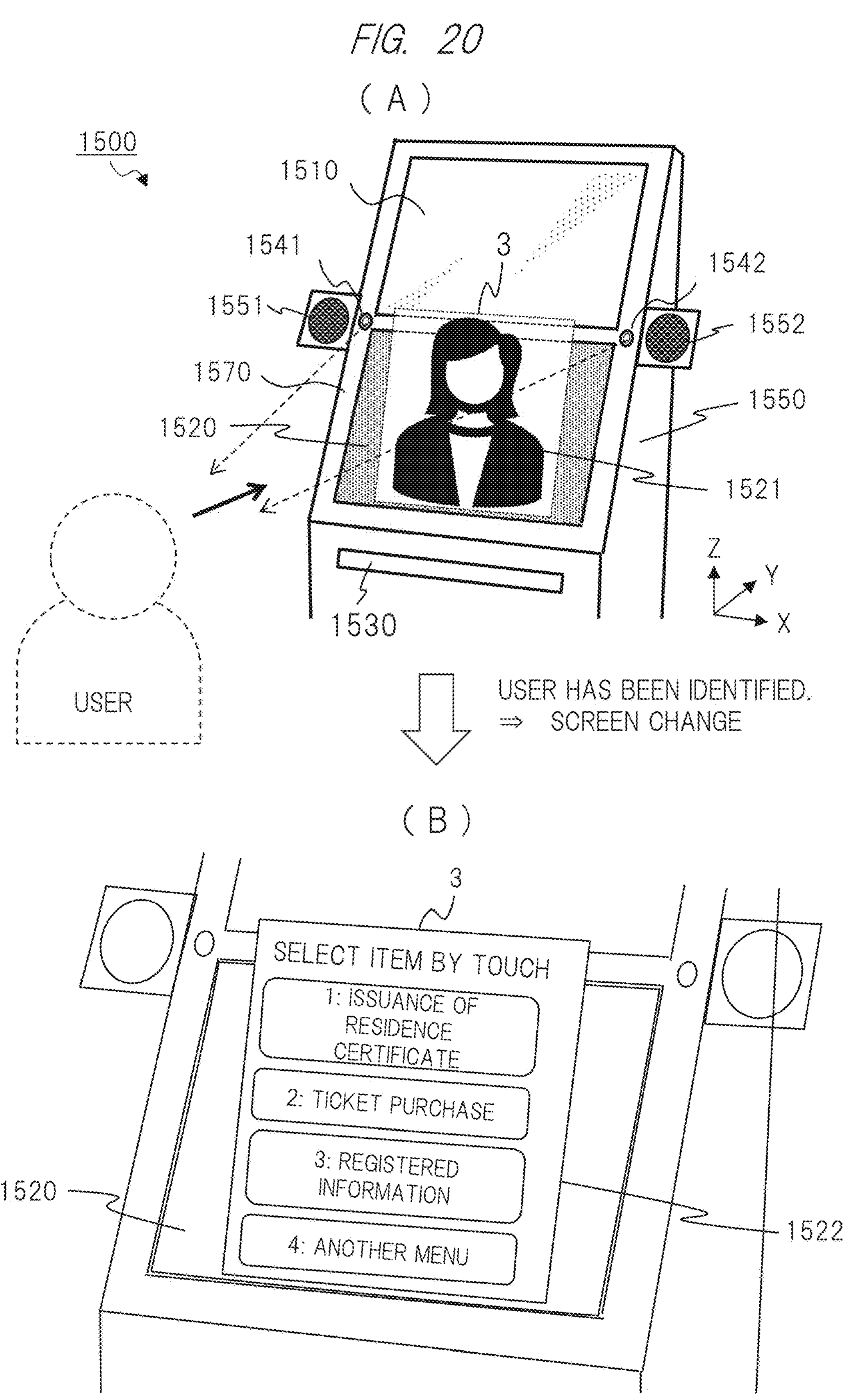
FIG. 20 is a diagram illustrating a display example of a kiosk terminal according to an embodiment (third embodiment)

FIG. 20 shows a display example of the air floating video 3 performed by a kiosk terminal according to an example (that is a third embodiment). The kiosk terminal illustrated in FIG. 20 is configured based on the kiosk terminal illustrated in FIG. 16. The kiosk terminal illustrated in FIG. 20 is a kiosk terminal in which the air floating video 3 formed by the air floating video information display system 1 is applied as the user interface. Each of FIGS. 21 and 22 shows an operation flow provided when the user operates the kiosk terminal illustrated in FIG. 20.

Figure 21:
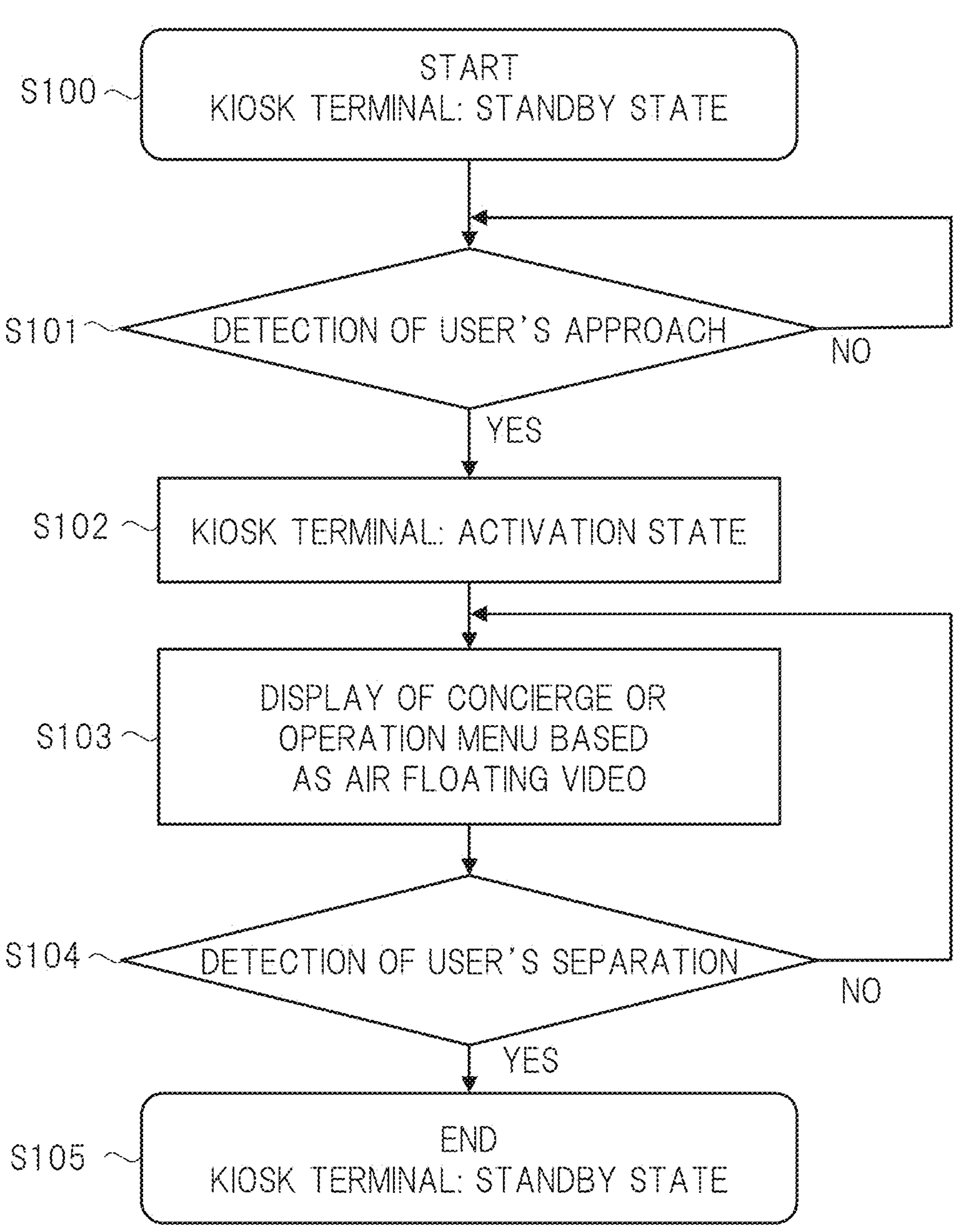
FIG. 21 is a diagram illustrating a first operation flow of the kiosk terminal according to the third embodiment.
Figure 22:
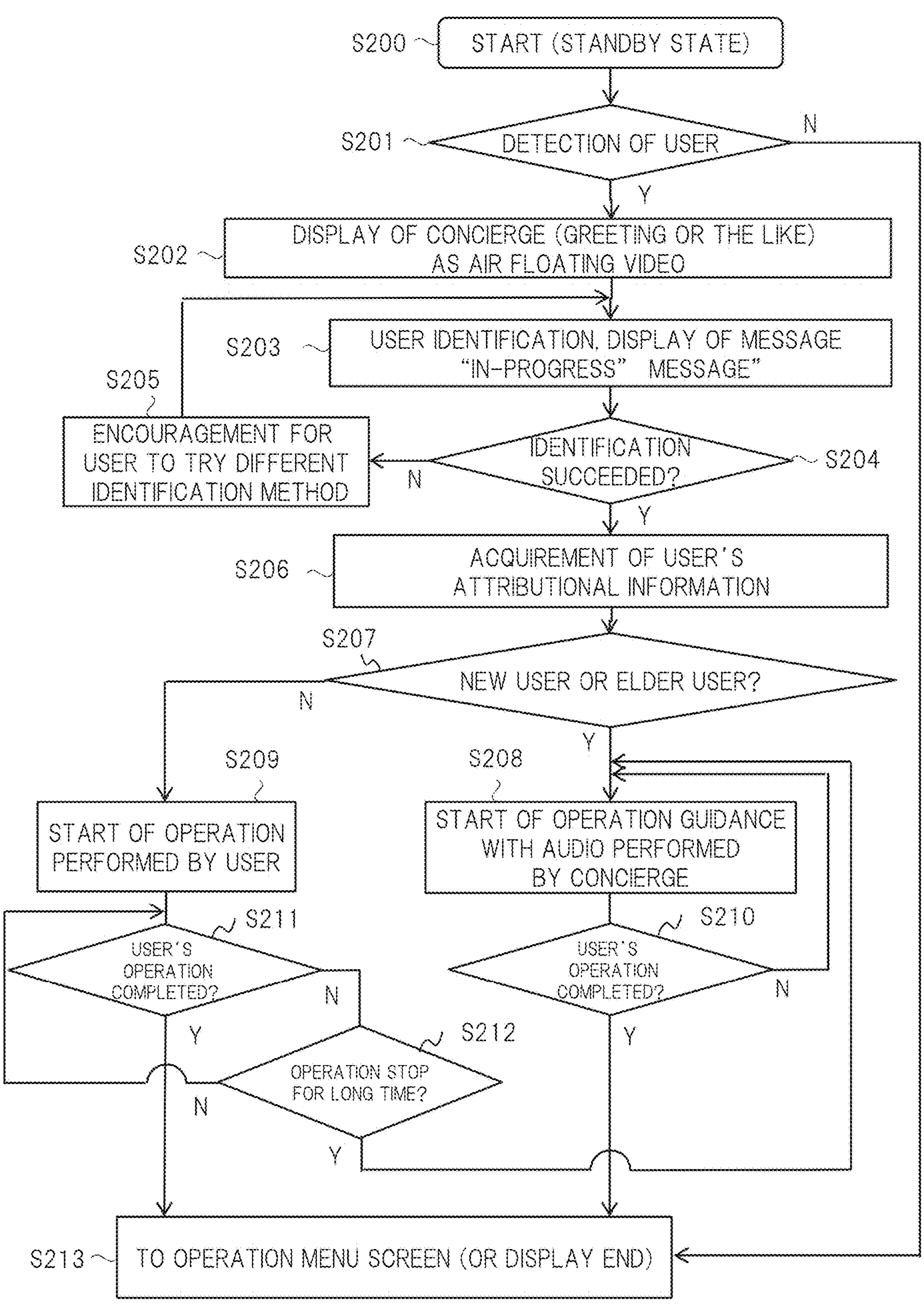
FIG. 22 is a diagram illustrating a second operation flow of the kiosk terminal according to the third embodiment.

FIG. 21 shows a first operation flow regarding time of activation of the kiosk terminal illustrated in FIG. 20. The first operation flow represents a basic operation. In a step S100, at the time of flow start, the kiosk terminal is in a standby state (in other words, a sleep state). In a step S101, the kiosk terminal detects the approach of the user to this kiosk terminal. The user who is trying to use this kiosk terminal approaches the kiosk terminal, or stands at a predetermined position near the kiosk terminal. When the user has approached this kiosk terminal, the approach of the user to (particularly the front surface of the inclined surface 1570 of) this kiosk terminal is detected based on the images captured by the cameras 1541 and 1542. Alternatively, the approach of the user to this kiosk terminal 1500 may be detected by the human detecting sensor 1560 using infrared light rays of FIG. 16 or the like in place of the cameras. If the approach of the user to this kiosk terminal is detected (YES), the state of the kiosk terminal proceeds to the activation state in a step S102. Then, in the activation state, the user can use the kiosk terminal.

In a step S103, the kiosk terminal displays the concierge 1521 or the operation menu 1522 on the air floating video display 1520, receives the operation (in other words, input) on the operation menu 1522 while performing the guidance of the operation method or the like to the user, and performs a predetermined processing (processing for an application or a service) in accordance with the detection of this operation. In a specific example, at the beginning, as illustrated in FIG. 20A, the concierge 1521 is displayed on the air floating video display 1520, and performs the greeting or the operation guidance to the user by using the video and the audio of the concierge 1521. Then, after the greeting or the like ends, the displayed content on the air floating video display 1520 is automatically changed from the concierge 1521 to the operation menu 1522 as illustrated in FIG. 20B. The user operates the operation menu 1522 with his/her hand finger. The kiosk terminal detects the operation by using the sensing technique, and performs the processing in accordance with the detected operation.

Note that the video of the concierge 1521 may be made of a moving image formed by previously capturing an image of a real person, a personal image created by CG or the like, an animation expressing a human form, or the like. The video is not limited to the human but may be an animal, a fictional icon character or the like.

In a step S104, it is detected whether the user has separated from this kiosk terminal. If the user has separated from this kiosk terminal, the separation of the user from (particularly the front side of the inclined surface 1570 of) this kiosk terminal is detected based on the images captured by the cameras 1541 and 1542. Alternatively, the separation of the user from this kiosk terminal may be detected by the human detecting sensor 1560 of FIG. 16 or the like in place of the cameras. If the separation of the user from this kiosk terminal is detected (Y), the state of the kiosk terminal proceeds to the standby state in a step S105.

FIG. 22 shows a second operation flow regarding time of activation of the kiosk terminal of the third embodiment illustrated in FIG. 20. The second operation flow represents an embodiment in more details than that of the first operation flow. The second operation flow represents an operation flow in the case of the user identification or the like as an operation provided after the state of the kiosk terminal becomes the activation state.

In a step S200, at the time of flow start, the kiosk terminal is in the standby state. The user approaches the front surface of the kiosk terminal, or stands at a predetermined position near the kiosk terminal. In a step S201, the kiosk terminal detects whether the user has approached (particularly the front surface of the inclined surface 1570 of) this kiosk terminal, based on the stereo images captured by two cameras. If the user is detected (Y), the kiosk terminal displays the concierge 1521 first on the air floating video display 1520 in a step S202 as illustrated in FIG. 20A, performs the greeting with, for example, a message "Welcome, thank you for using our services" to the user by using the video and the audio of the concierge 1521, and also displays the greeting message.

Next, in a step S203, the kiosk terminal identifies the detected user. At this time, as the air floating video 3, the kiosk terminal also displays a message such as "In progress of identification processing" meaning that the identification processing is currently in progress. For the identification processing, based on the images (particularly face image) captured by two cameras 1551 and 1552, the kiosk terminal may identify/determine the user by performing face identification to a person (that is the detected user) who has approached thereto. Alternatively, identification based on an iris image of the user's eye may be performed. The identification described here is determination of whether the user is an authorized user of this kiosk terminal, previously registered in this system, determined based on a stereo image formed by the capturing of images of a portion such as the user's face, iris or the like within a predetermined range in front of the front surface of the kiosk terminal performed by two cameras.

In this case, the identification based on the user's image is also achieved by the image capturing performed by one camera. However, the usage of the stereo image formed by two cameras 1551 and 1552 can achieve the more accurate user identification making the unauthorized use more difficult than that of the identification based on one camera image. This usage can achieve detection of, for example, the unauthorized identification using a face image in which an image of the face captured only from the front side is printed on a paper.

The identification method is not limited to the face identification or the like. As another method of the user identification, the following methods are also applicable. A user identification method of causing the kiosk terminal to read information on a user identification card such as a my-number card held by the user or information on a commuter pass or the like is also applicable. Alternatively, a user identification method of receiving/transmitting user information stored on a mobile terminal held by the user or the like through near-field wireless communication between the mobile terminal and the kiosk termina is also applicable.

Alternatively, code information such as QR code (registered trademark) containing personal information (such as name, address, birth date, usage history of the kiosk terminal or others) by which the user can be determined is displayed on a mobile terminal such as a smartphone held by the user or the like, and the code information is presented to the air floating video display 1520 of the kiosk terminal (for example, is held over the cameras 1551 and 1552). Then, a user identification method of reading the presented user's information is also applicable.

In a step S204, the kiosk terminal checks whether the user identification has been succeeded. If this has been succeeded, the processing proceeds to a step S206. If this has been failed, the processing proceeds to a step S205. In the step S205, the kiosk terminal encourages the user to try another identification method, the processing returns to the step S203 such that the identification under another identification method is tried. After the user identification processing, the kiosk terminal may cause the air floating video display 1520 to display a predetermined operation menu screen (that is an operation menu corresponding to a large number of unspecified users) or a menu screen (that is a private operation menu) suitable for individual user identified by the identification processing.

In a specific example, after the identification processing has been succeeded, the displayed content on the air floating video display 1520 changes/shifts from the concierge 1521 to the operation menu 1522 as illustrated in FIGS. 20A to 20B. As an example of the display content in the operation menu 1522 in FIG. 20B, a message (letter image) "Select Item by Touching" is displayed. As an example of press buttons for the options or the items, "1: Issuance of Residence Certificate", "2: Ticket Purchase", "3: Registered Information" and "4: Another Menu" are displayed. The item "1: Issuance of Residence Certificate" is an item related to an administrative procedure such as the issuance of the residence certificate. The item "2: Ticket Purchase" is an item related to purchase or reception of a ticket of a concert, a movie, a train or the like. The item "3: Registered Information" is an item related to confirmation or change of the user-related registered information or the like. The item "4: Another Menu" is an item for changing the displayed content to another menu. The user presses the button of, for example, the item "2: Ticket Purchase, depending on purpose. The kiosk terminal changes the displayed content to display of a next operation menu in accordance with the pressed button. More detailed examples will be described below.

[Operation Guidance Performed by Concierge]

In the step S206 of FIG. 22, the air floating video information display system 1 of the kiosk terminal accesses a kiosk server on a communication network through the communication portion 1132 (FIG. 2), and notifies the user of result information of the user identification. Also, the kiosk terminal determines whether this user is a user who used this kiosk terminal in past, by acquiring/referring to attributional information of this user or the like from a user database inside the kiosk server. Alternatively, the kiosk terminal may acquire/refer to the user's attributional information or the like, based on the code information presented from the mobile terminal of the user or the like. The user's attributional information may contain, for example, information of the user's name, age, past usage history of the kiosk terminal or the like.

In the step S206, the kiosk terminal may acquire user information containing the user attributional information from the mobile terminal of the user through wireless communication. The kiosk terminal may acquire not only the user attributional information but also another predetermined data related to the user and the operation menu, such as ticket booking information previously input/registered by the user, from an external apparatus such as the kiosk server. In the step S206, the kiosk terminal may determine the user's attribution such as age, based on the images captured by the cameras 1541 and 1542. The user attributional information acquired in the step S206 is used for determination in a next step S207.

In the next step S207, the kiosk terminal determines whether the user is the "new user" or "elder user" who is trying to use this kiosk terminal, based on the user attributional information acquired in the step S206. If it is determined that the user is the user fit into such a predetermined condition (YES), the processing proceeds to a step S208. If it is determined that the user is the user not fit into this (NO), the processing proceeds to a step S209.

In the present system, the processing is branched depending on the determination result of the step S207. In this case, the processing is roughly branched into two processing. One of them is the first processing flow (that is the flow from the step S209) the user of which is assumed to be the user who gets used to the system, and the other is the second processing flow (that is the flow from the step S208) the user of which is assumed to be the user (new user or elder user) who does not get used to the system. In the first processing flow, the kiosk terminal eliminates the operation guidance performed by the concierge or provides the simpler operation guidance than that of the second processing flow. In the second processing flow, the kiosk terminal provides the detailed operation guidance performed by the concierge.

In the step S208, the kiosk terminal provides the "operation guidance with the audio performed by the concierge" on the air floating video display 1520. Note that the "concierge" means a "guide", and the concierge 1521 (that is schematically illustrated in the drawing) is displayed as the air floating video 3 such as a human upper body video as illustrated in FIG. 20A. For the new user who operates the kiosk terminal using the air floating video 3 as the user interface at the first time or the elder user who does not get used to this operation, the concierge 1521 performs the guidance related to the operation method or the like to this user by using the audio or motion. The concierge 1521 explains or performs the guidance about a part of the operation of the operation menu 1522, the part being not understandable for the user, as illustrated in FIG. 20B.

More specifically, in the step S208, as illustrated in FIG. 20A, the video of the concierge 1521 is displayed first on the screen of the air floating video display 1520. The concierge 1521 outputs the letter video and audio indicating that "Let me perform the guidance about the operation method. Please operate the menu in accordance with my explanation" or the like. The audio is provided by, for example, the method of using the super-directive loudspeakers 1551 and 1552 of FIG. 20A making the audio audible only for the user. The concierge 1521 performs the operation guidance while sequentially notifying the user of the usage method of the kiosk terminal and the operation menu.

Next, in both cases of the steps S208 and S209, as illustrated in FIGS. 20A to 20B, the video of the concierge 1521 serving as the air floating video 3 is switched to the video of the operation menu 1522 serving as the air floating video 3. In this case, in the step S208, even after the screen of the air floating video 3 is switched to the operation menu 1522, the guidance performed by the concierge 1521 is continued. The kiosk terminal appropriately performs the switching between the display of the concierge 1521 and the display of the operation menu 1522 on the air floating video display 1520. In accordance with the operation guidance performed by the concierge 1521, the user operates the operation menu 1522 on the screen of the air floating video display 1520.

Next, in a step S210, the user performs a predetermined sequence operation such as an operation of inputting a passcode or the like for the ticket issuance on the operation menu 1522 of the kiosk terminal. The kiosk terminal detects this operation, performs the processing, and issues the ticket. The user receives the ticket from an ejection port 1530. If the desirable operation for the user and the operation such as the ticket issuance in the kiosk terminal corresponding to the desirable operation have been completed (Y), the processing proceeds to a step S213.

In the step S213, in the kiosk terminal, an operation menu 1522 (such as a first menu screen, a next menu screen if the next menu exists, a last menu screen or the like) is displayed again on the screen of the air floating video display 1520. Alternatively, the kiosk terminal ends the display on the air floating video display 1520. Alternatively, at the end of the display, the kiosk terminal may lastly display the concierge 1521 on the screen, and may output a message (Thank you for using our services) indicating the end to the user.

On the other hand, in a step S209, the kiosk terminal performs the display assumed to be used by the user who does not perform the operation at the first time but gets used to the operation to some extent. As illustrated in FIG. 20B, the kiosk terminal switches the display on the screen of the air floating video display 1520 to the operation menu 1522. Then, the user performs the desirable operation such as the item selection in accordance with the operation menu 1522 on the screen. In a step S211, as similar to the step S210, if the predetermined sequence operation and the operation (such as the ticket issuance) corresponding to the operation have been completed (Y), the processing proceeds to a step S213.

In this case, in consideration of a possibility of a state in which the operation performed by the user is not made well even if the processing proceeds to the step S209, the step S212 is provided. If the predetermined sequence operation performed by the user has not been completed (N), the processing proceeds to the step S212. In the step S212, on the operation menu 1522, the kiosk terminal determines whether the operation performed by the user is made well. In a specific example, on the operation menu 1522, the kiosk terminal determines whether the operation performed by the user has stopped (in other words, the input has not been performed) for a longer period of time than a predetermined period of time (such as 30 seconds). The user possibly stops the operation when, for example, the user does not understand the operation on the operation menu 1522 made of the air floating video 3 so much. The kiosk terminal detects the long operation stop by using the camera, the sensing technique or the like. If it is determined that, for example, the operation has stopped for the long period of time (Y), the processing proceeds to the step S208. If it is determined that the operation has not stopped for the long period of time (N), the processing proceeds to the step S211.

In another example, in the step S212, the kiosk terminal may determine whether the user erroneously operates the surface (operation menu 1522) of the air floating video 3. For example, it may be determined that the hand finger is trying to touch a position separate from the item button or the like.

If the processing proceeds from the step S212 to the step S208, in the kiosk terminal, the concierge 1521 is displayed on the air floating video display 1520 for the user, and the operation guidance is performed by the concierge 1521. At this time, as the operation guidance performed by the concierge 1521, the kiosk terminal may playback the operation guidance made of the previously-defined content. However, more preferably, the concierge performs the operation guidance about a part of the operation menu 1522, the part at which the operation performed by the user has stopped in the step S212. For example, if the operation performed by the user has stopped on the operation menu after the button "2: Ticket Purchase" illustrated in FIG. 20B is pressed, the concierge 1521 in the kiosk terminal performs the guidance about how to operate the operation menu next in the operation menu.

Note that the operation examples are similarly applicable to the embodiment illustrated in FIG. 18, that is the configuration example of displaying both the concierge 1621 and the operation menu 1622 in parallel in the screen of one air floating video 3. In this case, in the screen, the concierge 1621 can perform the operation guidance or the like while, for example, pointing to the operation menu 1622 with the concierge's finger tip.

According the third embodiment, the kiosk terminal displays the concierge 1521 as the air floating video 3 when being triggered by the approach of the user to the kiosk terminal, and starts the operation guidance performed by the concierge 1521. Therefore, even the user who operates the kiosk terminal at the first time or the elder user or the like who does not get used to the operation can reliably perform the predetermined operation in accordance with the operation guidance performed by the concierge 1521, the audio (the operation guidance inaudible for another person) from the super-directive loudspeaker or the like.

According the third embodiment, the user is determined based on the identification, and the operation method or the like is carefully explained by the concierge for the user who operates the kiosk terminal at the first time, the user who does not get used to the operation, the elder user or the like, based on the user's age or system usage history. Therefore, even such a user can perform the reliable key input operation or the like to the operation menu serving as the air floating video 3. To the user who gets used to the operation, the services can be efficiently provided by elimination or simplification of the operation guidance.

Figure 25:
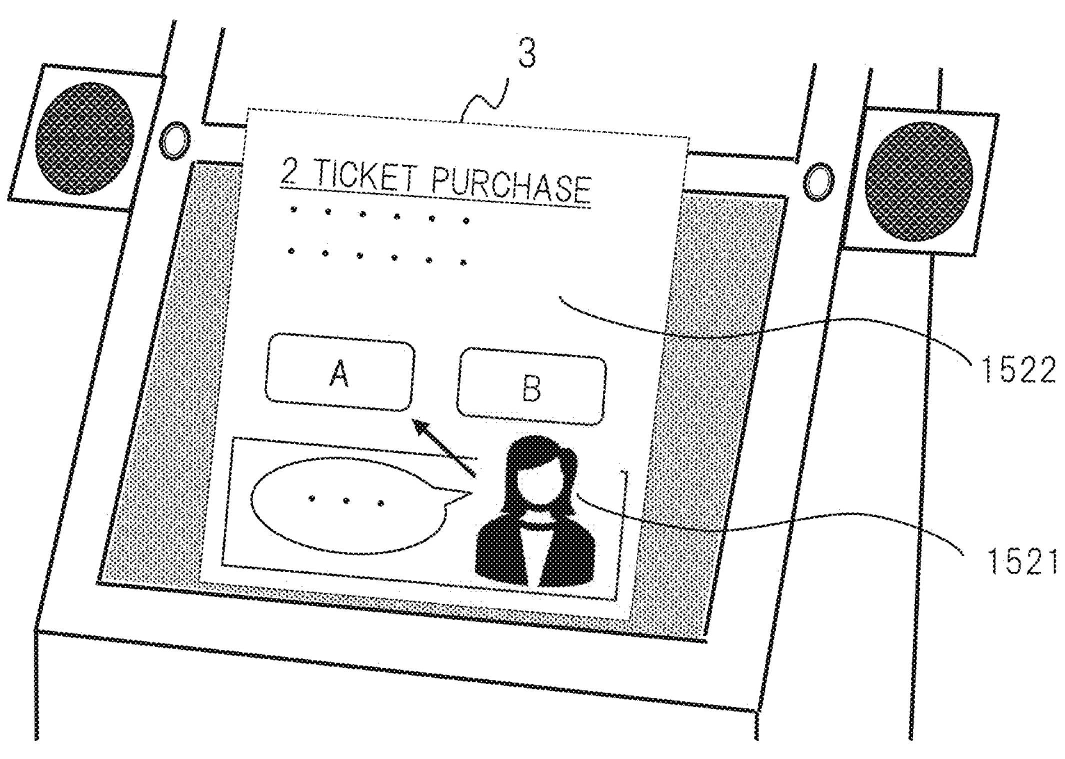

As modification examples of the third embodiment or the like, the following methods are also applicable. FIG. 25 shows a display example of such a modification example. The kiosk terminal displays the video of the operation menu 1522 as a base video as large as possible in one screen of the air floating video 3 on the air floating video display 1520. On this operation menu 1522, the kiosk terminal displays the video of the concierge 1521 having a smaller size to be overlapped with the video. Then, in the kiosk terminal, the concierge 1521 performs the operation guidance about the operation menu 1522. As the concierge 1521, the moving video together with, for example, body motion, hand motion, mouth motion, eye motion or the like, is better than the still image. In the kiosk terminal, the presence/absence of the display of the concierge 1521, the display position of the same or the like may be appropriately changed in the screen of the operation menu 1522.

Fourth Embodiment Regarding Kiosk Terminal

Figure 23:
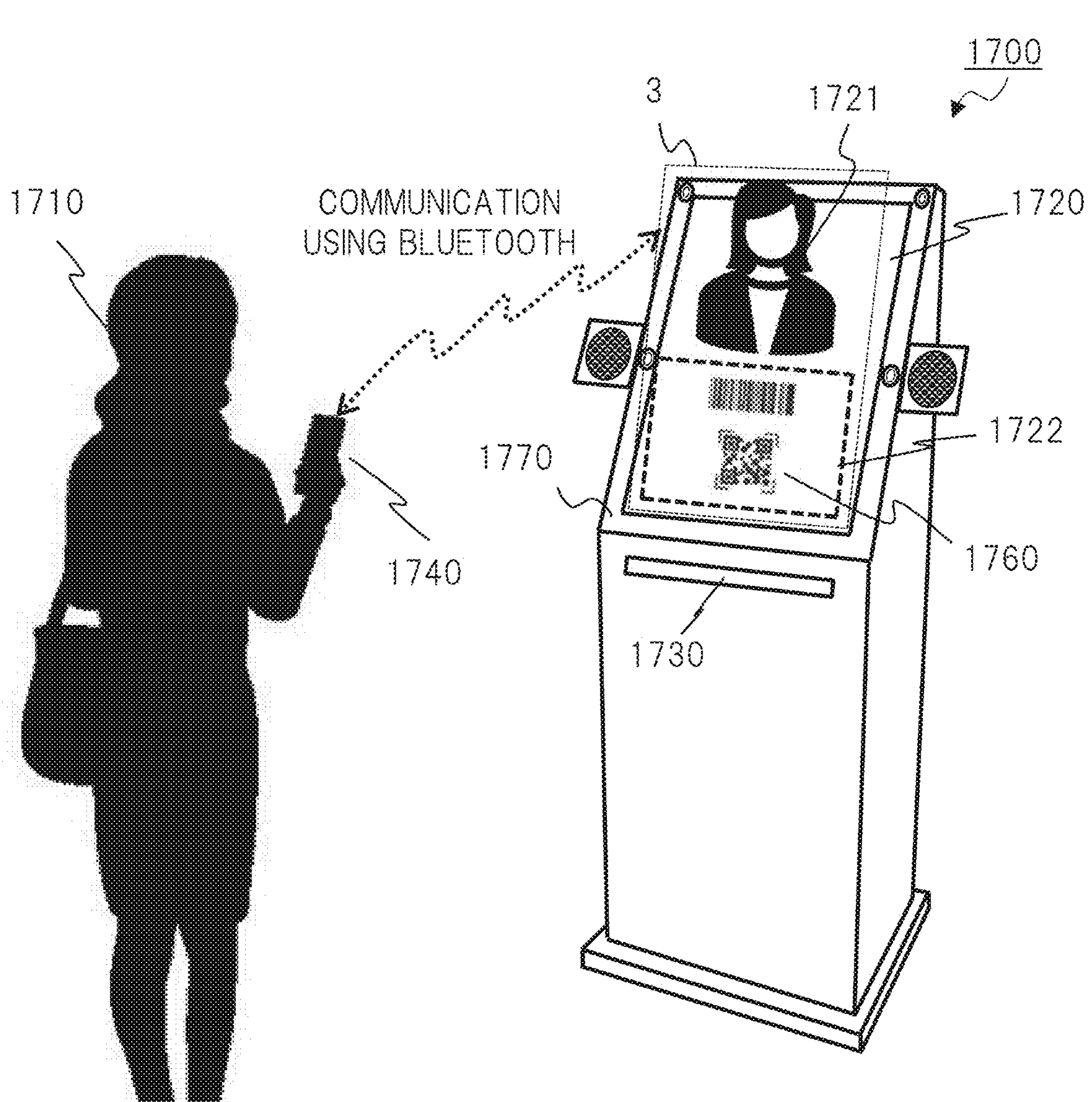
FIG. 23 is a diagram illustrating a cooperative operation between a kiosk terminal and a mobile terminal according to an embodiment (fourth embodiment)

As another example (that is a fourth embodiment), FIG. 23 shows an example of a cooperate operation between a kiosk terminal and a mobile terminal held by the user. The kiosk terminal 1700 of FIG. 23 is a kiosk terminal in which the air floating video 3 formed by the air floating video information display system 1 is applied as the user interface. When a user 1710 operates this kiosk terminal 1700, the kiosk terminal 1700 and the mobile terminal 1740 such as the smartphone held by the user 1710 cooperate with each other. A configuration of the kiosk terminal 1700 of FIG. 23 is based on the configuration of the kiosk terminal 1600 of FIG. 18.

For example, a case of a procedure for purchasing a ticket (such as certain concert ticket) by the user 1710 who uses the kiosk terminal 1700 will be explained. When the user 1710 approaches the kiosk terminal 1700 as similar to FIGS. 21 and 22, the kiosk terminal 1700 identifies the user 1710, and displays a concierge 1721 and an operation menu 1722 on an air floating video information display 1720. The user operates the operation menu 1722 in accordance with the guidance performed by the concierge 1721 or the like. For example, the item "2: Ticket Purchase" is selected from the operation menu 1522 as illustrated in FIG. 20B and is operated. In the kiosk terminal, the operation menu 1722 changed from the display of the item "2: Ticket Purchase" is displayed in the screen of the air floating video information display 1720. On the operation menu 1722, the user 1710 performs the detailed operation for the ticket purchase.

The ticket is issued in a form of, for example, paper printing, and the user 1710 receives the paper ticket. Alternatively, as a method of receiving the ticket, not the ticket printed on the paper but so-called electronic ticket (or also referred to as "e-ticket") form can be received. In this case, the user 1710 receives the same information (that is the electronic ticket) as the ticket printed on the paper through a mobile terminal 1740 held by the user 1710. In the present example, at the time of the operation on the operation menu 1722, the near-field wireless communication between the mobile terminal 1740 and the kiosk terminal 1700 is performed through a communication interface such as Bluetooth (registered trademark). The electronic ticket is directly transmitted from the kiosk terminal 1700 to the mobile terminal 1740 of the user. In this case, in the kiosk terminal, the operation guidance about the communication is performed by the concierge 1721.

In another example, in the kiosk terminal 1700 as illustrated in FIG. 23, code information 1760 (in other words, code video) such as a barcode or a QR code (registered trademark) containing the information content of the electronic ticket is displayed as the air floating video 3 (such as a part of the operation menu 1722) on the screen of the air floating video information display 1720. The user 1710 reads the code information by using his/her mobile terminal 1740. For example, the user 1710 performs an operation of reading the code information 1760 displayed in the operation menu 1722 by using a reader function such as a camera of the mobile terminal 1740 in accordance with the guidance performed by the concierge 1721. The concierge 1721 performs the guidance about the reading operation. The mobile terminal 1740 acquires the electronic ticket, based on the read code information 1760, and stores it into an internal memory of the mobile terminal 1740 or the like.

An object or information that can be received from the kiosk terminal 1700 by the user 1710 is not limited to the paper ticket or the electronic ticket but also may be, for example, coupon or point information that is usable in shopping, an electronic book or the like. The ticket or coupon printed on the paper is possibly lost. However, since the electronic ticket or coupon is stored inside the mobile terminal 1740, the possibility of the losing can be reduced. Since the electronic ticket or coupon is stored inside the mobile terminal 1740, usage modes in which the user presents the mobile terminal or in which a ticket issuer reads the electronic ticket stored inside the mobile terminal are achieved at the time of the real usage of the ticket as compared to the ticket or coupon printed on the paper in addition to the reduction of the possibility of the losing. As a result, the convenience for the user is improved.

In the kiosk terminal, information (such as the access history information, the operation history information or the like) related to the operation menu of the air floating video 3 may be transmitted to the mobile terminal of the user through the wireless communication in accordance with the user's operation on the operation menu.

Fifth Embodiment Regarding Kiosk Terminal

Figure 24:
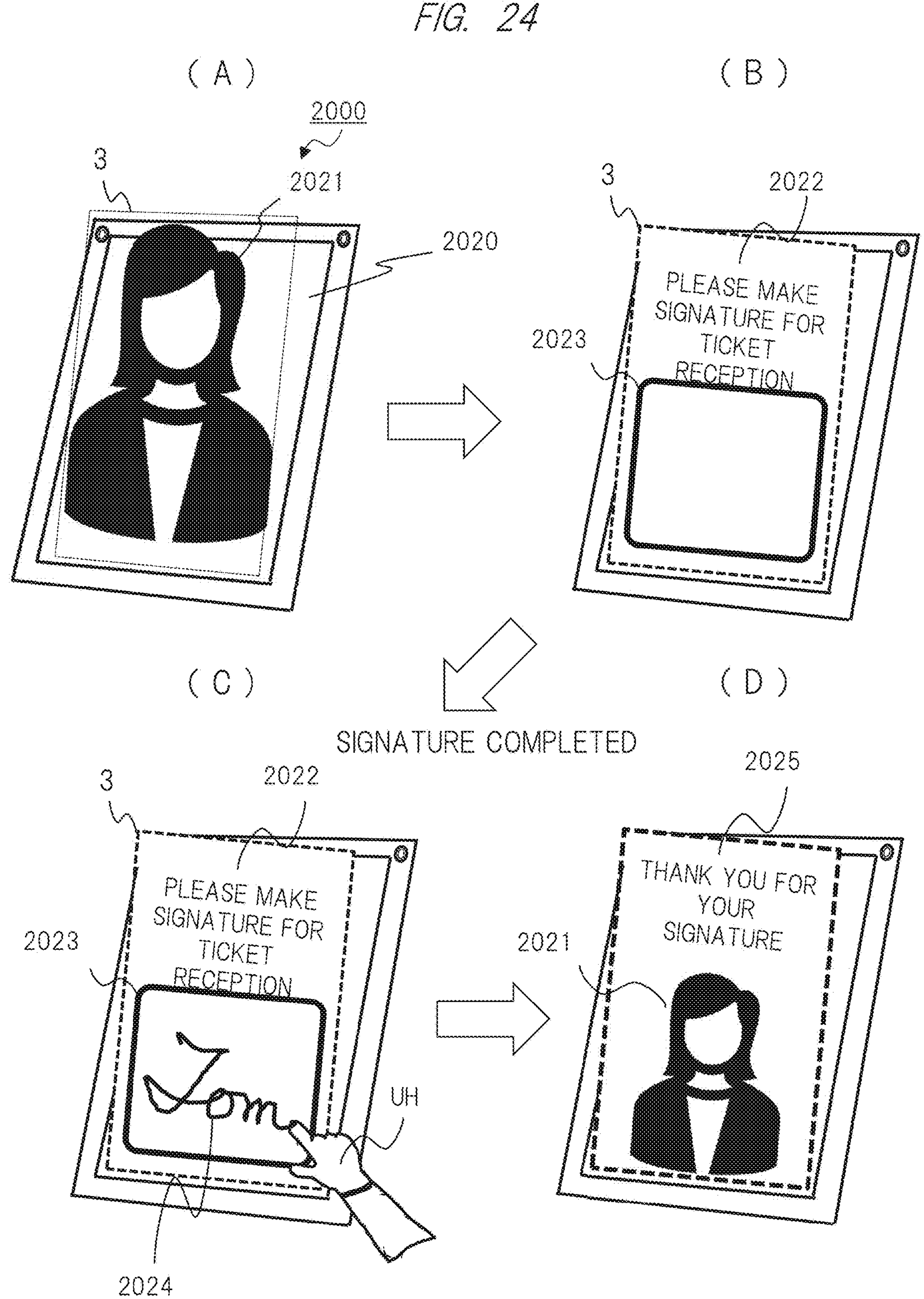
FIG. 24 is a diagram illustrating an operation/display example of a kiosk terminal according to an embodiment (fifth embodiment)

As an example (that is a fifth embodiment), FIG. 24 shows a specific example related to the function (FIG. 12) enabling the user to input/draw any letter or figure on the air floating video 3. For example, after the user receives the paper-based ticket or the electronic ticket from the kiosk terminal under a sequence procedure explained with reference to FIG. 23 and the like, the user performs "signature" for acknowledging that the user has received the ticket.

A kiosk terminal 2000 of FIG. 24 is an example based on the configuration of the kiosk terminal of FIG. 18 or 23, and only an air floating video display 2020 is illustrated. FIG. 24A shows a state in which a concierge 2021 is displayed as the air floating video 3 on the air floating video display 2020. FIG. 24B shows a state in which the user interface used for the signature input is displayed as the air floating video 3. FIG. 24C shows a state in which the signature is input/drawn in the user interface by the user. FIG. 24D shows a state in which the concierge 2021 corresponding to the end of the signature input is displayed as the air floating video 3.

The kiosk terminal issues the ticket, and then, the user receives this ticket. After that, in the kiosk terminal, the concierge 2021 is displayed as the air floating video 3 on the air floating video display 2020 as illustrated in FIG. 24A. To the user, the concierge 2021 outputs a video and audio with, for example, a message "Lastly, please perform the signature for acknowledging that the customer (user) has received the ticket". As a result, the user is encouraged to perform the signature (in other words, reception signature) onto the air floating video 3.

Next, in the kiosk terminal, the display of the form of the concierge 2021 disappears, and a signature screen 2022 (in other words, user interface for the signature input) is displayed as the air floating video 3 on the air floating video display 2020 as illustrated in FIG. 24B.

In the example of FIG. 24B, a message "Please perform the signature for the ticket reception" is displayed as letters drawn as the air floating video 3 on the signature screen 2022. Below this message, a frame (signature frame region) 2023 representing a region for the signature is displayed. The frame 2023 is displayed such that its background is colored with a predetermined background color (such as black) while the frame with four sides is colored with a predetermined color (such as green). If the finger tip is not inserted into the frame 2021, the frame 2021 is colored with the predetermined color (such as green).

Next, as illustrated in FIG. 24C, the user performs an operation of drawing his/her name such as "Tom" of a cursive letter form in the present example as the signature into the frame 2023 by using the finger tip of his/her hand finger UH or a predetermined conductive pen. At this time, as similar to the above description (FIG. 12), the kiosk terminal detects the aerial operation on the plane of the air floating video 3 by using the sensing technique, and draws a line in real time into the plane (frame 2023) of the air floating video 3 to match with the detected contact position of the finger tip. The line 2024 is a line of a cursive letter form representing the input/drawn signature ("Tom"). The line 2024 is displayed with a predetermined color.

After the user ends the drawing of his/her name as the signature, the user separates the finger tip frontward from the signature frame region 2023 of the air floating video 3. If determining/detecting that a predetermined period of time (such as 5 seconds) has elapsed after the finger tip separation, the kiosk terminal recognizes the signature input performed by the user as being already completed. Then, as illustrated in FIG. 24D, the kiosk terminal changes the screen to a screen 2025 showing the end of the signature input. On this screen 2025, for example, a message "Thank you for your signature" is displayed and output with audio together with the form of the concierge 2021. At this step, the sequence operation for the "signature" used for acknowledging that the user has received the ticket is ended.

Note that the technique explained with reference to FIG. 12 is also applicable as the technique of inputting the user's name as the signature into the frame 2023 serving as the air floating video 3 by using the user's own finger tip or the like as illustrated in FIG. 24B. The explanation in FIG. 12 shows the example in which the color of the entire frame of the air floating video 3 is changed to, for example, red when the user's own finger tip is inserted in the depth direction at any position on the plane of the air floating video 3. On the other hand, in the example of FIG. 24B, not the entire frame of the air floating video 3 but only the partial region (signature frame region 2023) in the air floating video 3 is set to the region for the signature input/drawing. And, when detecting that the finger tip is inserted into (in other words, in contact with) this region, the kiosk terminal may change the color of the frame 2023 of this region to, for example, red.

When the user's own finger tip is inserted at any position on the plane of the air floating video 3, in other words, is in the state with the contact, the frame 2023 may be displayed with not red but a different predetermined color such as blue. Alternatively, in the state with the contact, the frame 2023 may be blinked. Alternatively, in the state with the contact, the color of the background region in the frame 2023 may be changed to white while the line color drawn in the background region may be a predetermined color such as black. Alternatively, the color of the background region in the frame 2023 may be black while the line color drawn in the background region may be white. In other words, the kiosk terminal controls the display in the signature frame region 2023 such that the line of the letter or the figure drawn in the signature frame region 2023 in accordance with the user's finger tip motion is recognizable for the user. The kiosk terminal controls the display to change the display mode in the signature frame region 2023 in accordance with the state with/without the finger-tip contact on the signature frame region 2023.

In the related-art air floating video display apparatus, the user mainly performs the selection operation through the optional button on the operation menu made of the air floating video. On the other hand, the fifth embodiment provides the function (aerial signature function) enabling the user to input any letter or the like as the signature to the air floating video 3 while moving the hand finger. In this function, the display of the frame 2023 or the like changes depending on whether the finger tip is in contact with the plane of the air floating video 3, and therefore, the user can easily recognize whether the finger tip is in contact with the plane of the air floating video 3, and easily input the signature. As the example, the example of using the input on the air floating video 3 as the signature has been described above. However, the present invention is not limited to this example, and is also applicable to other applications.

First Configuration Example of Video Display Apparatus

Figure 26:
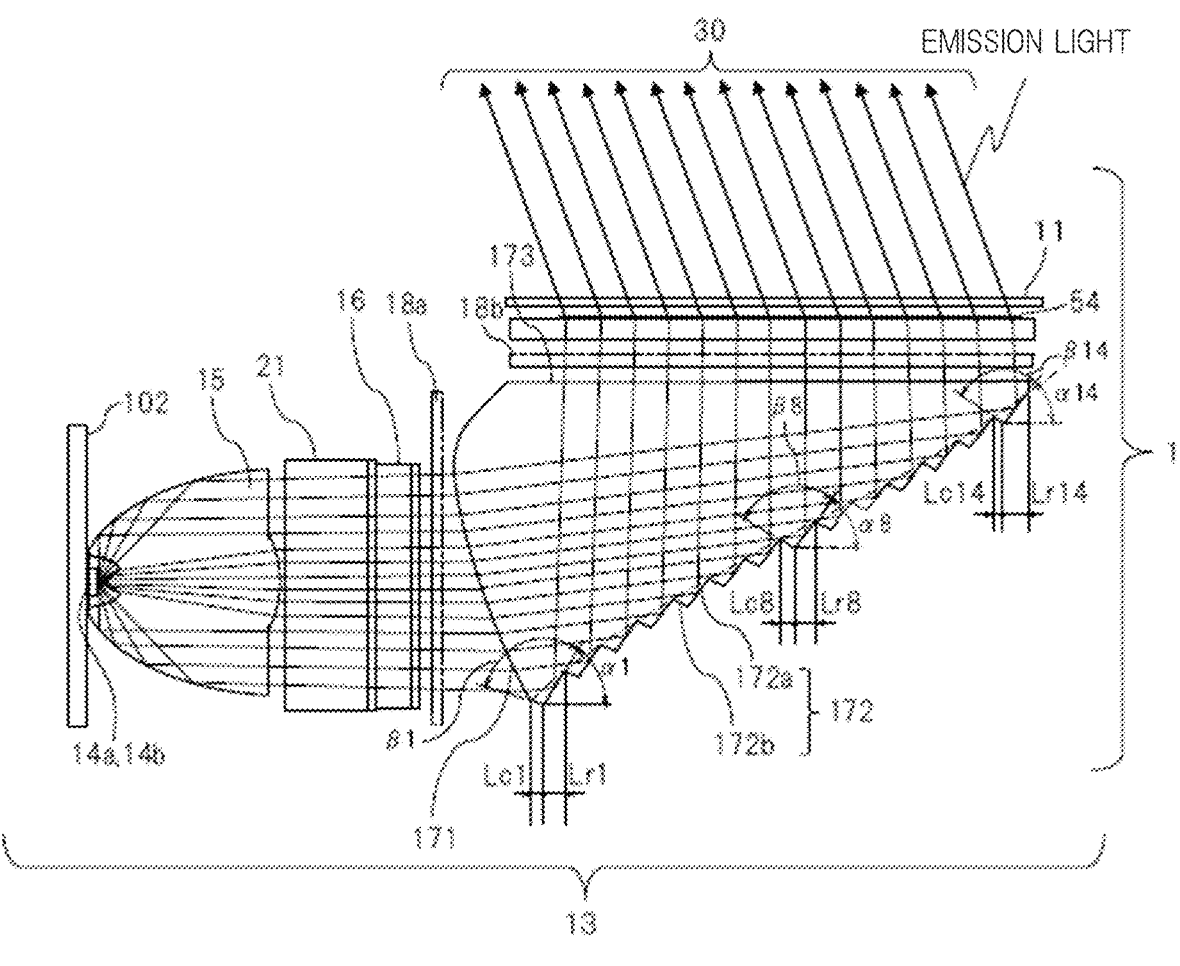
FIG. 26 is a cross-sectional view illustrating a specific configuration example of a light source.

Next, a detailed configuration example of the air floating video information display system 1 will be explained with reference to FIG. 26 and the subsequent drawings. FIG. 26 shows an example of a more specific configuration of the video display apparatus 10 configuring the air floating video information display system 1. The light source 13 of FIG. 26 has the similar configuration to that of a light source described in FIG. 27 or the like later. This light source 13 is configured such that an LED, a collimator, a polarization converting element, a composite (synthesis)/diffusion block, a light guiding body and the like are housed in a case made of plastic or the like. The liquid crystal display panel 11 is attached onto an upper surface of the light source 13. An LED substrate 102 on which an LED element 102A that is a semiconductor light source and a control circuit for the LED element are mounted is attached to one side surface of the case of the light source 13. Note that a heat sink (not illustrated) that is a member for cooling the heat generated in the LED element 102A and the control circuit is attached to an outer surface of the LED substrate 102.

To a liquid crystal display panel frame attached to an upper surface of the case, the liquid crystal display panel 11 attached to this frame, a flexible wiring substrate (Flexible Printed Circuit: FPC) electrically connected to this liquid crystal display panel 11 and others are attached. In other words, the liquid crystal display panel 11 that is the liquid crystal display component generates the display video in corporation with the LED element 102A that is a solid light source by modulating an intensity of the transmission light on the basis of a control signal output from a control circuit configuring the electronic device.

First Configuration Example of Light Source

Subsequently, a configuration example of the optical system such as the light source housed in the case in the first configuration example of the video display apparatus will be explained in detail with reference to FIG. 27 in addition to FIG. 26. In FIG. 26, the LED 102A configuring the light source is attached to a predetermined position of the collimator 15. Since FIG. 26 shows one cross-sectional view, only one LED element or collimator illustrated. However, a plurality of LED elements are arranged on the LED substrate 102, and a plurality of collimators are arranged thereon to correspond to the LED elements. Each of the collimators 15 is made of, for example, a light-transmittable resin such as acrylic resin. The collimator 15 has a conically convex outer circumferential surface 156 formed by rotation of a paraboloid cross section, and has a concave portion 153 with a convex portion (in other words, a convex lens surface) 157 at center of its apex (a side in contact with the LED substrate 102).

A center of a plane portion (on an opposite side of the apex) of the collimator 15 has a convex lens surface 154 that protrudes outward (or may be a concave lens surface that is recessed inward). Note that the paraboloid surface 156 forming the conically-shaped outer circumferential surface of the collimator 15 is set at an angle range allowing the light peripherally emitted from the LED element 102A to be internally totally reflected, or forming the reflection surface.

Meanwhile, the LED element 102A (LED elements 14*a* and 14*b* in FIG. 27A) is arranged at each of predetermined positions on the surface of the LED substrate 102. The LED substrate 102 is arranged and fixed so that each LED element 102A on its surface is positioned at center of the concave portion 153 to correspond to the LED collimator 15.

In such a configuration, by the collimator 15, among the light emitted from the LED element 102A, particularly the light emitted upward (in the right direction in the drawing) from its center is collected to form the substantially collimated light by the two convex lens surfaces 157 and 154 forming the outer shape of the LED collimator 15. The light peripherally emitted from other portions is reflected by the paraboloid surface forming the conically-shaped outer circumferential surface of the collimator 15, and is similarly collected to form the substantially collimated light. In other words, by the collimator 15 having the convex lens formed on its center and the paraboloid surface formed on the peripheral portion, almost all the light components generated by the LED element 102A can be extracted as the collimated light. In this manner, the use efficiency of the generated light can be improved.

Note that a light emission region of the collimator 15 is provided with the polarization converter element 21 (in other words, polarization converter member). The polarization converter element 21 is an element that converts the polarization property of the incident light. As clearly seen from FIG. 27A, the polarization converter element 21 is made of combination of a pillar-shaped light transmittable member having a parallelogram cross section (referred to as parallelogram pillar below) and a pillar-shaped light transmittable member having a triangle cross section (referred to as triangle pillar below), and a plurality of these members are arranged in an array form in parallel to a surface orthogonal to an optical axis of the collimated light emitted from the collimator 15. Further, a polarization beam splitter (PBS film) 211 and a reflection film 212 are alternately arranged at a boundary between the adjacent light transmittable members that are arranged in the array form. The emission surface from which the light having entered the polarization converter element 21 and been transmitted through the PBS film 211 is emitted includes a λ/2 waveplate 213 (in other words, half waveplate).

The emission surface of the polarization converter element 21 further includes the rectangular composite/diffusion block 16 as shown in FIG. 27A. The light emitted from the LED element 102A is formed as the collimated light by the function of the collimator 15, is converted in terms of light polarization property through the polarization converter element 21, and then, enters the composite/diffusion block 16, and is diffused by a texture 161 on the emission side, and then, reaches the light guiding body 17.

The light guiding body 17 is a member made of a light transmittable resin such as acrylic resin and shaped in a bar having a substantially triangle cross section as shown in FIG. 27B. As also illustrated in FIG. 26, the light guiding body 17 has a light-guiding-body light entrance portion 171 including an entrance surface facing an emission surface of the composite/diffuse block 16 to interpose a first diffuse plate 18*a* therebetween, a light-guiding-body light reflection portion 172 including a reflection surface forming an inclined surface, and a light-guiding-body light emission portion 173 including an emission surface facing the liquid crystal display panel 11 to interpose a second diffuse plate 18*b* therebetween.

As shown in FIG. 27B, a lot of reflection surfaces 172*a* and joint surfaces 172*b* are alternately formed in a saw-teeth form on the light-guiding-body light reflection portion 172 of the light guiding body 17. And, an angle "αn" (n: a natural number of, for example, 1 to 130 in the present example) is formed by the reflection surface 172*a* (a right upward line component in the drawing) and a horizontal surface. As its one example, the angle "an" is set to be equal to or smaller than 43 degrees (but equal to or larger than 0 degree) here.

The light-guiding-body light entrance portion 171 is formed to have a curved convex shape being oblique toward the light source. In this manner, the collimated light emitted from the light emission surface of the composite/diffuse block 16 is diffused and enters through the first diffuse plate 18*a*. This incident light reaches the light-guiding-body light reflection portion 172 while slightly bending/being polarized upward by the light-guiding-body light entrance portion 171 as clearly seen from the drawing, and is reflected by this light reflection portion. This reflection light is emitted from the emission surface of the light-guiding-body light emission portion 173 on the upper side of the drawing, and then, reaches the liquid crystal display panel 11 arranged on the light emission surface.

According to the video display apparatus 10 descried above, the light use efficiency and the equalized illumination property can be more improved, and the apparatus including the modularized light source 13 for the S-polarized wave can be manufactured at a low cost to be downsized. In the above-described explanation, note that the polarization converter element 21 is attached at a subsequent stage of the collimator 15. However, the present invention is not limited to this arrangement, and the polarization converter element 21 may be arranged in a light path extending to the liquid crystal display panel 11.

Note that a lot of reflection surfaces 172*a* and joint surfaces 172*b* are alternately formed in the saw-teeth form on the light-guiding-body light reflection portion 172. The illumination luminous flux is totally reflected on each reflection surface 172*a*, and propagates upward, and besides, enters the light-direction converting panel 54 for controlling the directionality as the substantially collimated diffuse luminous flux by a narrow-angle diffuse plate arranged on the light-guiding-body light emission portion 173, and enters the liquid crystal display panel 11 in an oblique direction. In the present embodiment, the light-direction converting panel 54 is arranged between the emission surface of the light guiding body 17 and the liquid crystal display panel 11. However, arrangement of the light-direction converting panel 54 on the emission surface of the liquid crystal display panel 11 can also provide the same effect.

Second Configuration Example of Video Display Apparatus

Subsequently, another example of a specific configuration of the video display apparatus 10 will be explained with reference to FIG. 28. As similar to the above-described example, in the light source of the video display apparatus 10 of FIG. 28, a plurality of LED elements (although only single LED is illustrated for a vertical cross-sectional view) configuring the light source are provided on the LED substrate 102. These LED elements are attached at predetermined respective positions to correspond to the LED collimators 15. The diffuse luminous flux of light (that is mixture of the P-polarized light and the S-polarized light) emitted from the LED element is converted to the substantially collimated light by the collimator 15, and is reflected by the reflection surface of the reflection-type light guiding body 304 toward the liquid crystal display panel 11. The reflection light enters the reflection-type light polarizer 49 arranged between the liquid crystal display panel 11 and the reflection-type light guiding body 304.

In the reflection-type light polarizer 49, a specific polarized wave (such as P-polarized wave) is transmitted and enters the liquid crystal display panel 11. In the reflection-type light polarizer 49, another polarized wave (such as S-polarized wave) is reflected toward the reflection-type light guiding body 304 again. The reflection-type light polarizer 49 tilts not to be orthogonal to the principal light ray of the light emitted from the reflection surface of the reflection-type light guiding body 304, and the principal light ray of the light reflected on the reflection-type light polarizer 49 enters the transmitting surface of the reflection-type light guiding body 304.

The light having entered the transmitting surface of the reflection-type light guiding body 304 is transmitted through the back surface of the reflection-type light guiding body 304, is transmitted through the λ/4 plate 21 that is the waveplate, and is reflected on the reflection plate 271. The light reflected on the reflection plate 271 is transmitted through the λ/4 plate 270 again, and is transmitted through the transmitting surface of the reflection-type light guiding body 304. The light transmitted through the transmitting surface of the reflection-type light guiding body 304 enters the reflection-type light polarizer 49 again.

In this case, the light having entered the reflection-type light polarizer 49 again is transmitted through the λ/4 plate 270 twice, and therefore, is converted in terms of polarization to the polarized wave (such as P-polarized wave) transmitted through the reflection-type light polarizer 49. Therefore, the polarization-converted light is transmitted through the reflection-type light polarizer 49, and enters the liquid crystal display panel 11. Regarding the light-polarization design for the light polarization, note that a configuration in which the polarized waves that are the S-polarized wave and the P-polarized wave are exchanged to each other is also applicable in the above explanation.

As a result, the light emitted from the LED element that is the light source is unified to the specific polarized wave (such as P-polarized wave), enters the liquid crystal display panel 11, is modulated in terms of luminance in accordance with the video signal, and displays the video on the panel surface.

Figure 28:
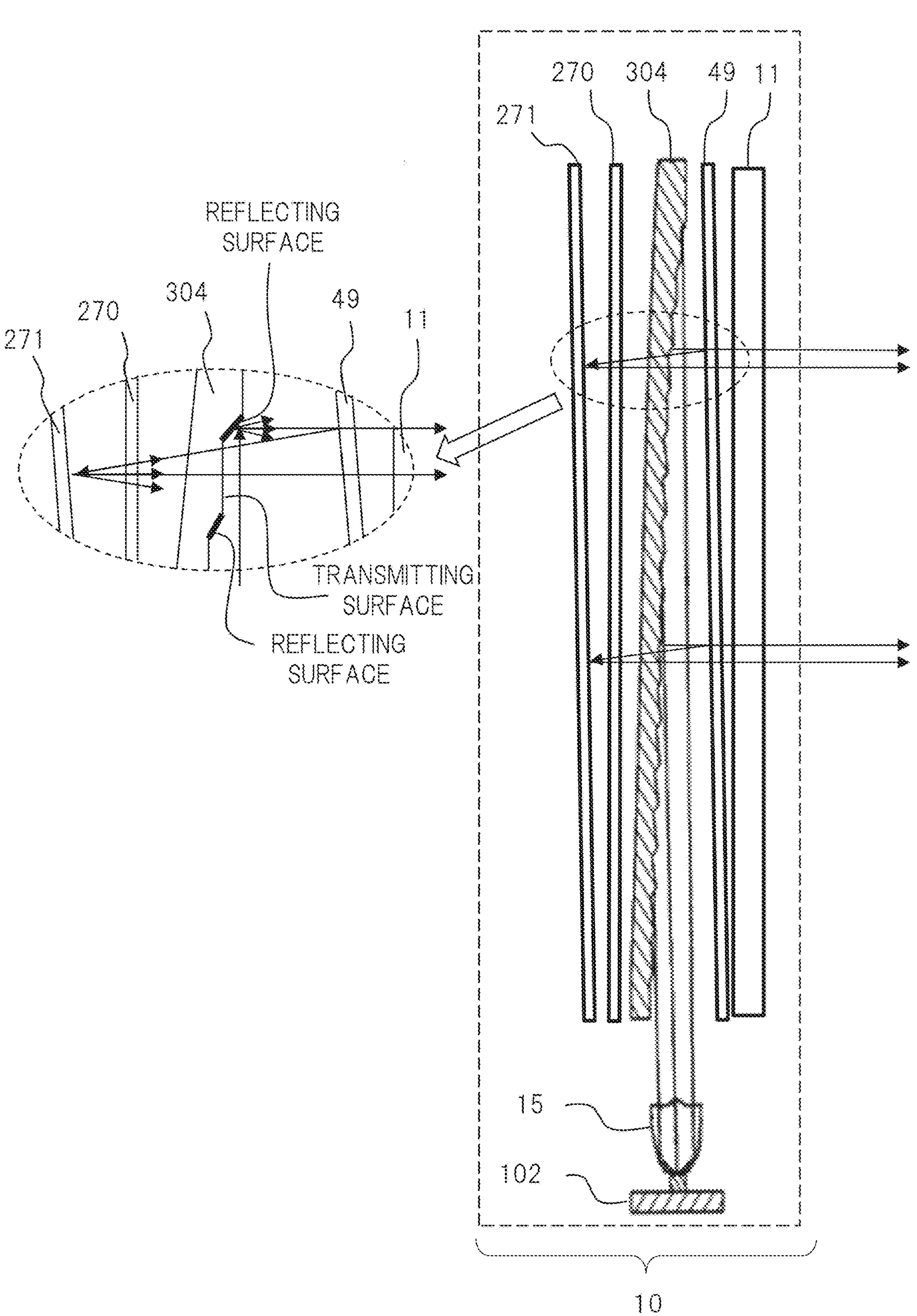
FIG. 28 is a diagram illustrating a specific configuration example of a light source of another mode.

Each collimator 15 of FIG. 28 is made of, for example, a light-transmittable resin such as acrylic resin or glass. As similar to the collimator 15 of FIG. 27, the collimator 15 of FIG. 28 may have a conically convex outer circumferential surface formed by rotation of a paraboloid cross section, and its apex may have a concave portion with a convex center (in other words, a convex lens surface) formed therein. A center of a plane portion of the collimator 15 may have a convex lens surface that protrudes outward (or a concave lens surface that is recessed inward). The paraboloid surface forming the conically-shaped outer circumferential surface of the collimator 15 is set within a range of an angle allowing the light peripherally emitted from the LED to be totally reflected inside, or forms the reflection surface.

The LED elements of FIG. 28 are arranged at predetermined positions, respectively, on the surface of the LED substrate 102. The LED on the surface of the LED substrate 102 is arranged and fixed to be positioned at center (or a concave portion if the apex portion has the concave portion) of the conically convex apex portion to correspond to the collimator 15.

In such a configuration, by the collimator 15, among the light emitted from the LED element, particularly the light emitted from its center is collected by the convex lens surface forming the outer shape of the collimator 15 to form the collimated light. The light peripherally emitted from other portions is reflected by the paraboloid surface forming the conically-shaped outer circumferential surface of the collimator 15, and is similarly collected to form the collimated light. In other words, by the collimator 15 having the convex lens formed on its center and the paraboloid surface formed on the peripheral portion, almost all the light components generated by the LED element can be extracted as the collimated light, and the use efficiency of the generated light can be improved.

The above-explained configuration of the light source 13 or the like is applicable to the light source 13 of the video display apparatus 10 configuring the air floating video information display system 1 illustrated in FIGS. 13 and 14 or the like.

Further, the light converted to the substantially collimated light by the collimator 15 illustrated in FIG. 28 is reflected by the reflection-type light guiding body 304. Among the reflection light, the specific polarized light is transmitted through the reflection-type light polarizer 49 by the function of the reflection-type light polarizer 49 while another polarized light reflected by the function of the reflection-type light polarizer 49 is transmitted through the light guiding body 304 again. The light is reflected on the reflection plate 271 on the opposite side of the liquid crystal display panel 11 across the reflection-type light guiding body 304. In this case, the light is converted in terms of polarization because of being transmitted through the λ/4 plate 270 that is the waveplate twice.

The light reflected on the reflection plate 271 is transmitted through the light guiding body 304 again, and enters the reflection-type light polarizer 49 on the opposite surface. The incident light is converted in terms of polarization, and therefore, is transmitted through the reflection-type light polarizer 49, is unified in terms of the polarization direction, and enters the liquid crystal display panel 11. As a result, the entire light of the light source can be used, and therefore, the geometric-optics light use efficiency is doubled. And, a polarization degree (in other words, extinction ratio) of the reflection-type light polarizer is also included in an extinction ratio of the entire system. Therefore, when the light source 13 of the present embodiment is used, the contrast ratio of the display apparatus can be significantly improved.

By adjustment of the surface roughness of the reflection surface of the reflection-type light guiding body 304 and the surface roughness of the reflection plate 271, the light reflection diffusion angle on each reflection surface can be adjusted. The surface roughness of the reflection surface of the reflection-type light guiding body 304 and the surface roughness of the reflection plate 271 may be adjusted for each design to achieve more preferable equality of the light entering the liquid crystal display panel 11.

Embodiment Related to Automatic Vending Machine

Figure 29:
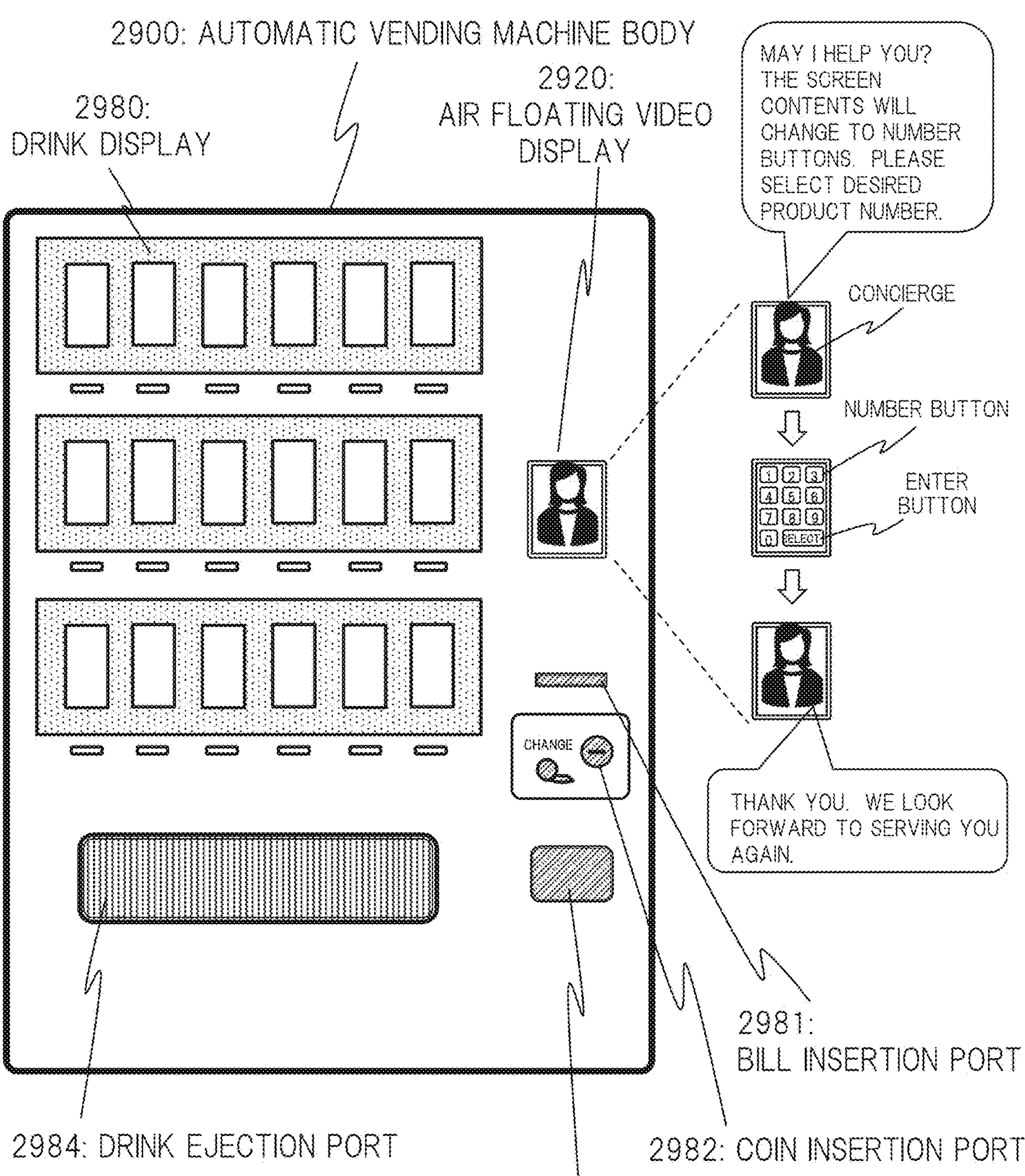
FIG. 29 is a diagram illustrating an external appearance example of an automatic vending machine according to an embodiment (another embodiment).

Here, an example of the application of the air floating video information display system to the automatic vending machine as another embodiment of the present invention will be described with reference to FIG. 29. FIG. 29 is a diagram illustrating a case of the application of the present invention to, for example, the automatic vending machine for drinks.

In FIG. 29, an automatic vending machine main body 2900 includes an air floating video display 2920. The automatic vending machine main body 2900 further includes a drink display 2980 that displays drinks sold by the automatic vending machine main body 2900, a bill insertion portion 2981 for inserting a bill, a coin insertion portion 2982 for inserting a coin, a change ejection port 2983 for ejecting a change, and a drink ejection port 2984 for ejecting a drink purchased by the user.

The automatic vending machine main body 2900 includes a human detecting sensor or a camera as similar to the kiosk terminal. When the user approaches the automatic vending machine main body, the air floating video display 2920 is activated. Next, as illustrated in FIG. 29, the concierge appears on the air floating video display 2920, and the machine emits a voice sound (audio) saying that, for example, "May I help you? Thank you for using our services. The screen changes to the number buttons. Please select the desired product number." to the user. Then, the concierge disappears from the air floating video display 2920, and subsequently, a number button and an enter button are displayed. At this time, although not illustrated, a cancel button or a return button may be displayed in addition to the number button and the enter button.

The user selects a drink by operating the number button and the enter button displayed on the air floating video display 2920, and inserts a predetermined amount of money into the bill insertion portion 2981 or the coin insertion portion 2982, so that the drink is served in a form that allows the user to take it from the drink ejection port 2984. After that, the number button and the enter button disappear from the air floating video display 2920, and the concierge appears again thereon and emits the audio saying that, for example, "Thank you. We look forward to serving you again". Even in this case, as similar to the kiosk terminal, the audio may be emitted from a normal loudspeaker, or from the super-directive loudspeaker so that only the user can hear the audio.

Through a sequence of the above-described operations, the user can purchase the desired drink. Note that the example of FIG. 29 shows the example with only the air floating video display. However, the automatic vending machine may also include both the liquid crystal display apparatus and the air floating video display as similar to the kiosk terminal, or may include the air floating video display at not only one position but also two or more positions. If the air floating video displays are provided at two locations, note that the concierge may be displayed on either one of the air floating video displays while the number button and the enter button may be displayed on the other air floating video display.

Furthermore, as the concierge, a plurality of different person images or animation character icon images having different ages and genders may be displayed. Data for displaying the plurality of different person images or animation character icon images having different ages and genders is stored in the nonvolatile memory 1108 of FIG. 2, and one of the plurality of different person images or animation character icon images may be appropriately selected and displayed as the concierge on the air floating video display. In this case, in accordance with the attribute (for example, age) of the user, it may be determined which person image or character icon image is to be displayed.

As described above, since the present embodiment includes the air floating video display as similar to the kiosk terminal, the user can select and purchase the product through contactless. Further, the user's approach to the automatic vending machine can be detected, and the air floating video can be displayed, and therefore, the person image or the character icon image serving as the concierge can be displayed by the display method not provided by the related-art automatic vending machine. This results in an effect more attracting the user to the machine than the general automatic vending machine because of rare situation, and increase of product sales in the automatic vending machine can be also expected.

In the foregoing, the present invention has been described in detail, based on the embodiments. However, the present invention is not limited to the foregoing embodiments, and various modifications can be made within the scope of the present invention. In each embodiment, components except for essential components can be added, eliminated or replaced. Each component may be single or plural unless otherwise particularly specified. A combination mode of the embodiments may be also applicable.

In the technique according to the embodiments, since the high-resolution and high-luminance video information is displayed as the air floating video to be aerially floating, for example, the user can perform operations without concern about contact infection in illness. When the technique according to the present examples is applied to the system that is used by a large number of unspecified users, a contactless user interface having the less risk of the contact infection in illness and being available without the concern can be provided. The present invention providing such a technique contributes to "the third goal: Good Health and Well-being (for all people)" of the Sustainable Development Goals (SDGs) advocated by the United Nations.

Furthermore, in the technique according to the embodiments, since only the normal reflection light is efficiently reflected to the retroreflector by reducing the divergence angle of the emitted video light and further unifying the emitted video light to be of the specific polarization wave, a bright and clear air floating video with high light use efficiency can be provided. In the technique according to the embodiments, it is possible to provide a highly available contactless user interface capable of significantly reducing power consumption. The present invention providing such a technique contributes to "the ninth goal: Industry, Innovation and Infrastructure" and "the eleventh goal: Sustainable Cities and Communities" of the Sustainable Development Goals (SDGs) advocated by the United Nations.

Furthermore, the technique according to the embodiments enables the formation of the air floating video based on the video light having high directionality (rectilinear propagation). In the technique according to the embodiments, even in display of video that requires high security such as so-called kiosk terminal or display of video having high confidentiality that needs to be secured for a person facing the user or the like, by displaying the video light with high directionality, it is possible to provide a contactless user interface having less risk of causing a person other than the user to take a peek at the air floating video. The present invention contributes to "the eleventh goal: Sustainable Cities and Communities" of the Sustainable Development Goals (SDGs) advocated by the United Nations.

EXPLANATION OF REFERENCE CHARACTERS

1 . . . air floating video information display system, 2 . . . retroreflector, 3 . . . air floating video, 10 . . . video display apparatus, 11 . . . liquid crystal display panel, 13 . . . light source, 1500 . . . kiosk terminal, 1510 . . . liquid crystal display screen, 1520 . . . air floating video display, 1521 . . . concierge, 1522 . . . operation menu, 1530 . . . ejection port, 1541 and 1542 . . . camera, 1550 . . . housing, 1551 and 1552 super-directive loudspeaker, 1560 . . . human detecting sensor, 1570 . . . inclined surface

The invention claimed is:

1. An air floating video information display system forming an air floating video in air, comprising:

a video display apparatus configured to display at least a video of one object;

a retroreflector configured to form the air floating video in air by retroreflecting video light emitted from the video display apparatus;

a sensing system configured to include a sensor for detecting a user's operation on the air floating video;

a housing configured to include the video display apparatus and the retroreflector; and controller circuitry configured to execute a predetermined processing based on the detected operation, wherein, in response to approach of the user to the housing being detected, the controller circuitry is configured to control the video display apparatus to display the video of the object as the air floating video, wherein the sensing system is configured to detect a contact position of a finger tip of the user with the air floating video and movement of the finger tip of the user on a plane of the air floating video in a three-dimensional space, based on a sensing plane that is set at a position separate in a depth direction from the air floating video, and wherein the controller circuitry is further configured to:

determine the user to be either a first user who gets used to the operation or a second user who does not get used to the operation, based on authentication of the user or acquisition of attributional information of the user, perform a second processing of performing a guidance about the operation to the user by using a concierge serving as a human image displayed on the air floating video if the user is the second user, or perform a first processing of causing the concierge to eliminate or simplify the guidance if the user is the first user, and change the first processing to the second processing if it is determined in the first processing that the user is performing the operation while the user's operation stops for a longer time than a predetermined time after separation of the finger tip of the user detected by the sensing system from the plane of the air floating video to display both the concierge and an operation menu on the air floating video such that the concierge performs the guidance about the operation of the operation menu.

2. The air floating video information display system according to claim 1, wherein the object has a shape serving as a human image.

3. The air floating video information display system according to claim 2, wherein the human image is the concierge.

4. The air floating video information display system according to claim 3, wherein the concierge and the operation menu including at least two or more options are displayed as the air floating video, and a guidance about an operation of the operation menu is performed by a video and audio of the concierge.

5. The air floating video information display system according to claim 4, wherein the controller circuitry is configured to execute a processing of issuing a document, based on the detected operation, and a part of the housing includes an ejection port for the document.

6. The air floating video information display system according to claim 5, wherein the air floating video information display system is a kiosk terminal having a function of issuing a ticket or an administrative document as the document.

7. The air floating video information display system according to claim 3, wherein the controller circuitry is configured to acquire attributional information of the user, determine a condition including determination of whether the user is at least either a user who uses the air floating video information display system at the first time or a user whose age is equal to or higher than a predetermined age, based on the attributional information, and causes the concierge serving as the air floating video to perform a guidance to the user meeting the condition.

8. The air floating video information display system according to claim 1, wherein, when the approach of the user to the housing is detected, a human image serving as the object is displayed first, and then, the operation menu is displayed, as the air floating video.

9. The air floating video information display system according to claim 8, wherein the controller circuitry is configured to identify the user, and change display from display of the human image serving as the object to display of the operation menu, based on a result of the identification.

10. The air floating video information display system according to claim 1, further comprising an imager configured to capture an image of the user, wherein the approach of the user is detected based on the image of the user captured by the imager.

11. The air floating video information display system according to claim 1, further comprising an imager configured to capture an image of the user, wherein the user is identified based on the image of the user captured by the imager.

12. The air floating video information display system according to claim 1, wherein the operation menu including at least two or more options is displayed as the air floating video.

13. The air floating video information display system according to claim 1, further comprising a super-directive loudspeaker configured to output an audio signal that is audible only for the user.

14. The air floating video information display system according to claim 1, further comprising a communication portion configured to perform wireless communication with a mobile terminal held by the user.

15. The air floating video information display system according to claim 14, wherein information of the user transmitted from the mobile terminal is received based on the wireless communication.

16. The air floating video information display system according to claim 14, wherein the controller circuitry is configured to execute a processing of issuing a document, based on the detected operation, and transmit information of the document to the mobile terminal, based on the wireless communication.

17. The air floating video information display system according to claim 1, wherein code information to be read by a mobile terminal of the user is displayed as the air floating video.

18. The air floating video information display system according to claim 1, further comprising an imager configured to capture an image of the user, wherein code information displayed on a mobile terminal of the user is read by the imager.

* * * * *